(12) United States Patent
Nishi

(10) Patent No.: US 11,977,239 B2
(45) Date of Patent: May 7, 2024

(54) DIFFRACTIVE OPTICAL DEVICE

(71) Applicant: SUMITOMO ELECTRIC HARDMETAL CORP., Itami (JP)

(72) Inventor: Hirohito Nishi, Itami (JP)

(73) Assignee: SUMITOMO ELECTRIC HARDMETAL CORP., Itami (JP)

( * ) Notice: Subject to any disclaimer, the term of this patent is extended or adjusted under 35 U.S.C. 154(b) by 557 days.

(21) Appl. No.: 17/292,454

(22) PCT Filed: Jul. 10, 2020

(86) PCT No.: PCT/JP2020/027097
§ 371 (c)(1),
(2) Date: May 10, 2021

(87) PCT Pub. No.: WO2022/009428
PCT Pub. Date: Jan. 13, 2022

(65) Prior Publication Data
US 2022/0011585 A1    Jan. 13, 2022

(51) Int. Cl.
*G02B 27/09* (2006.01)
*G02B 5/18* (2006.01)
*G02B 27/42* (2006.01)

(52) U.S. Cl.
CPC ....... *G02B 27/0927* (2013.01); *G02B 5/1866* (2013.01); *G02B 27/4233* (2013.01); *G02B 2005/1804* (2013.01)

(58) Field of Classification Search
CPC ............ G02B 27/0927; G02B 27/4233; G02B 5/1866; G02B 2005/1804

USPC ......................................................... 359/566
See application file for complete search history.

(56) References Cited

U.S. PATENT DOCUMENTS

| 6,330,118 B1 | 12/2001 | Daschner et al. |
| 9,285,593 B1 | 3/2016 | Laskin et al. |
| 2006/0146422 A1* | 7/2006 | Koike ................. G02B 5/188 |

FOREIGN PATENT DOCUMENTS

| DE | 102010005774 A1 | 3/2011 |
| JP | 9-61610 A | 3/1997 |
| JP | 9-196813 A | 7/1997 |
| JP | 2003-114400 A | 4/2003 |
| JP | 2003-344762 A | 12/2003 |
| JP | 2005-257823 A | 9/2005 |
| JP | 2009-204944 A | 9/2009 |
| JP | 2010-48997 A | 3/2010 |
| JP | 2012-131681 A | 7/2012 |

(Continued)

*Primary Examiner* — Wyatt A Stoffa
*Assistant Examiner* — Mitchell T Oestreich
(74) *Attorney, Agent, or Firm* — XSENSUS LLP

(57) ABSTRACT

A diffractive optical device includes at least one diffractive optical element. The diffractive optical element generates light having a first order and light having a second order from a laser beam input to the diffractive optical element. The diffractive optical element includes a first phase pattern and a second phase pattern. The first phase pattern converts the laser beam into a line beam. The second phase pattern diffracts the laser beam in a short axis direction of the line beam to generate the light having the first order and the light having the second order. A first focal plane of the light having the first order is located at a position different from a second focal plane of the light having the second order on an optical axis of the laser beam.

11 Claims, 74 Drawing Sheets

(56) References Cited

FOREIGN PATENT DOCUMENTS

| JP | 2013-33155 A | 2/2013 |
| JP | 2015-20195 A | 2/2015 |

* cited by examiner

DIFFRACTIVE OPTICAL DEVICE

CROSS-REFERENCE TO RELATED APPLICATION

The present application is based on PCT filing PCT/JP2020/027097, filed Jul. 10, 2020, the entire contents of which are incorporated herein by reference.

TECHNICAL FIELD

The present disclosure relates to a diffractive optical device.

BACKGROUND ART

Japanese Patent Laying-Open No. 2012-131681 (PTL 1) discloses a diffractive optical element (DOE) that converts a circular laser beam into a line beam. The line beam is used to process a workpiece.

CITATION LIST

Patent Literature

PTL 1: Japanese Patent Laying-Open No. 2012-131681

SUMMARY OF INVENTION

A diffractive optical device of the present disclosure includes at least one diffractive optical element. The at least one diffractive optical element generates light having a first order and light having a second order from a laser beam input to the at least one diffractive optical element, and superimposes the light having the first order and the light having the second order on each other on an optical axis of the laser beam to cause interference between the light having the first order and the light having the second order, the light having the first order and the light having the second order having diffraction orders different from each other. The at least one diffractive optical element includes a first phase pattern and a second phase pattern. The first phase pattern converts the laser beam into a line beam. The second phase pattern diffracts the laser beam in a short axis direction of the line beam to generate the light having the first order and the light having the second order. A first focal plane of the light having the first order is located at a position different from a second focal plane of the light having the second order on the optical axis of the laser beam.

BRIEF DESCRIPTION OF DRAWINGS

FIG. 119 is a diagram showing a second phase pattern in Example 11.

FIG. 120 is a diagram showing a defocus characteristic of the diffractive optical device of Example 11 in the yz plane.

FIG. 121 is a diagram showing a defocus characteristic of the diffractive optical device of Example 11 in the xz plane.

FIG. 122 is a diagram showing an optical axis direction relative light intensity profile of the line beam in Example 11.

FIG. 123 is a diagram showing a short axis direction relative light intensity profile of the line beam in Example 11.

FIG. 124 is a diagram showing a long axis direction relative light intensity profile of the line beam in Example 11.

FIG. 125 is a schematic side view of a laser beam irradiation device in a second embodiment.

FIG. 126 is a schematic plan view of the laser beam irradiation device in the second embodiment.

DETAILED DESCRIPTION

Figure 1:
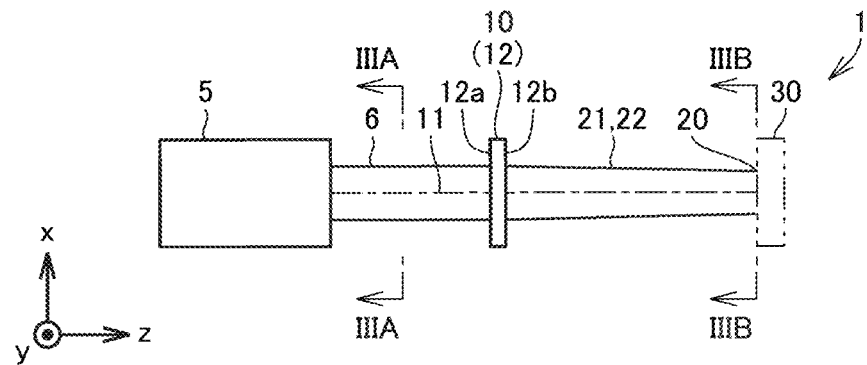
FIG. 1 is a schematic side view of a laser beam irradiation device in a first embodiment.

Problem to be Solved by the Present Disclosure

In order to obtain a line beam, a diffractive optical element converges a laser beam more intensely in the short axis direction of the line beam than in the long axis direction of the line beam. When displaced from the focal plane of the diffractive optical element, the line beam is diverged abruptly in the short axis direction of the line beam. Therefore, the focal depth of the line beam is short. When a workpiece is processed using such a line beam having a short focal depth, processing characteristics for the workpiece are greatly varied in response to only a slight change being made in a distance between the diffractive optical element and the workpiece. It is an object of the present disclosure to provide a diffractive optical device by which a line beam having a longer focal depth can be obtained.

Advantageous Effect of the Present Disclosure

According to the diffractive optical device of the present disclosure, a line beam having a longer focal depth can be obtained.

DESCRIPTION OF EMBODIMENTS

First, embodiments of the present disclosure are listed and described.

(1) A diffractive optical device according to the present disclosure includes at least one diffractive optical element. The at least one diffractive optical element generates light having a first order and light having a second order from a laser beam input to the at least one diffractive optical element, and superimposes the light having the first order and the light having the second order on each other on an optical axis of the laser beam to cause interference between the light having the first order and the light having the second order, the light having the first order and the light having the second order having diffraction orders different from each other. The at least one diffractive optical element includes a first phase pattern and a second phase pattern. The first phase pattern converts the laser beam into a line beam. The second phase pattern diffracts the laser beam in a short axis direction of the line beam to generate the light having the first order and the light having the second order. A first focal plane of the light having the first order is located at a position different from a second focal plane of the light having the second order on the optical axis of the laser beam.

Therefore, a line beam having a longer focal depth can be obtained.

(2) According to the diffractive optical device according to (1), the second phase pattern includes a central phase pattern and peripheral phase patterns disposed on both sides relative to the central phase pattern in the short axis direction of the line beam. The central phase pattern provides a first optical phase to the laser beam. Each of the peripheral phase patterns provides a second optical phase different from the first optical phase to the laser beam. A difference between the first optical phase and the second optical phase is $\pi$.

Therefore, a line beam having a longer focal depth can be obtained.

(3) According to the diffractive optical device according to (2), the central phase pattern is uniform in a long axis direction of the line beam. Each of the peripheral phase patterns is uniform in the long axis direction of the line beam.

The second phase pattern generates no diffraction light in the long axis direction of the line beam in which no problem of the focal depth occurs. Therefore, a line beam having a longer focal depth can be obtained without exerting an influence in the long axis direction of the line beam.

(4) According to the diffractive optical device according to any one of (1) to (3), the light having the first order is a +1-order diffraction beam. The light having the second order is a −1-order diffraction beam. When λ represents a wavelength of the laser beam, ω represents a $1/e^2$ beam diameter of the laser beam, $P_{+1}$ represents a first refractive power of the second phase pattern for the +1-order diffraction beam in the short axis direction of the line beam, and $P_{-1}$ represents a second refractive power of the second phase pattern for the −1-order diffraction beam in the short axis direction of the line beam, $P_{+1}$ and $P_{-1}$ are given by the following formula (1) and a coefficient C satisfies the following formula (2):

$$P_{+1} = -P_{-1} = \lambda C/\omega^2 \quad (1), \text{ and}$$

$$0.0 < C \leq 2.6 \quad (2).$$

Therefore, the light intensity distribution of the line beam becomes more uniform in the optical axis direction.

(5) According to the diffractive optical device according to (4), the coefficient C satisfies the following formula (3):

$$1.4 \leq C \leq 2.6 \quad (3).$$

Therefore, a line beam having a longer focal depth can be obtained.

(6) According to the diffractive optical device according to (4) or (5), the coefficient C satisfies the following formula (4):

$$1.6 \leq C \leq 2.1 \quad (4).$$

Therefore, the light intensity distribution of the line beam becomes more uniform in the short axis direction of the line beam.

(7) According to the diffractive optical device according to any one of (1) to (6), the at least one diffractive optical element is constituted of one diffractive optical element including a light incident surface and a light exit surface. The first phase pattern is formed in one of the light incident surface or the light exit surface. The second phase pattern is formed in one of the light incident surface or the light exit surface.

Therefore, the diffractive optical device can be downsized. Positioning of the diffractive optical device is facilitated. Disturbance in the cross sectional shape of the line beam can be reduced.

(8) According to the diffractive optical device according to (7), the one diffractive optical element includes a phase pattern in which the first phase pattern and the second phase pattern are overlapped with each other. The phase pattern is formed in one of the light incident surface or the light exit surface.

Therefore, the first phase pattern and the second phase pattern can be more precisely positioned with respect to each other. Disturbance in the cross sectional shape of the line beam can be reduced.

(9) According to the diffractive optical device according to any one of (1) to (6), the at least one diffractive optical element is constituted of a first diffractive optical element and a second diffractive optical element each disposed along the optical axis. The first phase pattern is formed in the first diffractive optical element. The second phase pattern is formed in the second diffractive optical element.

Therefore, a line beam having a longer focal depth can be obtained.

(10) According to the diffractive optical device according to (2) or (3), the at least one diffractive optical element is constituted of one diffractive optical element including a light incident surface and a light exit surface. The one diffractive optical element includes a phase pattern in which the first phase pattern and the second phase pattern are overlapped with each other. The phase pattern is formed in one of the light incident surface or the light exit surface. The light having the first order is a +1-order diffraction beam. The light having the second order is a −1-order diffraction beam. When λ represents a wavelength of the laser beam, ω represents a $1/e^2$ beam diameter of the laser beam, $P_{+1}$ represents a first refractive power of the second phase pattern for the +1-order diffraction beam in the short axis direction of the line beam, and $P_{-1}$ represents a second refractive power of the second phase pattern for the −1-order diffraction beam in the short axis direction of the line beam, $P_{+1}$ and $P_{-1}$ are given by the following formula (5) and a coefficient C satisfies the following formula (6):

$$P_{+1} = -P_{-1} = \lambda C/\omega^2 \quad (5), \text{ and}$$

$$1.6 \leq C \leq 2.1 \quad (6).$$

Therefore, a line beam having a longer focal depth can be obtained. The light intensity distribution of the line beam becomes more uniform in the short axis direction of the line beam without exerting an influence in the long axis direction of the line beam. The first phase pattern and the second phase pattern may be more precisely positioned with respect to each other.

DETAILS OF EMBODIMENTS OF THE PRESENT DISCLOSURE

Details of embodiments will be described below with reference to figures. It should be noted that in the figures, the same or corresponding portions are denoted by the same reference characters, and will not be described repeatedly. At least parts of the configurations of the embodiments described below may be combined appropriately.

First Embodiment

Figure 2:
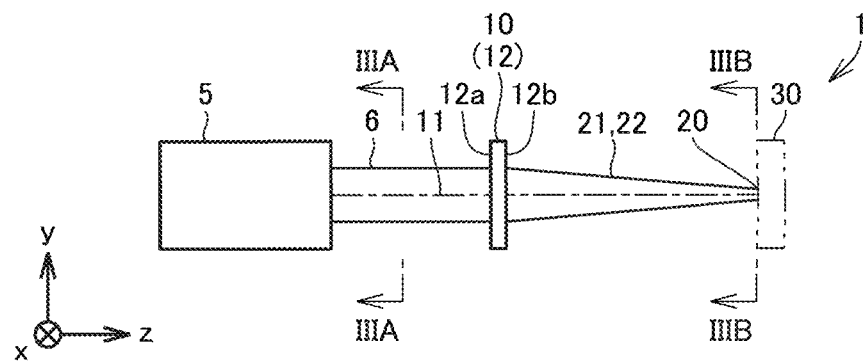
FIG. 2 is a schematic plan view of the laser beam irradiation device in the first embodiment.

A laser beam irradiation device 1 of a first embodiment will be described with reference to FIGS. 1 to 18. As shown in FIGS. 1 and 2, laser beam irradiation device 1 is, for example, a device that irradiates a workpiece 30 with a line beam 20. Workpiece 30 is processed using line beam 20, for example. Workpiece 30 is, for example, a semiconductor wafer, a glass substrate, a thin film formed on a substrate or the like. Laser beam irradiation device 1 includes a laser light source 5 and a diffractive optical device 10.

Figure 3A:
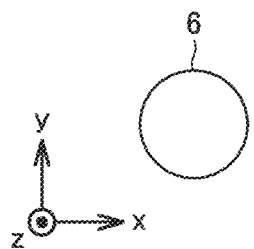
FIG. 3A is a diagram showing a cross sectional shape of a laser beam input to a diffractive optical device in the first embodiment.
Figure 3B:
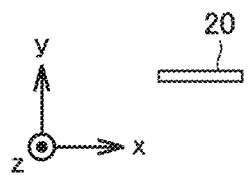
FIG. 3B is a diagram showing a cross sectional shape of a line beam in the first embodiment.

Laser light source 5 is, for example, a solid-state laser or a gas laser. Examples of the solid-state laser include a fiber laser, a semiconductor laser, and a YAG laser. Examples of the gas laser include a carbon dioxide gas laser. Laser beam 6 output from laser light source 5 is input to diffractive optical device 10. As shown in FIG. 3A, laser beam 6 has a circular cross sectional shape, for example. The light intensity distribution of laser beam 6 in the cross section of laser beam 6 is, for example, Gaussian distribution. In the present specification, the cross section of the light beam (for example, laser beam 6 or line beam 20) refers to a cross section thereof perpendicular to the optical axis of the light beam (optical axis 11 of laser beam 6 or optical axis 11 of diffractive optical device 10). The cross sectional shape of the light beam (for example, laser beam 6 or line beam 20) refers to the shape of the light beam in the cross section perpendicular to the optical axis of the light beam (for example, optical axis 11 of laser beam 6 or optical axis 11 of diffractive optical device 10). In the present specification, a direction along optical axis 11 is referred to as "z axis direction".

Diffractive optical device 10 can convert laser beam 6 (see FIG. 3A) into a line beam 20 (see FIG. 3B) that is more elongated than laser beam 6. That is, diffractive optical device 10 can convert laser beam 6 into a line beam 20 having an aspect ratio larger than the aspect ratio of laser beam 6. The aspect ratio of a beam represents a degree of elongation of the beam. In the present specification, the long axis direction of line beam 20 is referred to as "x axis direction", and the short axis direction of line beam 20 is referred to as "y axis direction". Further, diffractive optical device 10 can attain a long focal depth of line beam 20.

As shown in FIGS. 1 and 2, diffractive optical device 10 includes at least one diffractive optical element (diffractive optical element 12). The at least one diffractive optical element is composed of an optical material transparent to laser beam 6, such as glass or a transparent resin.

Figure 13:
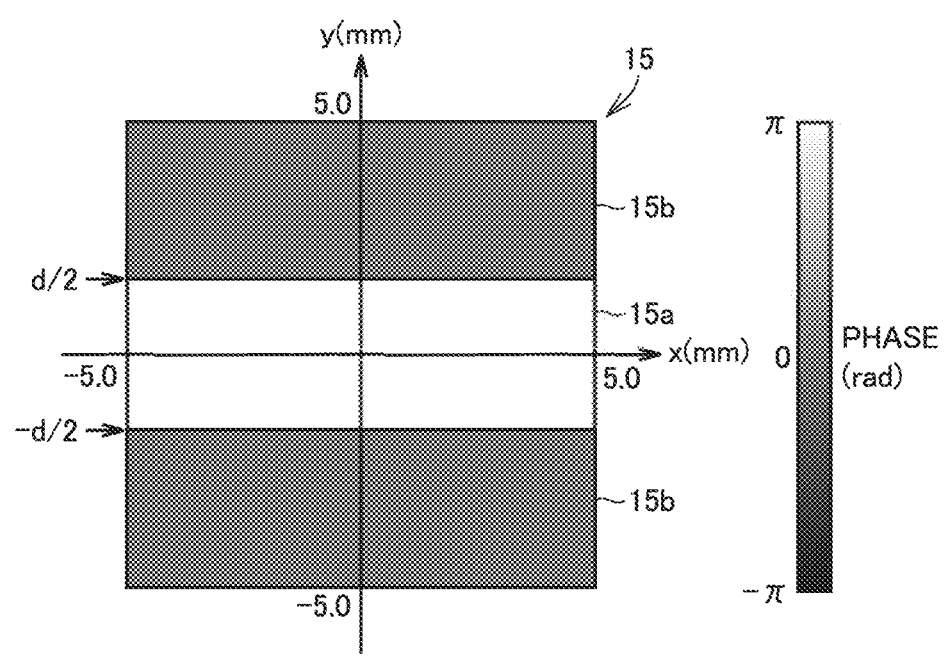
FIG. 13 is a diagram showing a second phase pattern in Example 1.

The at least one diffractive optical element (diffractive optical element 12) includes a first phase pattern 14 shown in FIGS. 9 to 12 and a second phase pattern 15 shown in FIG. 13. Generally, a phase pattern provides, to a light beam passing through the phase pattern, a phase corresponding to the local thickness of a diffractive optical element in which the phase pattern is formed. The phase pattern changes the wavefront of the light beam to converge or diffract the light beam, for example. Each of first phase pattern 14 and second phase pattern 15 is formed by patterning a surface of a plate transparent to laser beam 6 using, for example, a photolithography process.

In the present embodiment, the at least one diffractive optical element is constituted of one diffractive optical element 12 including a light incident surface 12a and a light exit surface 12b. First phase pattern 14 and second phase pattern 15 are formed in light exit surface 12b of diffractive optical element 12. That is, as shown in FIGS. 5 to 8, diffractive optical element 12 includes a phase pattern 13 in which first phase pattern 14 and second phase pattern 15 are overlapped with each other, and phase pattern 13 is formed in light exit surface 12b of diffractive optical element 12.

Figure 4:
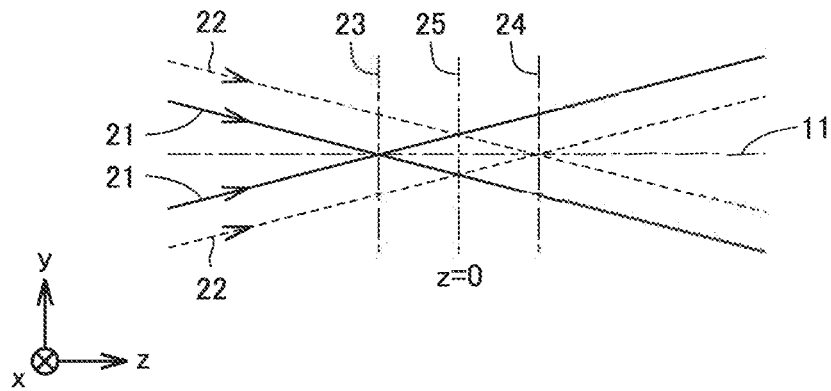
FIG. 4 is a diagram illustrating interference between light having a first order and light having a second order, each of which is output from the diffractive optical device in the first embodiment.
Figure 5:
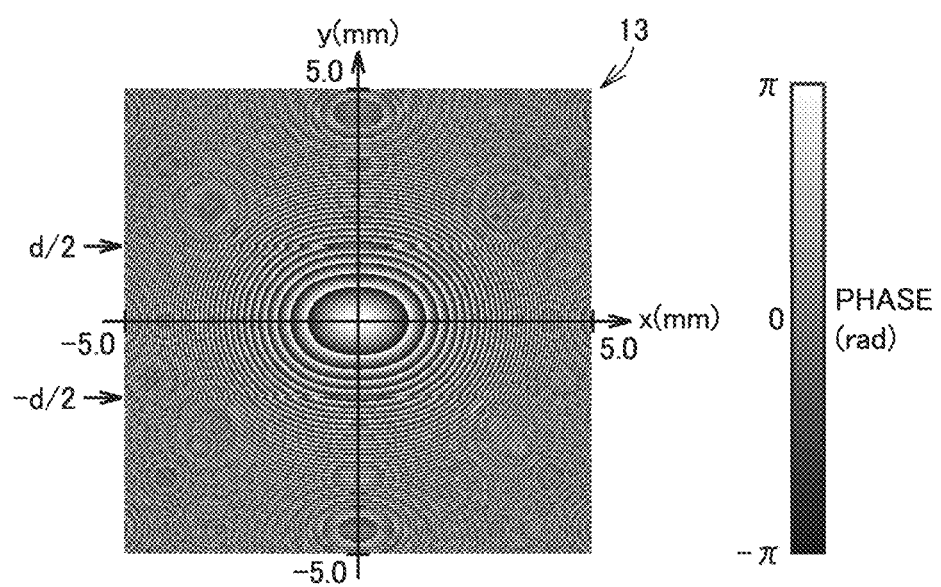
FIG. 5 is a diagram showing a phase pattern in an Example 1.
Figure 6:
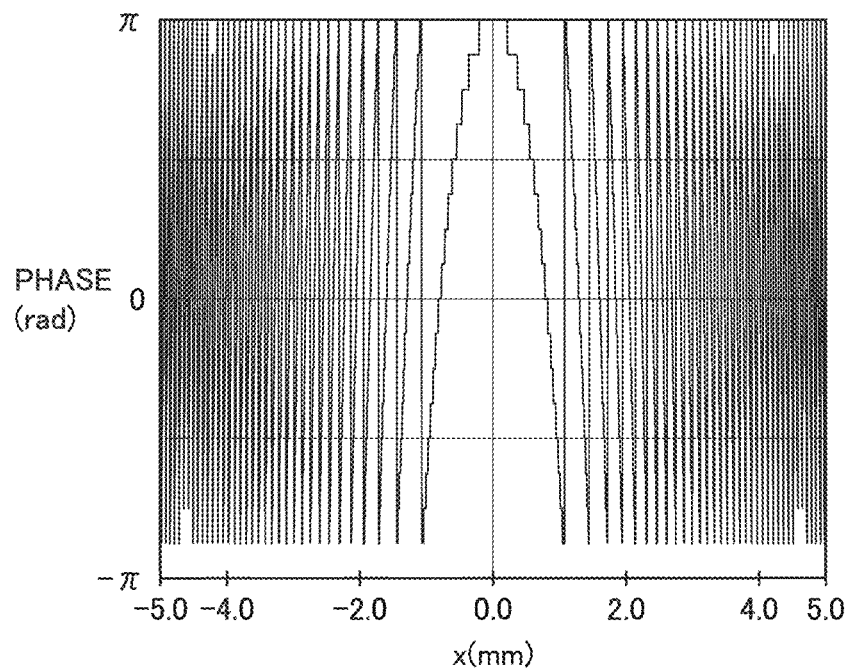
FIG. 6 is a diagram showing a phase pattern in an x axis direction (long axis direction of the line beam) at y=0.0 mm in Example 1.
Figure 7:
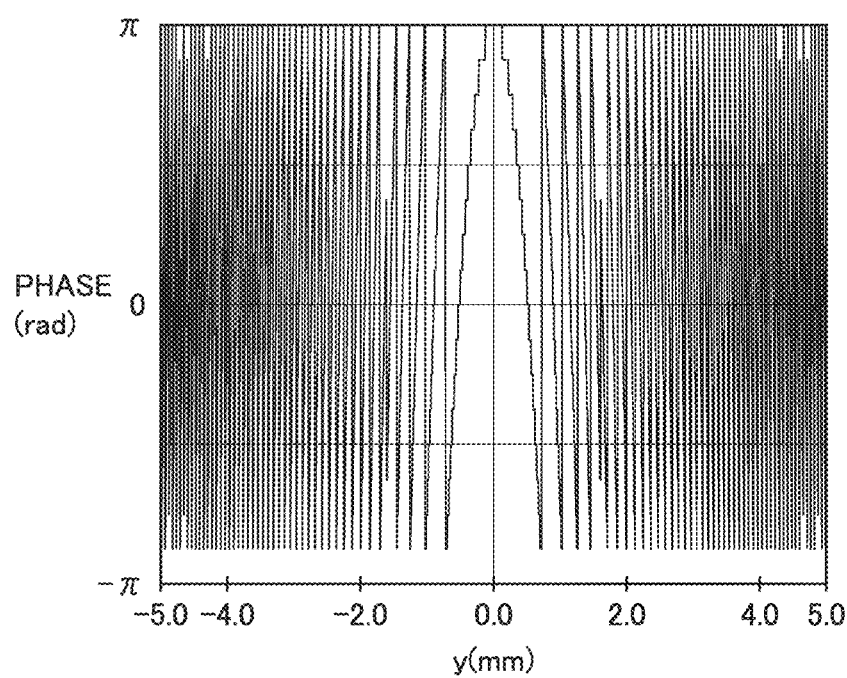
FIG. 7 is a diagram showing a phase pattern in a y axis direction (short axis direction of the line beam) at x=0.0 mm in Example 1.
Figure 8:
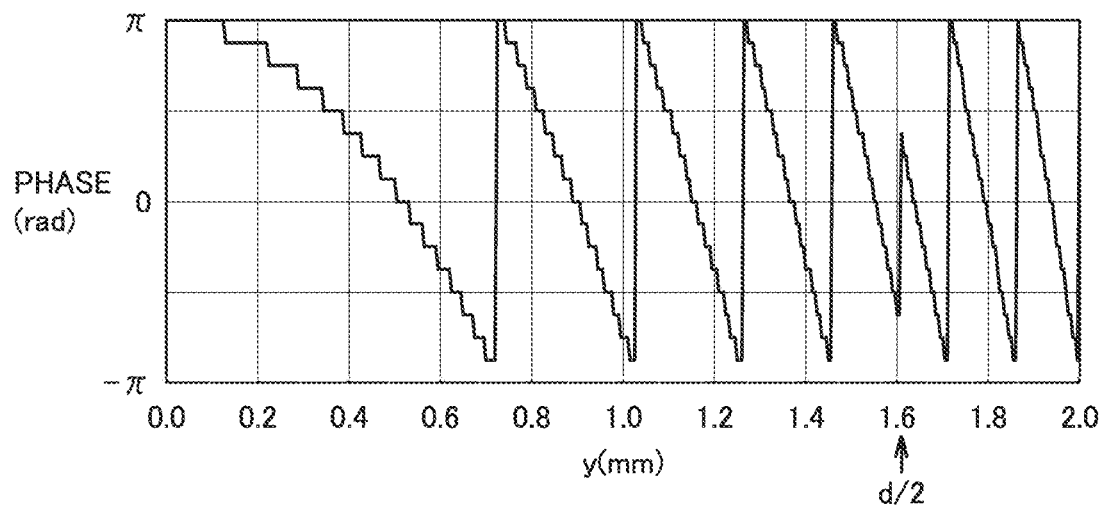
FIG. 8 is a partial enlarged view of the phase pattern in they axis direction at x=0.0 mm in Example 1.
Figure 9:
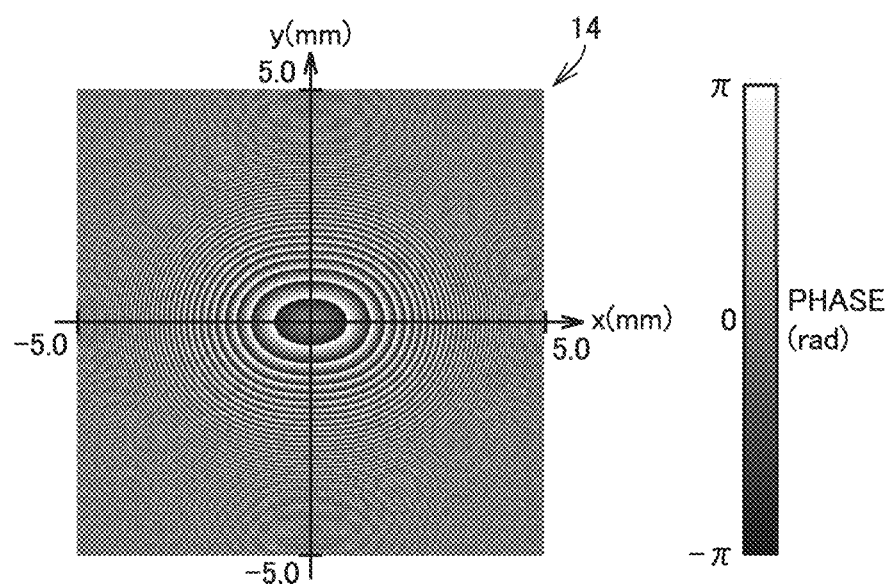
FIG. 9 is a diagram showing a first phase pattern in each of Examples 1 to 11 and a phase pattern in a Comparative Example.
Figure 10:
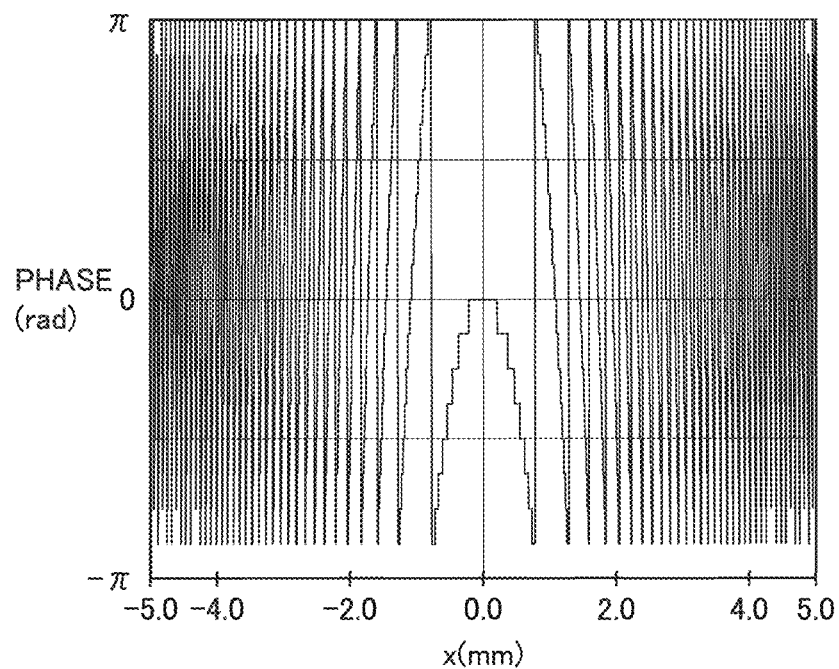
FIG. 10 is a diagram showing a first phase pattern in the x axis direction at y=0.0 mm in each of Examples 1 to 11 and a phase pattern in the x axis direction at y=0.0 mm in the Comparative Example.
Figure 11:
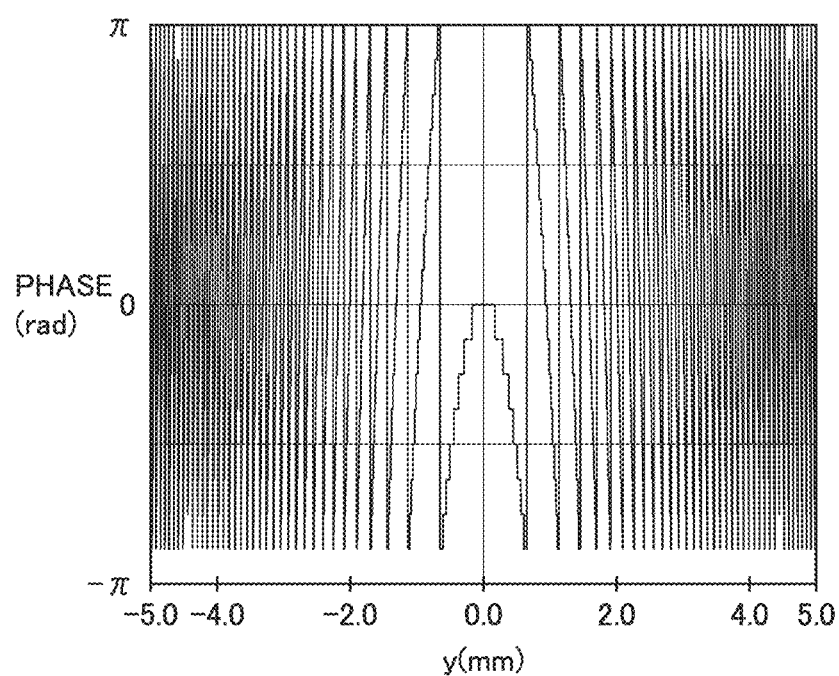
FIG. 11 is a diagram showing a first phase pattern in the y axis direction at x=0.0 mm in each of Examples 1 to 11 and a phase pattern in the x axis direction at y=0.0 mm in the Comparative Example.
Figure 12:
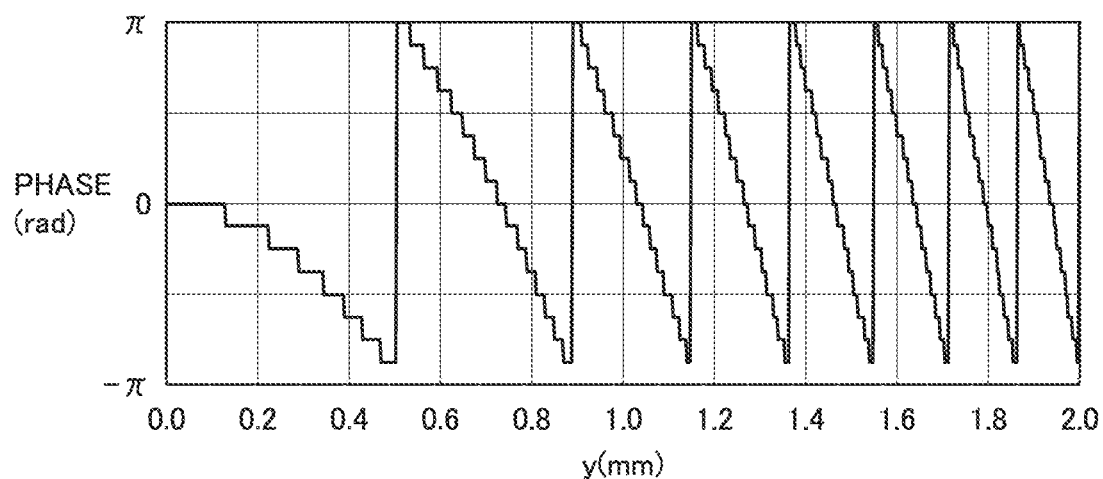
FIG. 12 is a partial enlarged view of a first phase pattern in the y axis direction at x=0.0 mm in each of Examples 1 to 11 and a phase pattern in the x axis direction at y=0.0 mm in the Comparative Example.

As shown in FIG. 4, the at least one diffractive optical element (diffractive optical element 12) generates light 21 having a first order and light 22 having a second order from laser beam 6 input to the at least one diffractive optical element (diffractive optical element 12), and superimposes light 21 having the first order and light 22 having the second order on each other on optical axis 11 of laser beam 6 to cause interference between light 21 having the first order and light 22 having the second order. Light 21 having the first order and light 22 having the second order have diffraction orders different from each other. A first focal plane 23 of light 21 having the first order is located at a position different from a second focal plane 24 of light 22 having the second order on optical axis 11 of laser beam 6.

First phase pattern 14 converts laser beam 6 into line beam 20 (see FIG. 3B) that is more elongated than laser beam 6. First phase pattern 14 converges laser beam 6 in the short axis direction (y axis direction) of line beam 20. First phase pattern 14 has a positive refractive power in the short axis direction (y axis direction) of line beam 20.

Second phase pattern 15 diffracts laser beam 6 in the short axis direction (y axis direction) of line beam 20 to generate light 21 having the first order and light 22 having the second order. Light 21 having the first order is, for example, a +1-order diffraction beam. Light 22 having the second order is, for example, a −1-order diffraction beam.

Specifically, as shown in FIG. 13, second phase pattern 15 includes a central phase pattern 15a and peripheral phase patterns 15b. Peripheral phase patterns 15b are disposed on both sides relative to central phase pattern 15a in the short axis direction (y axis direction) of line beam 20. Central phase pattern 15a extends over a width d with respect to y=0. For example, central phase pattern 15a extends between a first line defined by y=d/2 and a second line defined by y=−d/2. Central phase pattern 15a provides a first optical phase to the laser beam input to second phase pattern 15. Each of peripheral phase patterns 15b provides a second optical phase different from the first optical phase to the laser beam input to second phase pattern 15. A difference between the first optical phase and the second optical phase is, for example, π.

Second phase pattern 15 may be uniform in the long axis direction (x axis direction) of line beam 20. Specifically, central phase pattern 15a may be uniform in the long axis direction (x axis direction) of line beam 20, and peripheral phase pattern 15b may be uniform in the long axis direction (x axis direction) of line beam 20. Therefore, second phase pattern 15 may diffract laser beam 6 only in the short axis direction (y axis direction) of line beam 20.

The first refractive power of second phase pattern 15 for light 21 having the first order in the short axis direction (y axis direction) of line beam 20 is different from the second refractive power of second phase pattern 15 for light 22 having the second order in the short axis direction (y axis direction) of line beam 20. For example, the first refractive power may be greater than the second refractive power. Therefore, first focal plane 23 of light 21 having the first order is located at a position different from second focal plane 24 of light 22 having the second order on optical axis 11 of laser beam 6.

For example, second phase pattern 15 has a positive refractive power for light 21 having the first order (for example, the +1-order diffraction beam) in the short axis direction (y axis direction) of line beam 20. Second phase pattern 15 has a negative refractive power for light 22 having the second order (for example, the −1-order diffraction beam) in the short axis direction (y axis direction) of line beam 20. Due to the positive refractive power of first phase pattern 14 and the positive refractive power of second phase pattern 15 for light 21 having the first order, first focal plane 23 of light 21 having the first order is located close to diffractive optical device 10 (or the at least one diffractive optical element (diffractive optical element 12)) relative to focal plane 25 on optical axis 11 of laser beam 6 as shown in FIG. 4. On the other hand, due to the positive refractive power of first phase pattern 14 and the negative refractive power of second phase pattern 15 for light 22 having the second order, second focal plane 24 of light 22 having the second order is located distant away from diffractive optical device 10 (or the at least one diffractive optical element (diffractive optical element 12)) relative to focal plane 25 on optical axis 11 of laser beam 6 as shown in FIG. 4.

It should be noted that in the present specification, focal plane 25 is defined as a plane in which the length of a line beam formed only by first phase pattern 14 in the short axis direction (y axis direction) is minimum as in a below-described Comparative Example, among planes perpendicular to optical axis 11 (z axis). In the present specification, focal plane 25 may be referred to as "focal plane 25 of diffractive optical device 10". As shown in FIG. 4, focal plane 25 of diffractive optical device 10 is a plane defined by z=0. Focal plane 25 of diffractive optical device 10 is located on a surface of workpiece 30 or is located inside workpiece 30, for example.

Thus, first focal plane 23 of light 21 having the first order is located at a position different from second focal plane 24 of light 22 having the second order. Light 21 having the first order and light 22 having the second order are superimposed on each other on optical axis 11 of laser beam 6 (optical axis 11 of diffractive optical device 10) to cause interference therebetween. Therefore, the focal depth of line beam 20 can be made long.

Figure 16:
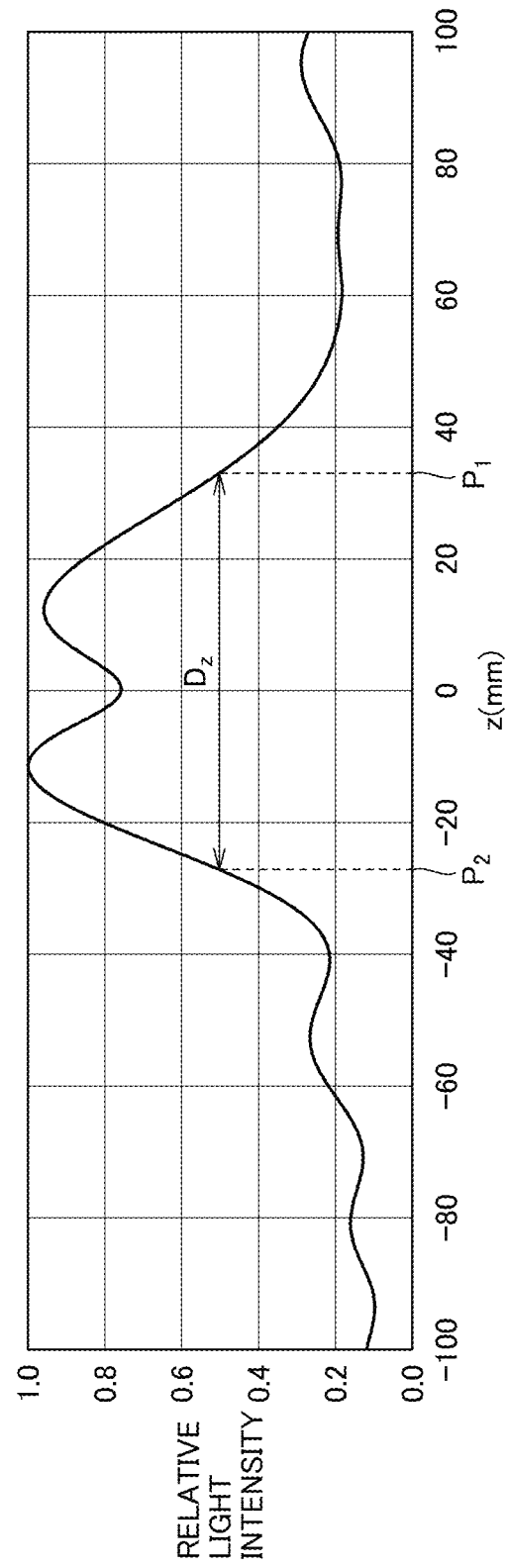
FIG. 16 is a diagram showing an optical axis direction relative light intensity profile of the line beam in Example 1.

For example, as shown in FIG. 16, focal depth $D_z$ of line beam 20 can be made long. In the present specification, focal depth $D_z$ is defined as a length thereof on optical axis 11 (z axis), in which the optical axis direction relative light intensity of line beam 20 is more than or equal to 0.5. The optical axis direction relative light intensity of line beam 20 is obtained by dividing the light intensity of line beam 20 on optical axis 11 (z axis) by the maximum light intensity of line beam 20 on optical axis 11 (z axis).

The optical axis direction relative light intensity of line beam 20 is preferably more than or equal to 0.5 between a first position $P_1$ and a second position $P_2$ in an optical axis direction relative light intensity profile of line beam 20. In the present specification, the optical axis direction relative light intensity profile refers to a distribution of optical axis direction relative light intensity on the optical axis (z axis). Therefore, the light intensity in a region irradiated with line beam 20 becomes more uniform. A variation in processing of workpiece 30 in the region irradiated with line beam 20 can be reduced. First position $P_1$ in the optical axis direction relative light intensity profile of line beam 20 is a position on optical axis 11 at which the optical axis direction relative light intensity of line beam 20 is 0.5 in the optical axis direction relative light intensity profile of line beam 20, and is a position furthest away from diffractive optical device 10 (or laser light source 5). Second position $P_2$ in the optical axis direction relative light intensity profile of line beam 20 is a position on optical axis 11 at which the optical axis direction relative light intensity of line beam 20 is 0.5 in the optical axis direction relative light intensity profile of line beam 20, and is a position closest to diffractive optical device 10 (or laser light source 5).

Figure 17:
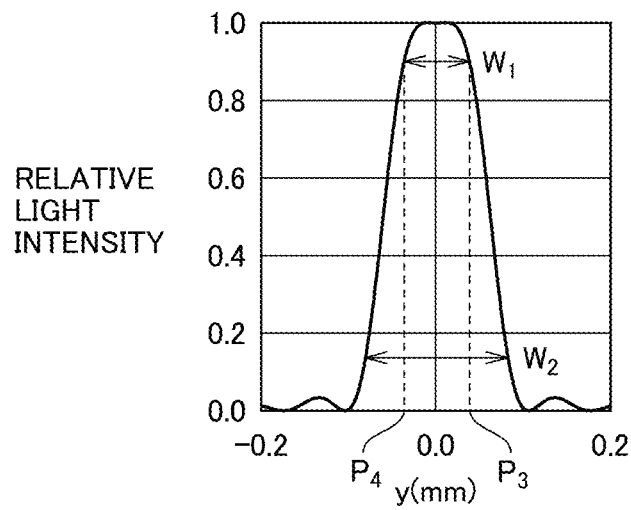
FIG. 17 is a diagram showing a short axis direction relative light intensity profile of the line beam in Example 1.

As shown in FIG. 17, the light intensity peak of line beam 20 on the short axis (y axis) of line beam 20 in focal plane 25 of diffractive optical device 10 is flattened. That is, the relative light intensity profile of line beam 20 on the short axis (y axis) of line beam 20 in focal plane 25 of diffractive optical device 10 (hereinafter, referred to as "short axis direction relative light intensity profile of line beam 20") has a flat top shape. Therefore, the light intensity in the region irradiated with line beam 20 becomes more uniform. The variation in processing of workpiece 30 in the region irradiated with line beam 20 can be reduced.

In the present specification, the short axis direction relative light intensity profile of line beam 20 refers to a distribution of short axis direction relative light intensity on the short axis (y axis) of line beam 20 in focal plane 25. The short axis direction relative light intensity of line beam 20 is obtained by dividing the light intensity of line beam 20 on the short axis (y axis) of line beam 20 in focal plane 25 by the maximum light intensity of line beam 20 on the short axis (y axis) of line beam 20 in focal plane 25.

The short axis direction relative light intensity profile of line beam 20 with a flat top shape means that a ratio $W_1/W_2$ of a 0.9 peak width $W_1$ (see FIG. 17) of the short axis direction relative light intensity profile of line beam 20 to a $1/e^2$ peak width $W_2$ (see FIG. 17) in the short axis direction relative light intensity profile of line beam 20 is more than or equal to 0.400, and that the short axis direction relative light intensity profile of line beam 20 is more than or equal to 0.9 between a third position $P_3$ (see FIG. 17) and a fourth position $P_4$ (see FIG. 17) in the short axis direction relative light intensity profile of line beam 20.

0.9 peak width $W_1$ of the short axis direction relative light intensity profile of line beam 20 is defined as a length thereof on the short axis (y axis) in focal plane 25, at which the short axis direction relative light intensity of line beam 20 is more than or equal to 0.9. $1/e^2$ peak width $W_2$ of the short axis direction relative light intensity profile of line beam 20 is defined as a length thereof on the short axis (y axis) in focal plane 25, at which the short axis direction relative light intensity of line beam 20 is more than or equal to $1/e^2$. Third position $P_3$ in the short axis direction relative light intensity profile of line beam 20 is a position at which the short axis direction relative light intensity of line beam 20 is 0.9 in the short axis direction relative light intensity profile of line beam 20, and is a position furthest away from optical axis 11 in the +y axis direction. Fourth position $P_4$ in the short axis direction relative light intensity profile of line beam 20 is a position at which the short axis direction relative light intensity of line beam 20 is 0.9 in the short axis direction relative light intensity profile of line beam 20, and is a position furthest away from optical axis 11 in the −y axis direction.

Diffractive optical device 10 of the present embodiment can reduce the diameter of laser beam 6 required to obtain the short axis direction relative light intensity profile of line beam 20 having a small short axis direction width close to the diffraction limit and having a flat top shape. Therefore, diffractive optical device 10 can be downsized. The cost of diffractive optical device 10 can be reduced. First phase pattern 14 and second phase pattern 15 can be formed with higher precision.

Figure 18:
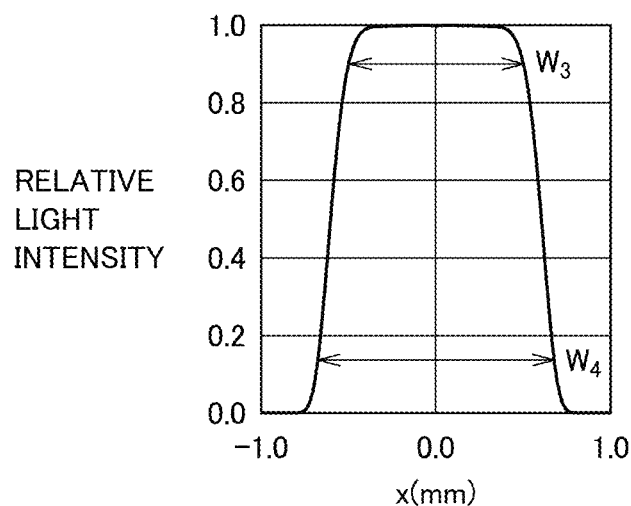
FIG. 18 is a diagram showing a long axis direction relative light intensity profile of the line beam in Example 1.

As shown in FIG. 18, the light intensity peak of line beam 20 on the long axis (x axis) of line beam 20 in focal plane 25 of diffractive optical device 10 is flattened. That is, the relative light intensity profile of line beam 20 on the long axis (x axis) of line beam 20 (hereinafter, referred to as "long axis direction relative light intensity profile of line beam 20") in focal plane 25 of diffractive optical device 10 has a flat top shape. For example, a ratio $W_3/W_4$ of a 0.9 peak width $W_3$ of the long axis direction relative light intensity profile of line beam 20 to a $1/e^2$ peak width $W_4$ of the long axis direction relative light intensity profile of line beam 20 is more than or equal to 0.400.

In the present specification, the long axis direction relative light intensity profile of line beam 20 refers to a distribution of long axis relative light intensity on the long axis (x axis) of line beam 20 in focal plane 25. The long axis relative light intensity of line beam 20 is obtained by dividing the light intensity of line beam 20 on the long axis (x axis) of line beam 20 in focal plane 25 by the maximum light intensity of line beam 20 on the long axis (x axis) of line beam 20 in focal plane 25. 0.9 peak width $W_3$ of the long axis direction relative light intensity profile of line beam 20 is defined as a length thereof on the long axis (x axis) in focal plane 25, at which the long axis relative light intensity of line beam 20 is more than or equal to 0.9. $1/e^2$ peak width $W_4$ of the long axis direction relative light intensity profile of line beam 20 is defined as a length thereof on the long axis (x axis) in focal plane 25, at which the long axis relative light intensity of line beam 20 is more than or equal to $1/e^2$.

An aspect ratio of line beam 20 is defined in focal plane 25. Specifically, the aspect ratio of line beam 20 is defined as a ratio $W_4/W_2$ of $1/e^2$ peak width $W_4$ (see FIG. 18) of the long axis direction relative light intensity profile of line beam 20 to $1/e^2$ peak width $W_2$ (see FIG. 17) of the short axis direction relative light intensity profile of line beam 20. An aspect ratio of laser beam 6 is also defined in the same manner as aspect ratio $W_4/W_2$ of line beam 20. For example, when laser beam 6 has a circular shape, the aspect ratio of laser beam 6 is 1.0.

In one example of the present embodiment, laser beam 6 has a circular cross sectional shape, the light intensity distribution of laser beam 6 in the cross section thereof is Gaussian distribution, laser beam 6 has a wavelength $\lambda$, light 21 having the first order is a +1-order diffraction beam, and light 22 having the second order is a −1-order diffraction beam. The $1/e^2$ beam diameter of laser beam 6 is defined as $\omega$. The $1/e^2$ beam diameter of laser beam 6 is a diameter of laser beam 6 with which the relative light intensity of laser beam 6 in the cross section thereof is $1/e^2$. The relative light intensity of laser beam 6 in the cross section thereof is obtained by dividing the light intensity of laser beam 6 in the cross section of laser beam 6 by the maximum light intensity of laser beam 6 in the cross section of laser beam 6 (the light intensity of laser beam 6 at the center of the cross section of laser beam 6).

First refractive power $P_{+1}$ of second phase pattern 15 for the +1-order diffraction beam in the short axis direction (y axis direction) of line beam 20 and second refractive power $P_{-1}$ of second phase pattern 15 for the −1-order diffraction beam in the short axis direction (y axis direction) of line beam 20 are given by the following formula (1):

$$P_{+1} = -P_{-1} = \lambda C/\omega^2 \tag{1}$$

Coefficient C may satisfy the below-described formula (2). Therefore, the optical axis direction relative light intensity of line beam 20 can be more than or equal to 0.5 between first position $P_1$ and second position $P_2$ in the optical axis direction relative light intensity profile of line beam 20 (see FIG. 19). The light intensity in the region irradiated with line beam 20 becomes more uniform. The variation in processing of workpiece 30 in the region irradiated with line beam 20 can be reduced.

$$0.0 < C \leq 2.6 \tag{2}$$

Coefficient C may satisfy the below-described formula (3). Therefore, the focal depth of diffractive optical device 10 of the present embodiment (see, for example, FIGS. 5 to 8) is 1.5 times or more as large as the focal depth of the diffractive optical device of the Comparative Example (see FIGS. 9 to 12) which does not include second phase pattern 15 (see FIG. 19). Even when laser beam 6 is more intensely converged in the short axis direction (y axis direction) of line beam 20 by using diffractive optical device 10, focal depth $D_z$ of line beam 20 can be made further longer.

$$1.4 \leq C \leq 2.6 \tag{3}$$

Coefficient C may satisfy the below-described formula (4). Therefore, with diffractive optical device 10 of the present embodiment, the short axis direction relative light intensity profile of line beam 20 with a flat top shape can be obtained. The light intensity in the region irradiated with line beam 20 becomes more uniform. The variation in processing of workpiece 30 in the region irradiated with line beam 20 can be reduced.

$$1.6 \leq C \leq 2.1 \tag{4}$$

In the above one example of the present embodiment, width d of central phase pattern 15a is given by the following formula (5):

$$d = \frac{1}{2}\left(\frac{8\omega^2}{C} - \lambda^2\right)^{1/2} \tag{5}$$

EXAMPLES

Examples 1 to 11, each of which is a specific example of the present embodiment, will be described in comparison to a Comparative Example. In each of Examples 1 to 11 and the Comparative Example, laser beam 6 has a circular cross sectional shape, the aspect ratio of laser beam 6 is 1.000, and $1/e^2$ beam diameter $\omega$ of laser beam 6 is 3.0 mm. The light intensity distribution of laser beam 6 in the cross section of laser beam 6 is Gaussian distribution. Wavelength $\lambda$ of laser beam 6 is 1070 nm. A focal distance f of diffractive optical device 10 is 250 mm. Focal distance f is a distance between diffractive optical device 10 and focal plane 25 in the optical axis direction (z axis direction). As shown in each of FIGS. 18, 24, 34, 44, 54, 64, 74, 84, 94, 104, 114, and 124, 0.9 peak width $W_3$ of the long axis direction relative light intensity profile of line beam 20 is 1.00 mm, and $1/e^2$ peak width $W_4$ of the long axis direction relative light intensity profile of line beam 20 is 1.35 mm.

Comparative Example

A diffractive optical element of the Comparative Example includes only a phase pattern shown in FIGS. 9 to 12. That is, the phase pattern of the Comparative Example is constituted of only a first phase pattern 14 of Example 1, and does not include a second phase pattern 15 of Example 1 shown in FIG. 13. Therefore, in the diffractive optical element of the Comparative Example, width d of central phase pattern 15a is regarded as being infinite. Since the diffractive optical element of the Comparative Example does not generate light 21 having the first order (for example, the +1-order diffraction beam) and light 22 having the second order (for example, the −1-order diffraction beam), coefficient C is regarded as zero.

Figure 20:
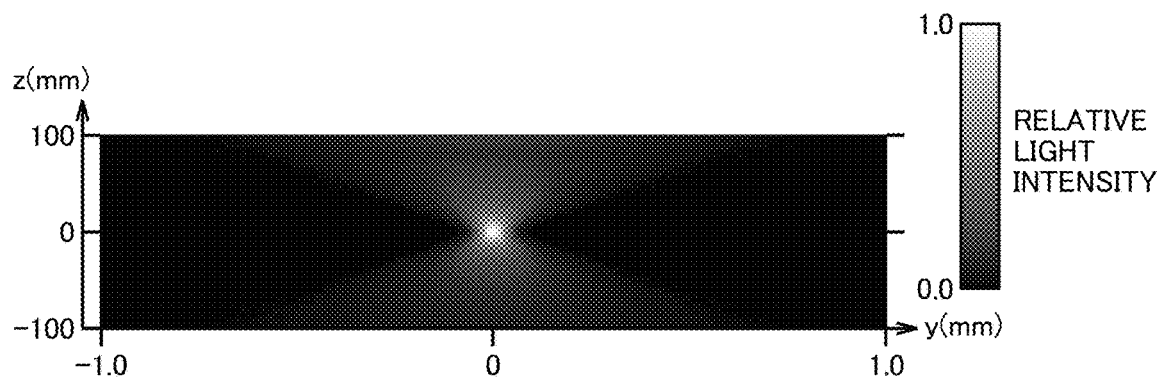
FIG. 20 is a diagram showing a defocus characteristic of the diffractive optical device of the Comparative Example in the yz plane.
Figure 21:
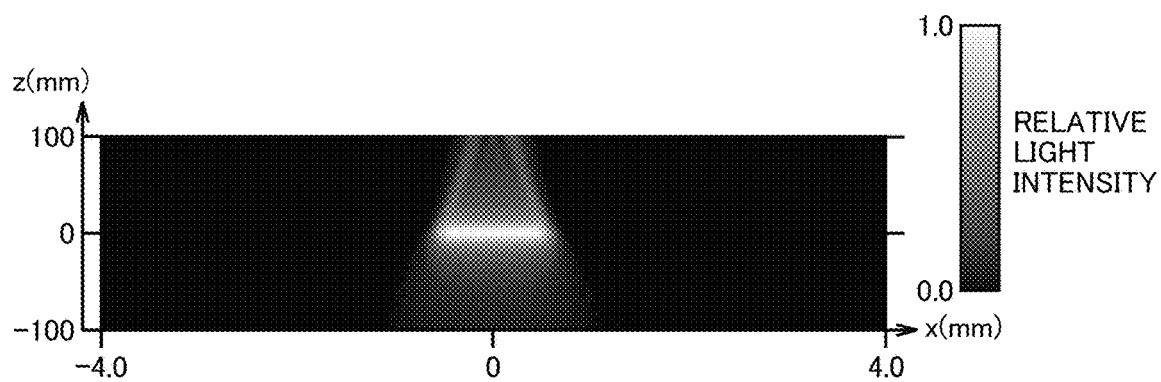
FIG. 21 is a diagram showing a defocus characteristic of the diffractive optical device of the Comparative Example in the xz plane.
Figure 22:
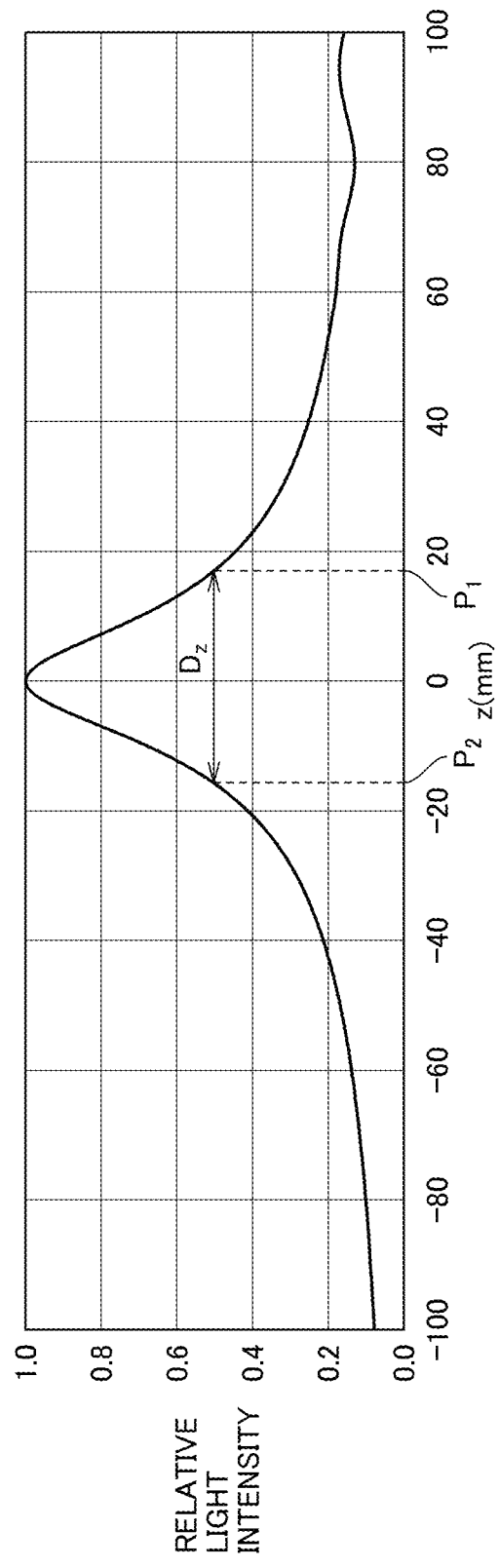
FIG. 22 is a diagram showing an optical axis direction relative light intensity profile of the line beam of the Comparative Example.

A line beam 20 having a defocus profile shown in FIGS. 20 and 21 is obtained by the diffractive optical element of the Comparative Example. Referring to FIG. 22, focal depth $D_z$ of line beam 20 is 33.0 mm. The relative light intensity on optical axis 11 in focal plane 25 (z=0) is 1.000. The optical axis direction relative light intensity of line beam 20 is more than or equal to 0.5 between first position $P_1$ and second position $P_2$ in the optical axis direction relative light intensity profile of line beam 20.

Figure 23:
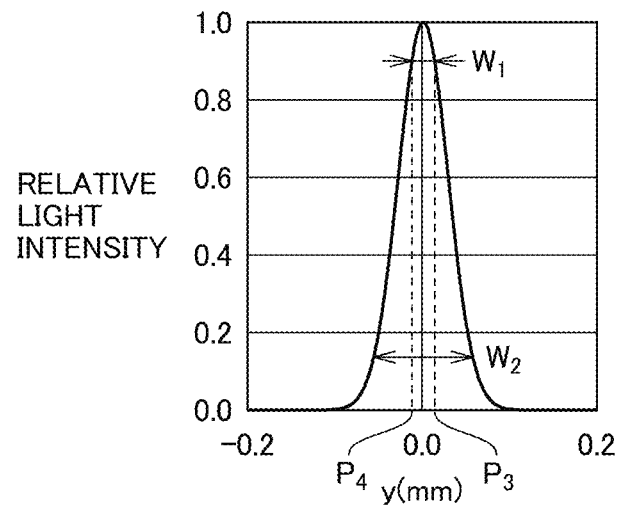
FIG. 23 is a diagram showing a short axis direction relative light intensity profile of the line beam of the Comparative Example.
Figure 24:
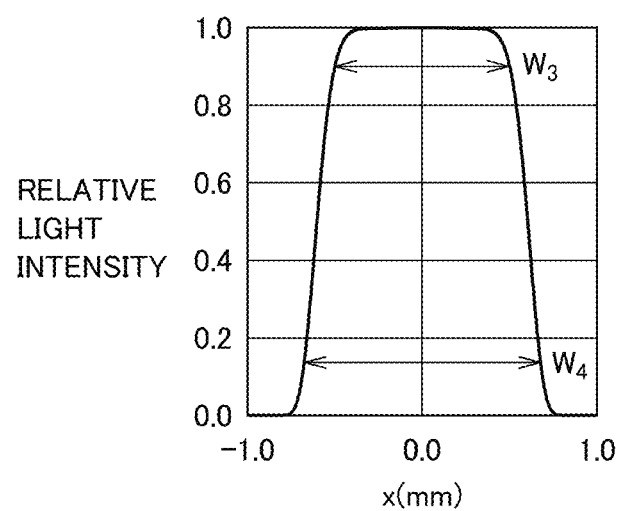
FIG. 24 is a diagram showing a long axis direction relative light intensity profile of the line beam of the Comparative Example.
Figure 25:
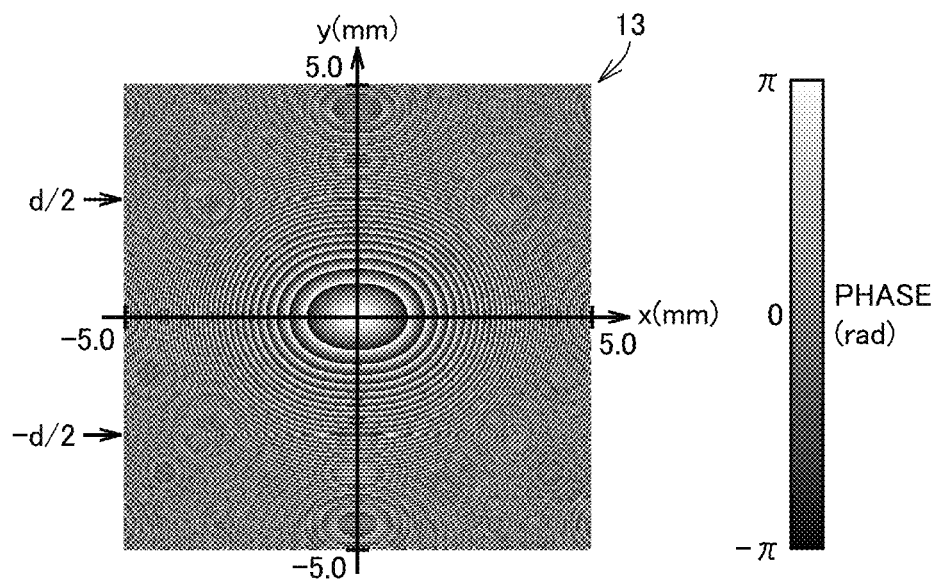
FIG. 25 is a diagram showing a phase pattern in Example 2.
Figure 26:
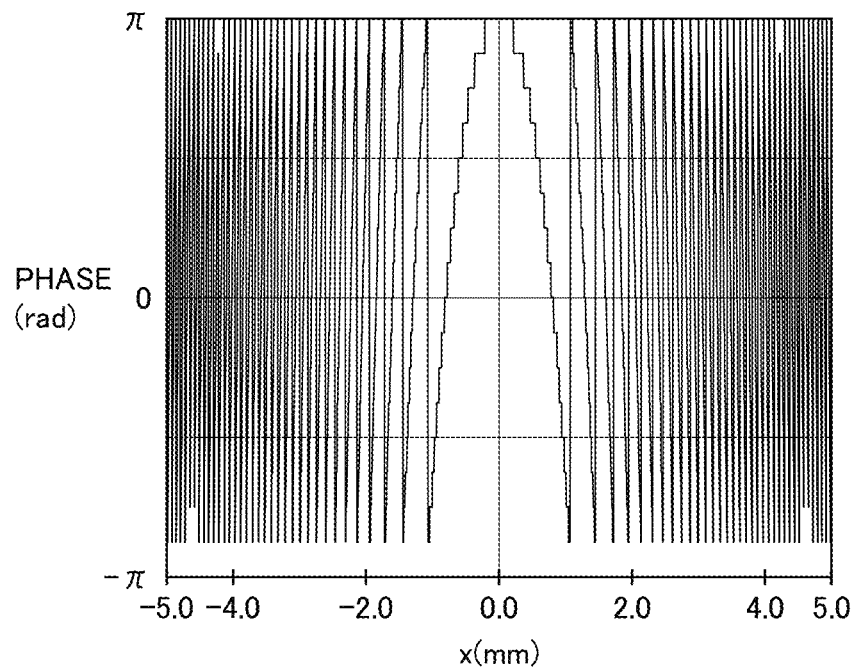
FIG. 26 is a diagram showing a phase pattern in the x axis direction at y=0.0 mm in Example 2.
Figure 27:
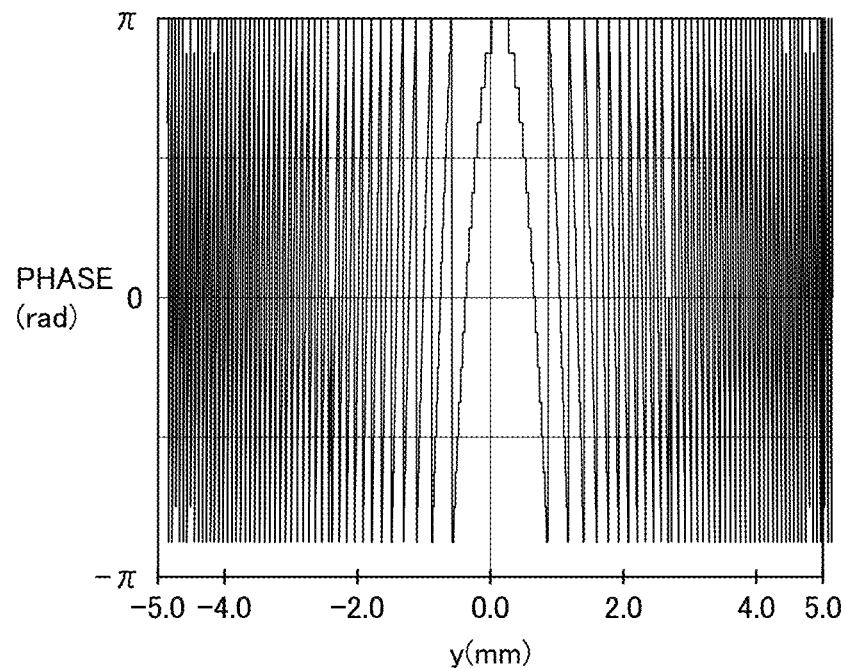
FIG. 27 is a diagram showing a phase pattern in they axis direction at x=0.0 mm in Example 2.
Figure 28:
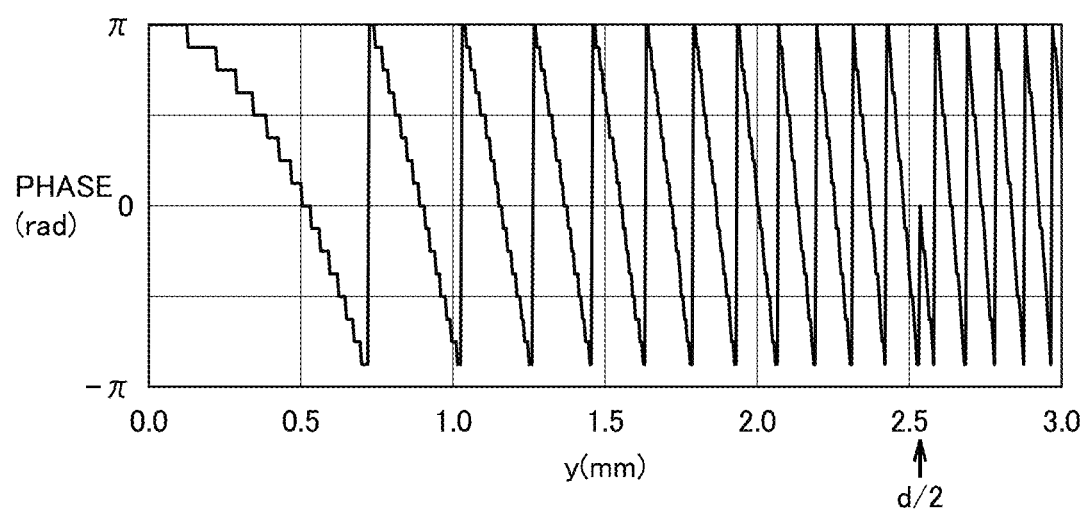
FIG. 28 is a partial enlarged view of a phase pattern in the y axis direction at x=0.0 mm in Example 2.

Referring to FIG. 23, 0.9 peak width $W_1$ of the short axis direction relative light intensity profile of line beam 20 is 0.026 mm, and $1/e^2$ peak width $W_2$ of the short axis direction relative light intensity profile of line beam 20 is 0.114 mm. Aspect ratio $W_4/W_2$ of line beam 20 is 11.84. Ratio $W_1/W_2$ is 0.228, which is less than 0.400. Therefore, the short axis direction relative light intensity of line beam 20 does not have a profile flat top shape.

Example 1

A diffractive optical element 12 of Example 1 includes phase pattern 13 shown in FIGS. 5 to 8. Phase pattern 13 of the present example is a phase pattern in which first phase pattern 14 shown in FIGS. 9 to 12 and second phase pattern 15 shown in FIG. 13 are overlapped with each other. Central phase pattern 15a of second phase pattern 15 provides a first optical phase of π to laser beam 6. Each of peripheral phase patterns 15b of second phase pattern 15 provides a second optical phase of 0 to laser beam 6. Since diffractive optical element 12 of the present example includes second phase pattern 15, diffractive optical element 12 generates a +1-order diffraction beam as light 21 having the first order and generates a −1-order diffraction beam as light 22 having the second order. In the present example, width d of central phase pattern 15a is 3.22 mm, and coefficient C is 1.74.

Figure 14:
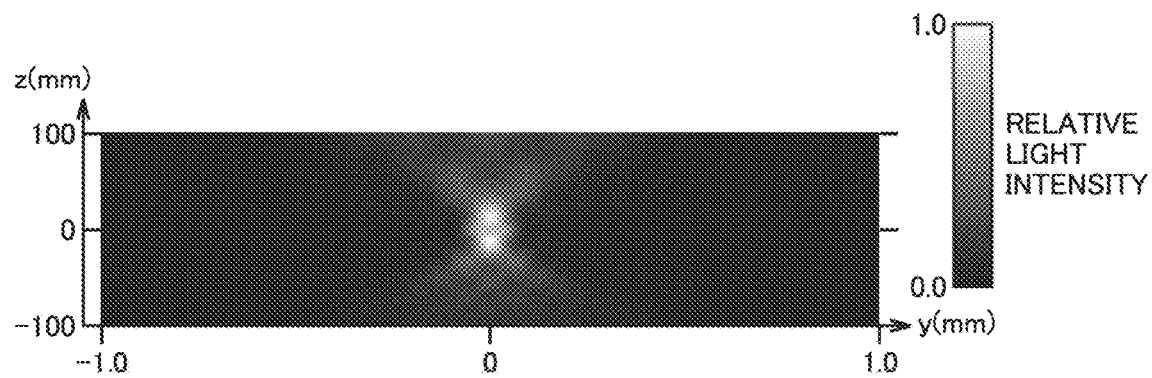
FIG. 14 is a diagram showing a defocus characteristic of the diffractive optical device of Example 1 in a yz plane (plane defined by the short axis direction of the line beam and an optical axis direction).
Figure 15:
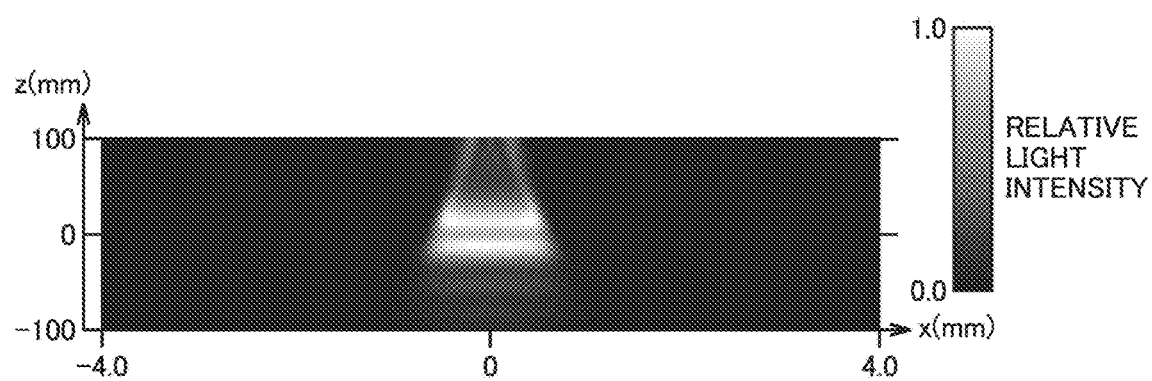
FIG. 15 is a diagram showing a defocus characteristic of the diffractive optical device of Example 1 in an xz plane (plane defined by the long axis direction of the line beam and the optical axis direction).

A line beam 20 having a defocus profile shown in FIGS. 14 and 15 is obtained by diffractive optical element 12 of the present example. Referring to FIG. 16, focal depth $D_z$ of line beam 20 is 60.4 mm. The relative light intensity on optical axis 11 in focal plane 25 (z=0) is 0.758. The optical axis direction relative light intensity of line beam 20 is more than or equal to 0.5 between first position $P_1$ and second position $P_2$ in the optical axis direction relative light intensity profile of line beam 20.

Referring to FIG. 17, 0.9 peak width $W_1$ of the short axis direction relative light intensity profile of line beam 20 is 0.075 mm, and $1/e^2$ peak width $W_2$ of the short axis direction relative light intensity profile of line beam 20 is 0.163 mm. Aspect ratio $W_4/W_2$ of line beam 20 is 8.28. Ratio $W_1/W_2$ is 0.460, which is more than or equal to 0.400. The short axis direction relative light intensity profile of line beam 20 is more than or equal to 0.9 between third position $P_3$ and fourth position $P_4$ in the short axis direction relative light intensity profile of line beam 20. Therefore, the short axis direction relative light intensity profile of line beam 20 has a flat top shape.

Example 2

Figure 29:
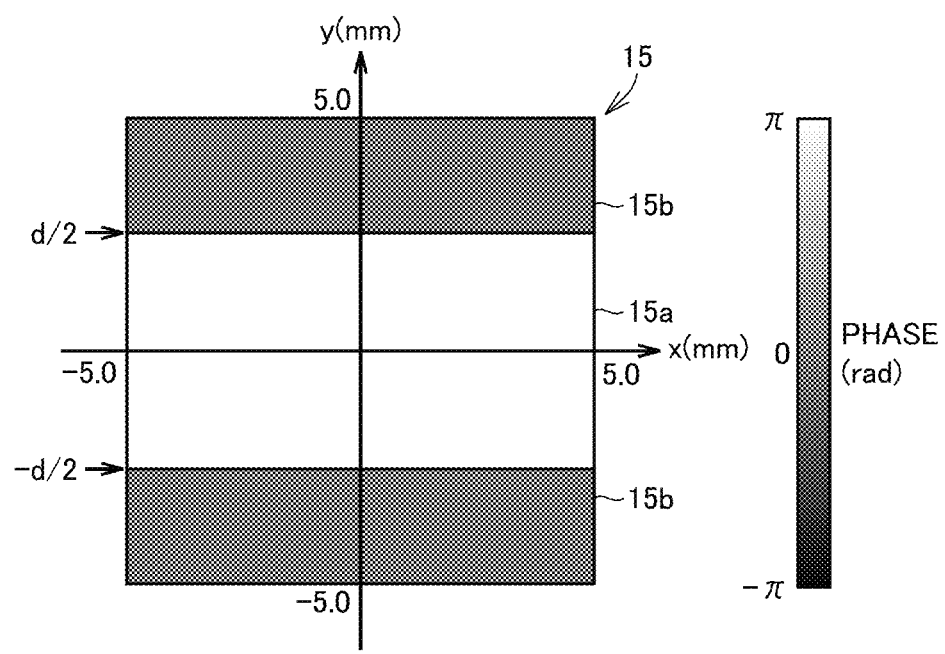
FIG. 29 is a diagram showing a second phase pattern in Example 2.

A diffractive optical element 12 of Example 2 includes a phase pattern 13 shown in FIGS. 25 to 28. Phase pattern 13 of the present example is a phase pattern in which first phase pattern 14 shown in FIGS. 9 to 12 and a second phase pattern 15 shown in FIG. 29 are overlapped with each other. Second phase pattern 15 of the present example is similar to second phase pattern 15 of Example 1, but width d of central phase pattern 15a of the present example is 5.07 mm. In the present example, coefficient C is 0.70.

Figure 30:
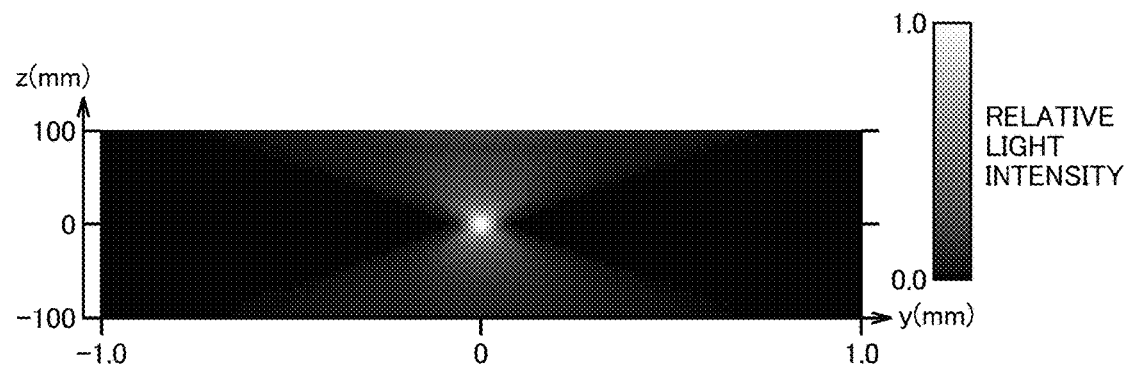
FIG. 30 is a diagram showing a defocus characteristic of the diffractive optical device of Example 2 in the yz plane.
Figure 31:
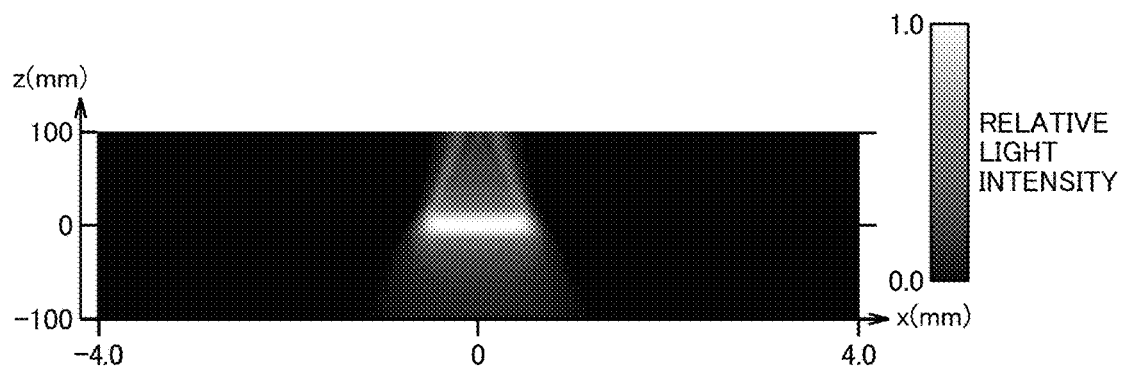
FIG. 31 is a diagram showing a defocus characteristic of the diffractive optical device of Example 2 in the xz plane.
Figure 32:
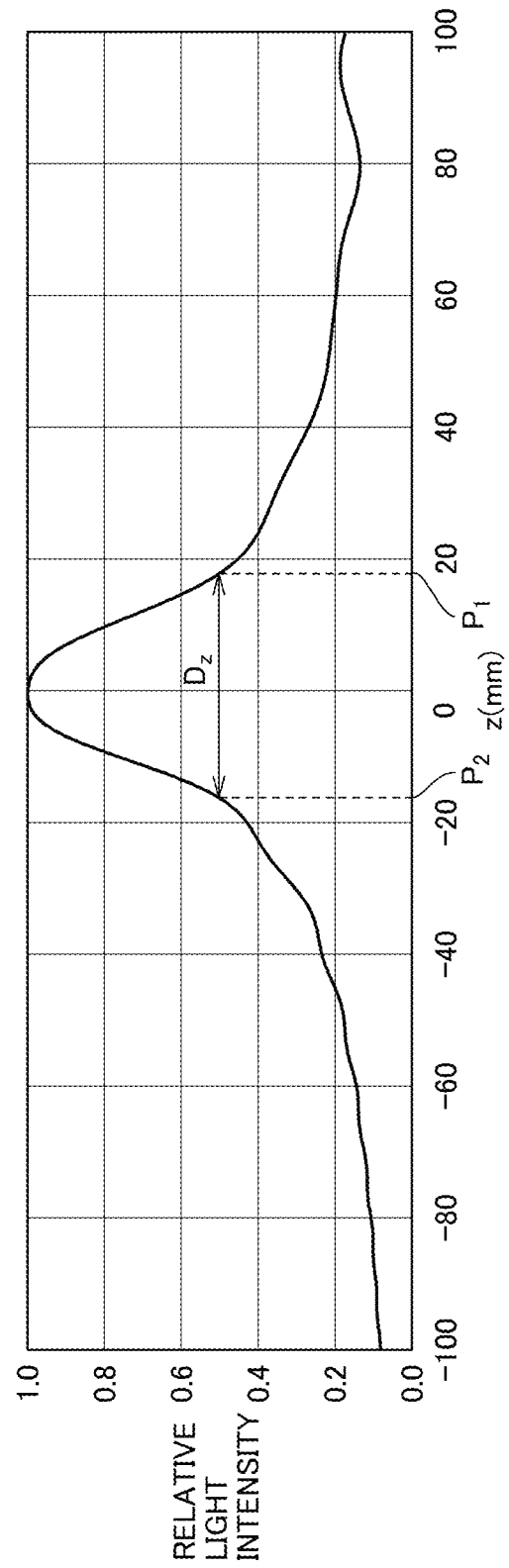
FIG. 32 is a diagram showing an optical axis direction relative light intensity profile of the line beam in Example 2.

A line beam 20 having a defocus profile shown in FIGS. 30 and 31 is obtained by diffractive optical element 12 of the present example. Referring to FIG. 32, focal depth $D_z$ of line beam 20 is 34.2 mm. The relative light intensity on optical axis 11 in focal plane 25 (z=0) is 0.999. The optical axis direction relative light intensity of line beam 20 is more than or equal to 0.5 between first position $P_1$ and second position $P_2$ in the optical axis direction relative light intensity profile of line beam 20.

Figure 33:
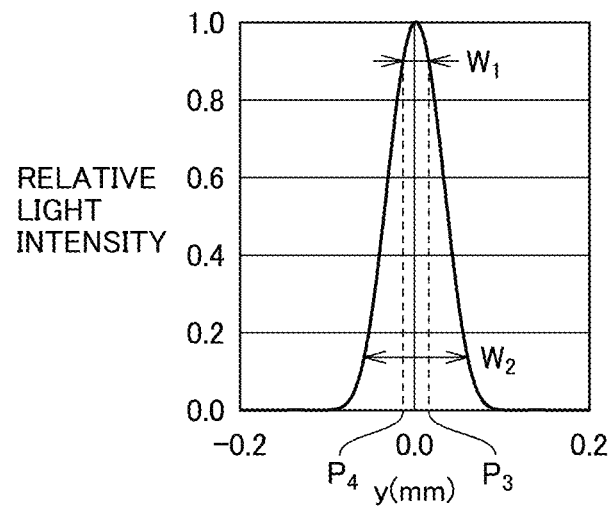
FIG. 33 is a diagram showing a short axis direction relative light intensity profile of the line beam in Example 2.
Figure 34:
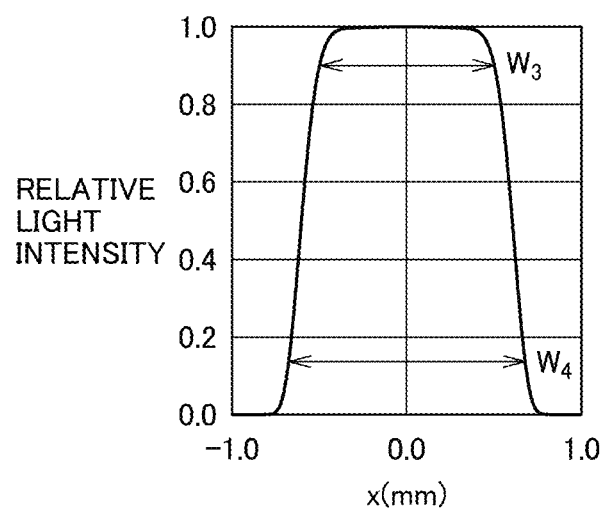
FIG. 34 is a diagram showing a long axis direction relative light intensity profile of the line beam in Example 2.
Figure 35:
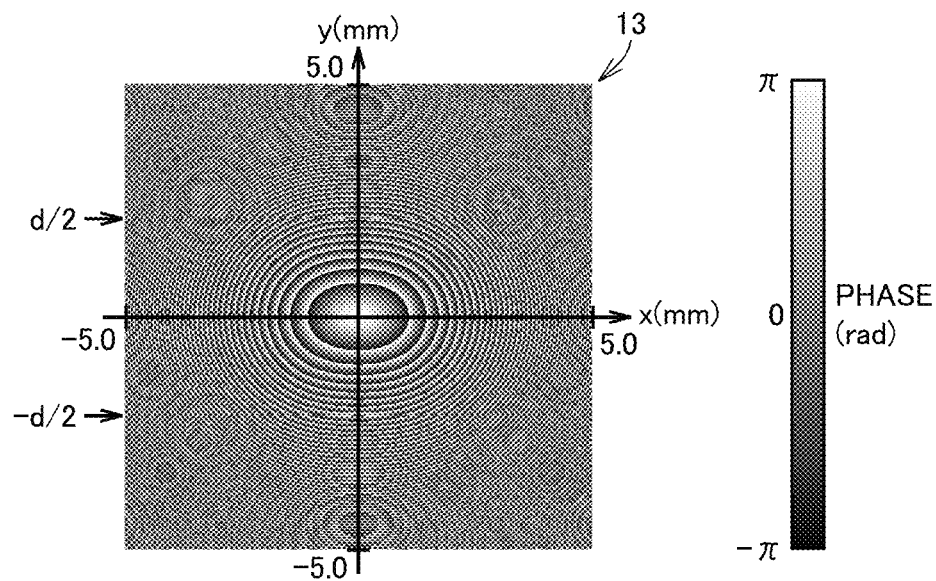
FIG. 35 is a diagram showing a phase pattern in Example 3.
Figure 36:
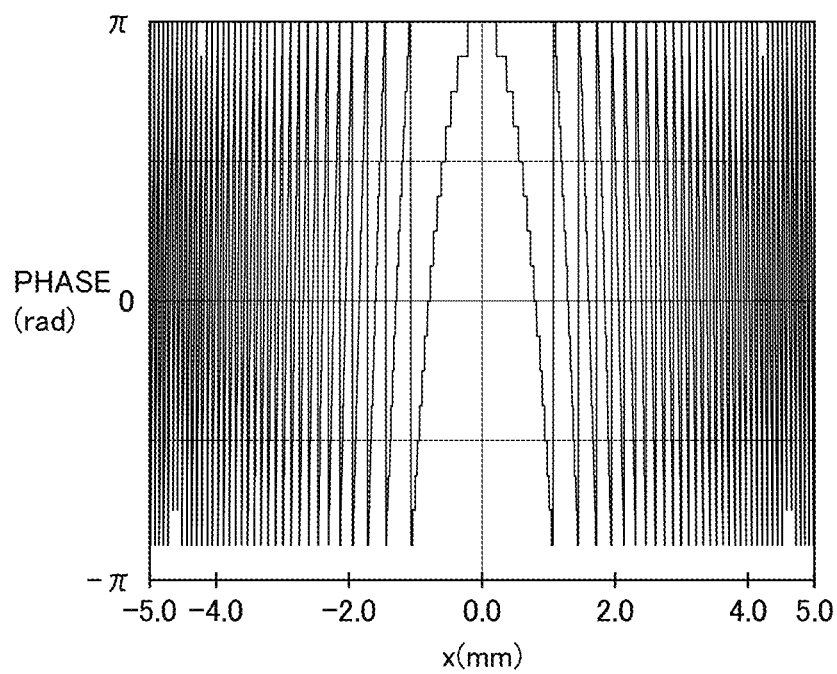
FIG. 36 is a diagram showing a phase pattern in the x axis direction at y=0.0 mm in Example 3.
Figure 37:
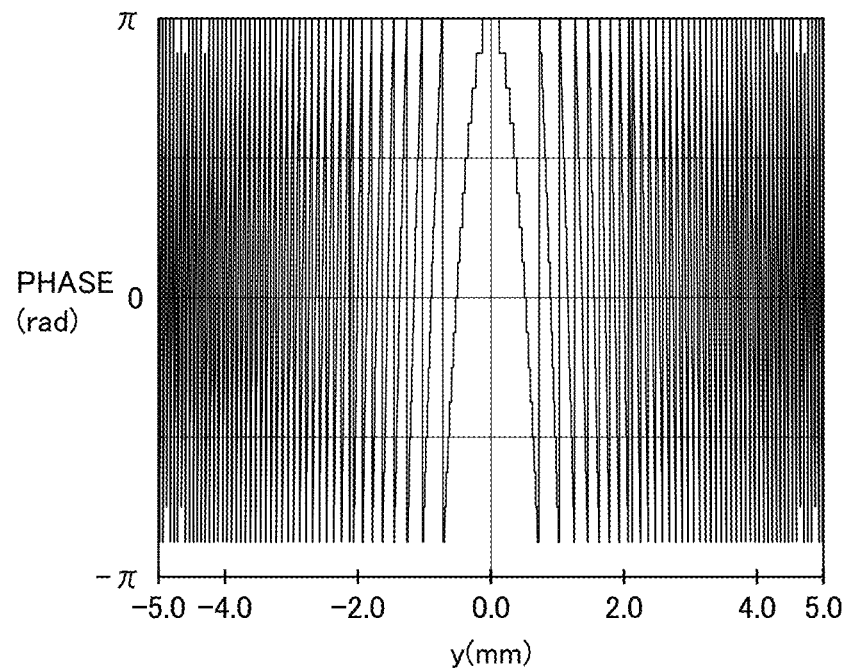
FIG. 37 is a diagram showing a phase pattern in the y axis direction at x=0.0 mm in Example 3.
Figure 38:
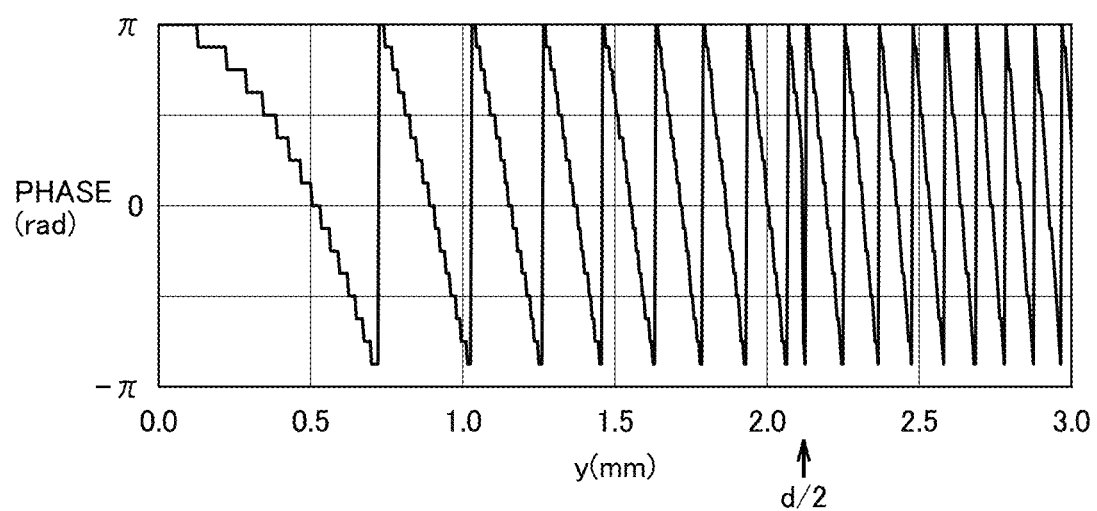
FIG. 38 is a partial enlarged view of a phase pattern in the y axis direction at x=0.0 mm in Example 3.

Referring to FIG. 33, 0.9 peak width $W_1$ of the short axis direction relative light intensity profile of line beam 20 is 0.029 mm, and $1/e^2$ peak width $W_2$ of the short axis direction relative light intensity profile of line beam 20 is 0.119 mm. Aspect ratio $W_4/W_2$ of line beam 20 is 11.34. Ratio $W_1/W_2$ is 0.244, which is less than 0.400. Therefore, the short axis direction relative light intensity profile of line beam 20 does not have a flat top shape.

Example 3

Figure 39:
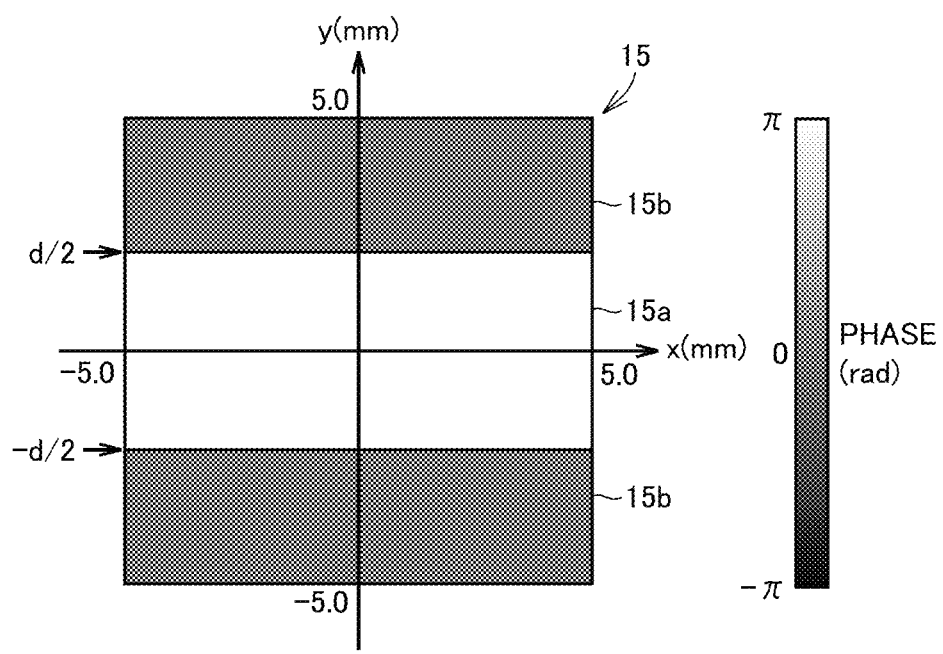
FIG. 39 is a diagram showing a second phase pattern in Example 3.

A diffractive optical element 12 of Example 3 includes a phase pattern 13 shown in FIGS. 35 to 38. Phase pattern 13 of the present example is a phase pattern in which first phase pattern 14 shown in FIGS. 9 to 12 and a second phase pattern 15 shown in FIG. 39 are overlapped with each other. Second phase pattern 15 of the present example is similar to second phase pattern 15 of Example 1, but width d of central phase pattern 15a of the present example is 4.24 mm. In the present example, coefficient C is 1.00.

Figure 40:
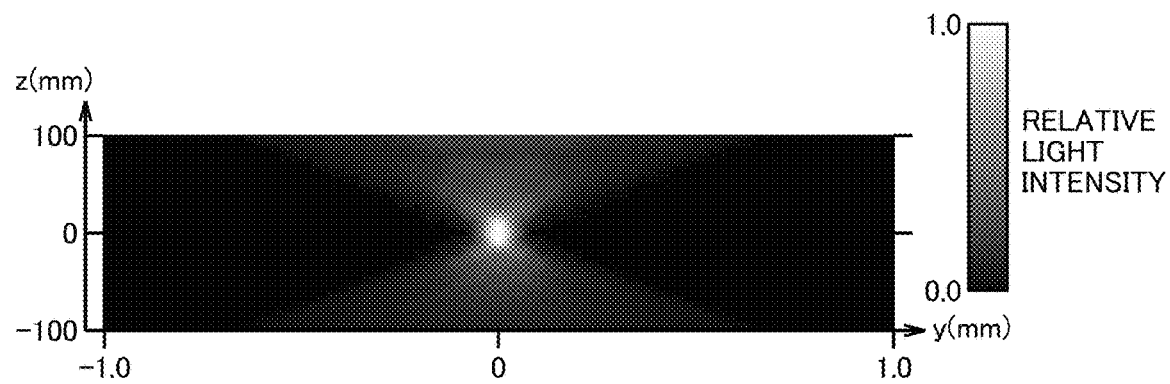
FIG. 40 is a diagram showing a defocus characteristic of the diffractive optical device of Example 3 in the yz plane.
Figure 41:
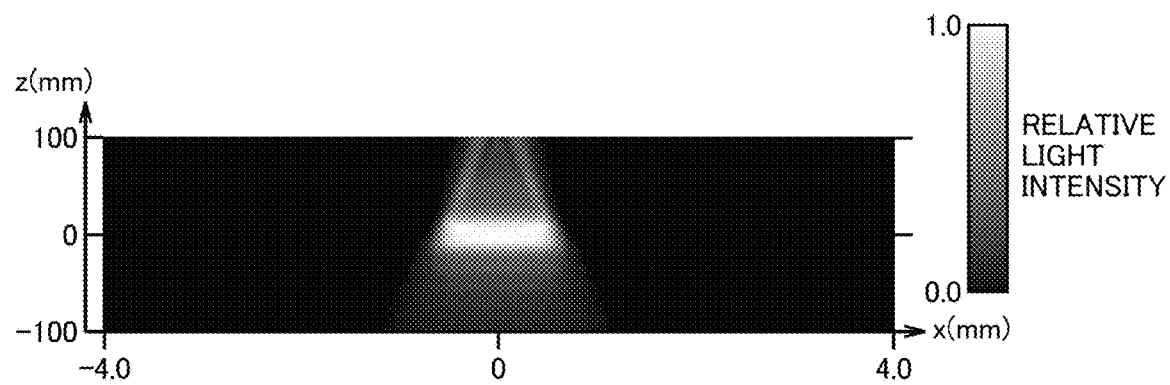
FIG. 41 is a diagram showing a defocus characteristic of the diffractive optical device of Example 3 in the xz plane.
Figure 42:
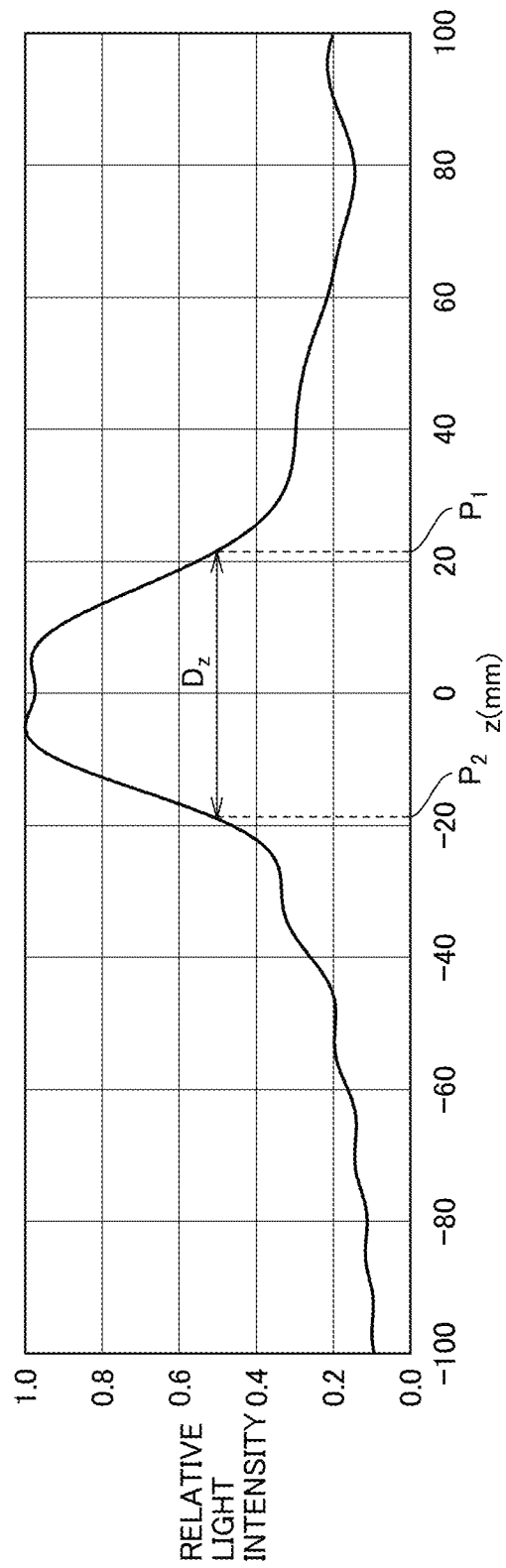
FIG. 42 is a diagram showing an optical axis direction relative light intensity profile of the line beam in Example 3.

A line beam 20 having a defocus profile shown in FIGS. 40 and 41 is obtained by diffractive optical element 12 of the present example. Referring to FIG. 42, focal depth $D_z$ of line beam 20 is 40.6 mm. The relative light intensity on optical axis 11 in focal plane 25 (z=0) is 0.974. The optical axis direction relative light intensity of line beam 20 is more than or equal to 0.5 between first position $P_1$ and second position $P_2$ in the optical axis direction relative light intensity profile of line beam 20.

Figure 43:
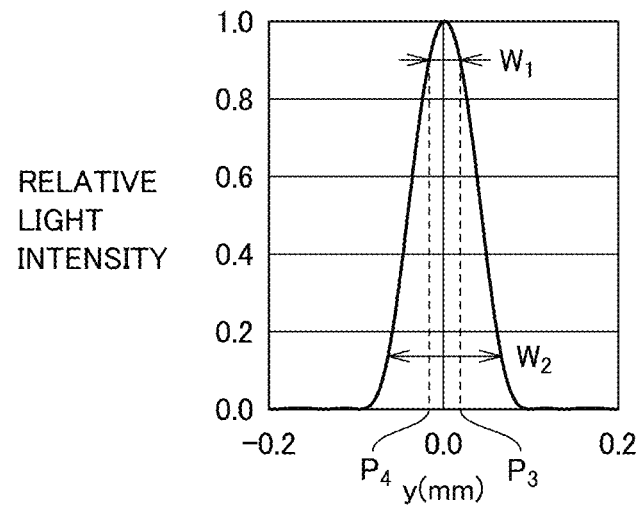
FIG. 43 is a diagram showing a short axis direction relative light intensity profile of the line beam in Example 3.
Figure 44:
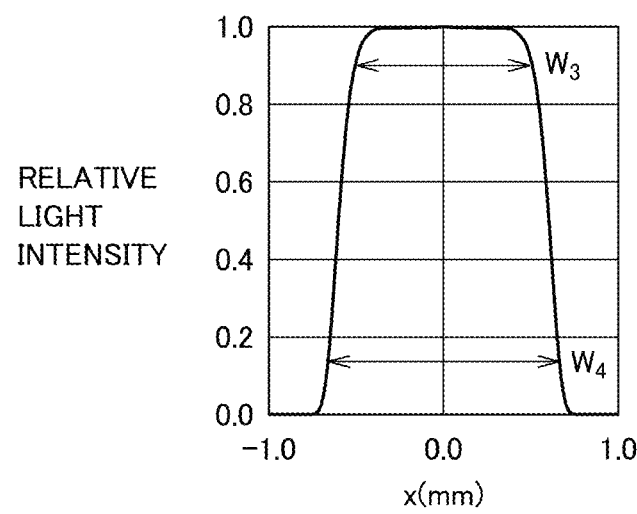
FIG. 44 is a diagram showing a long axis direction relative light intensity profile of the line beam in Example 3.
Figure 45:
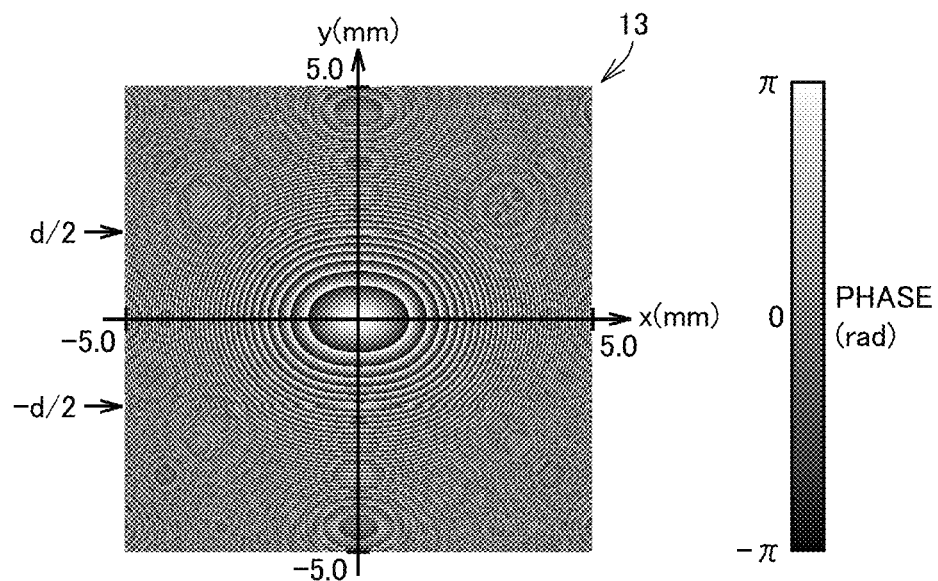
FIG. 45 is a diagram showing a phase pattern in Example 4.
Figure 46:
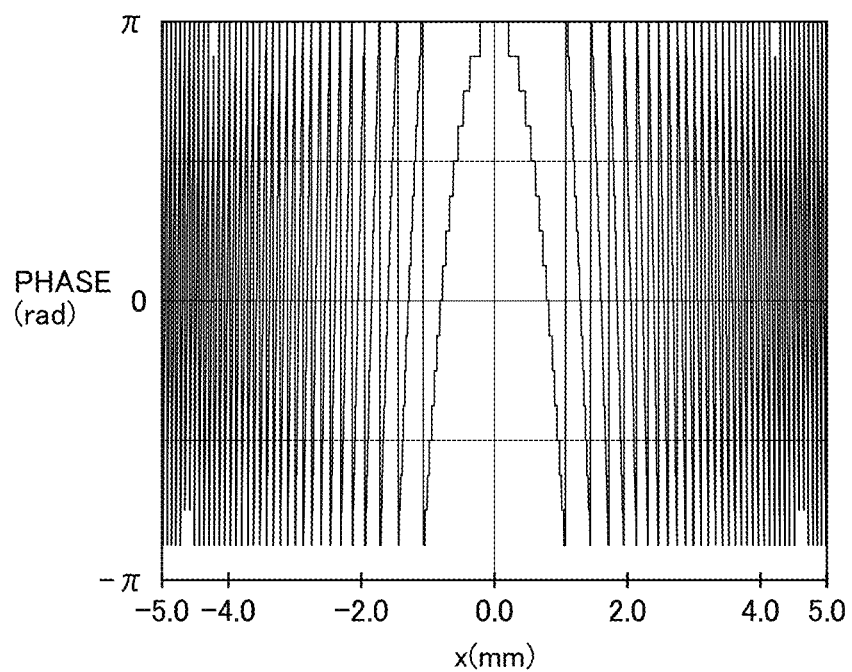
FIG. 46 is a diagram showing a phase pattern in the x axis direction at y=0.0 mm in Example 4.
Figure 47:
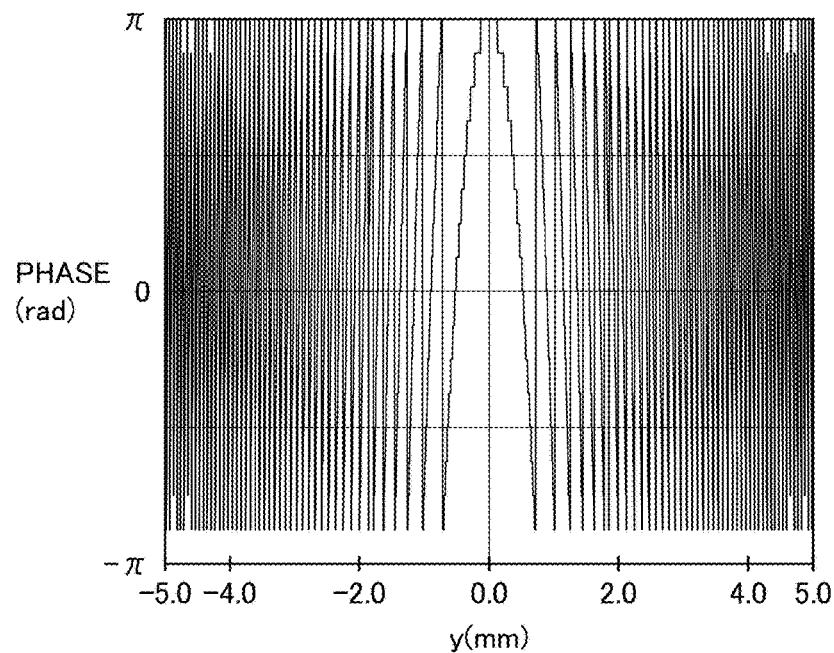
FIG. 47 is a diagram showing a phase pattern in the y axis direction at x=0.0 mm in Example 4.
Figure 48:
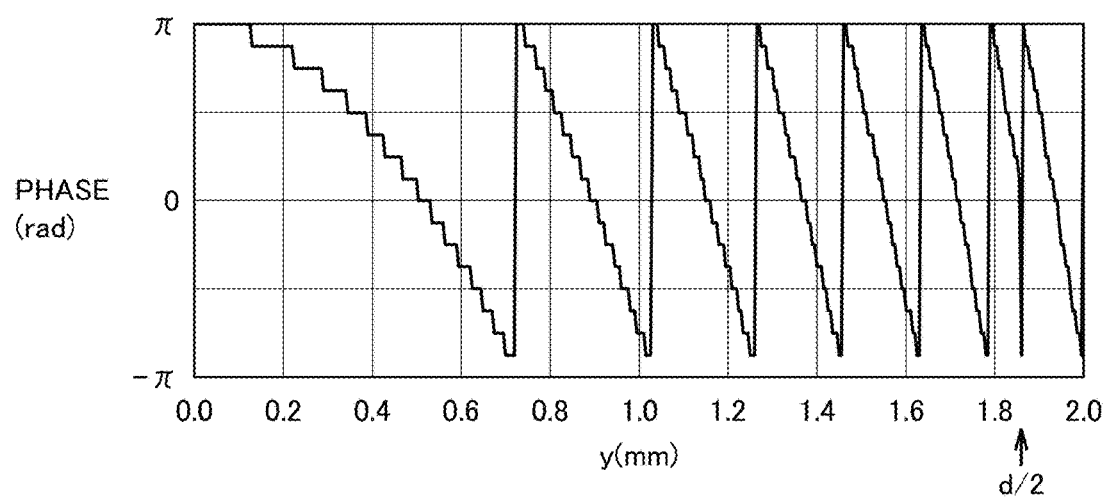
FIG. 48 is a partial enlarged view of a phase pattern in the y axis direction at x=0.0 mm in Example 4.

Referring to FIG. 43, 0.9 peak width $W_1$ of the short axis direction relative light intensity profile of line beam 20 is 0.035 mm, and $1/e^2$ peak width $W_2$ of the short axis direction relative light intensity profile of line beam 20 is 0.130 mm. Aspect ratio $W_4/W_2$ of line beam 20 is 10.38. Ratio $W_1/W_2$ is 0.269, which is less than 0.400. Therefore, the short axis direction relative light intensity profile of line beam 20 does not have a flat top shape.

Example 4

Figure 49:
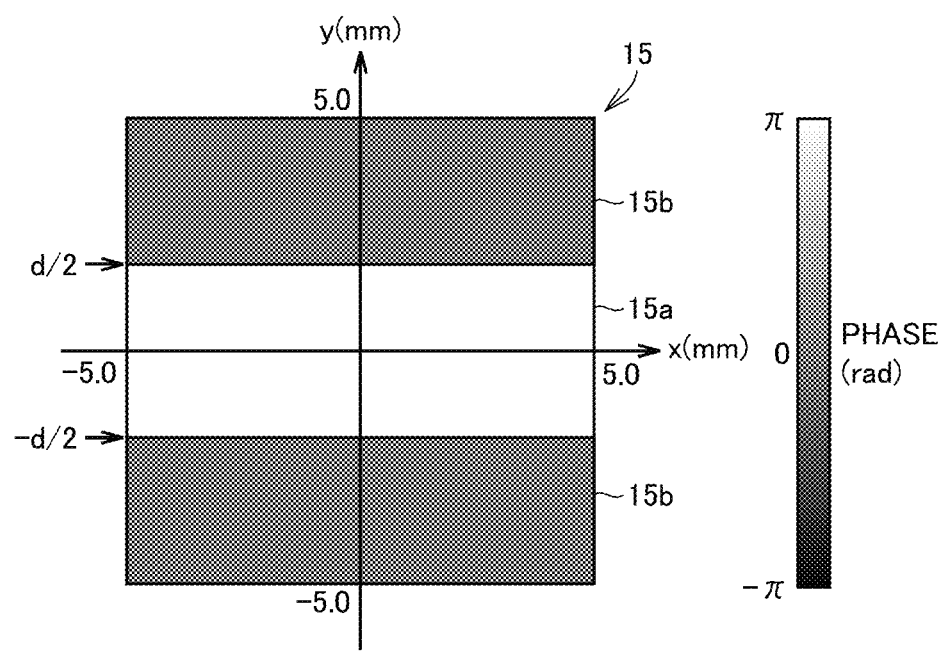
FIG. 49 is a diagram showing a second phase pattern in Example 4.

A diffractive optical element 12 of Example 4 includes a phase pattern 13 shown in FIGS. 45 to 48. Phase pattern 13 of the present example is a phase pattern in which first phase pattern 14 shown in FIGS. 9 to 12 and a second phase pattern 15 shown in FIG. 49 are overlapped with each other. Second phase pattern 15 of the present example is similar to second phase pattern 15 of Example 1, but width d of central phase pattern 15a of the present example is 3.72 mm. In the present example, coefficient C is 1.30.

Figure 50:
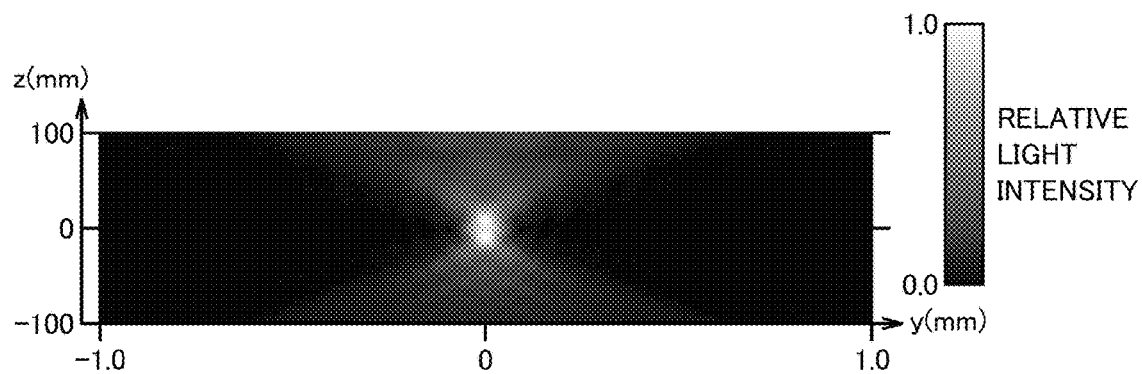
FIG. 50 is a diagram showing a defocus characteristic of the diffractive optical device of Example 4 in the yz plane.
Figure 51:
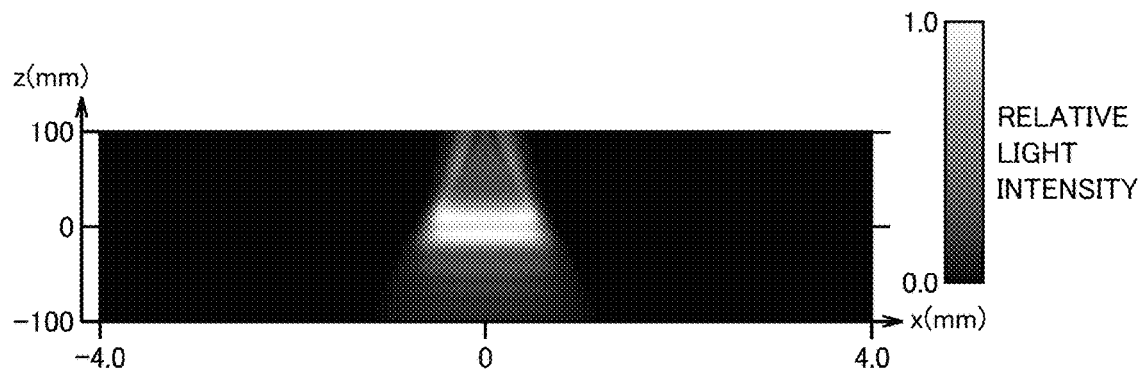
FIG. 51 is a diagram showing a defocus characteristic of the diffractive optical device of Example 4 in the xz plane.
Figure 52:
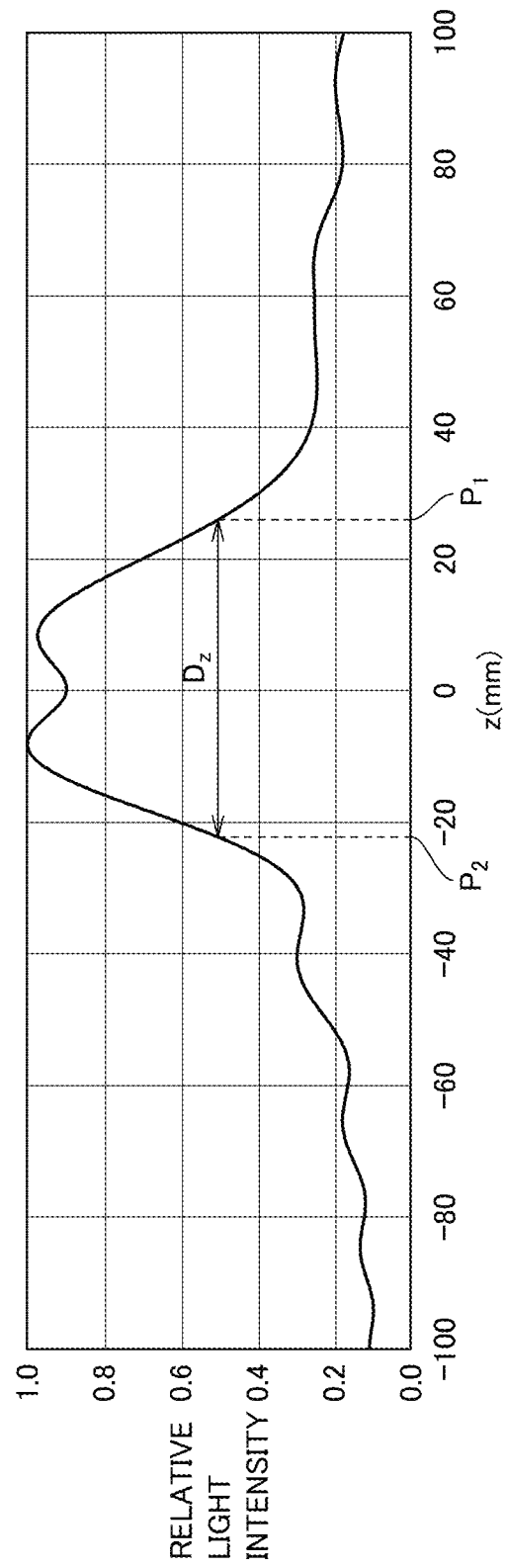
FIG. 52 is a diagram showing an optical axis direction relative light intensity profile of the line beam in Example 4.

A line beam 20 having a defocus profile shown in FIGS. 50 and 51 is obtained by diffractive optical element 12 of the present example. Referring to FIG. 52, focal depth $D_z$ of line beam 20 is 48.4 mm. The relative light intensity on optical axis 11 in focal plane 25 (z=0) is 0.897. The optical axis direction relative light intensity of line beam 20 is more than or equal to 0.5 between first position $P_1$ and second position $P_2$ in the optical axis direction relative light intensity profile of line beam 20.

Figure 53:
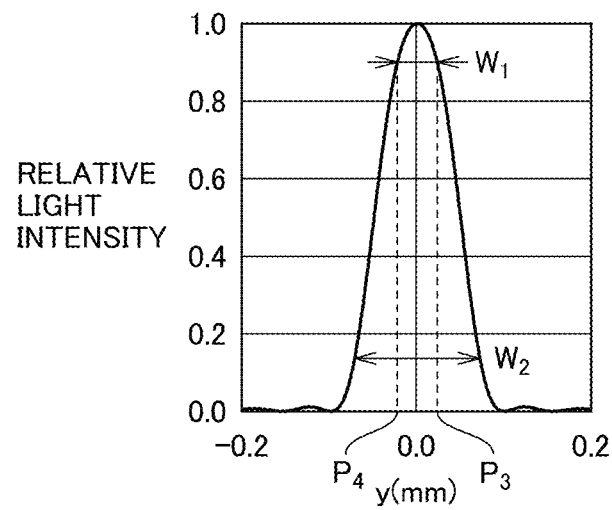
FIG. 53 is a diagram showing a short axis direction relative light intensity profile of the line beam in Example 4.
Figure 54:
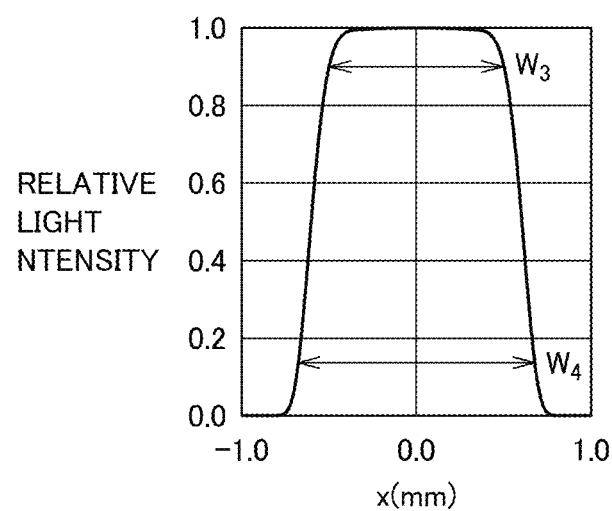
FIG. 54 is a diagram showing a long axis direction relative light intensity profile of the line beam in Example 4.
Figure 55:
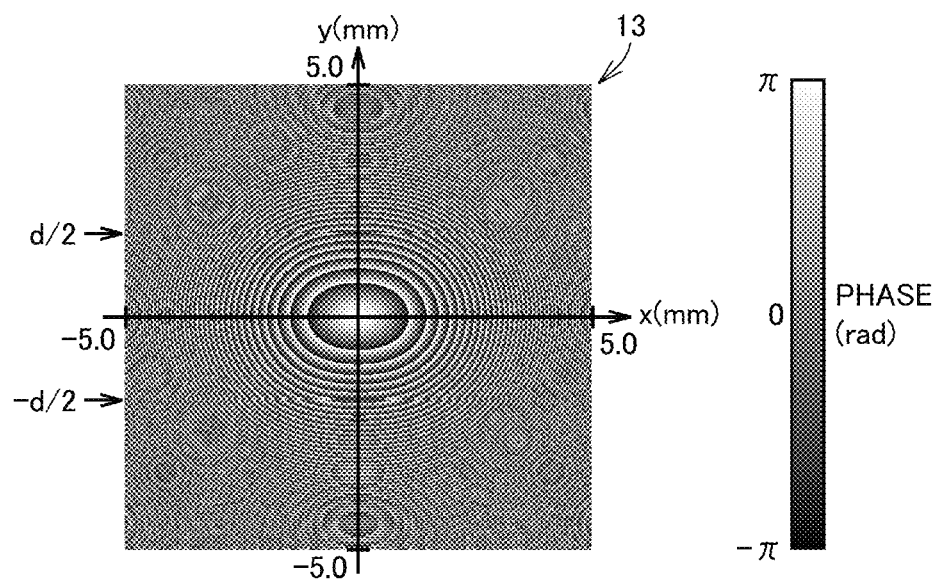
FIG. 55 is a diagram showing a phase pattern in Example 5.
Figure 56:
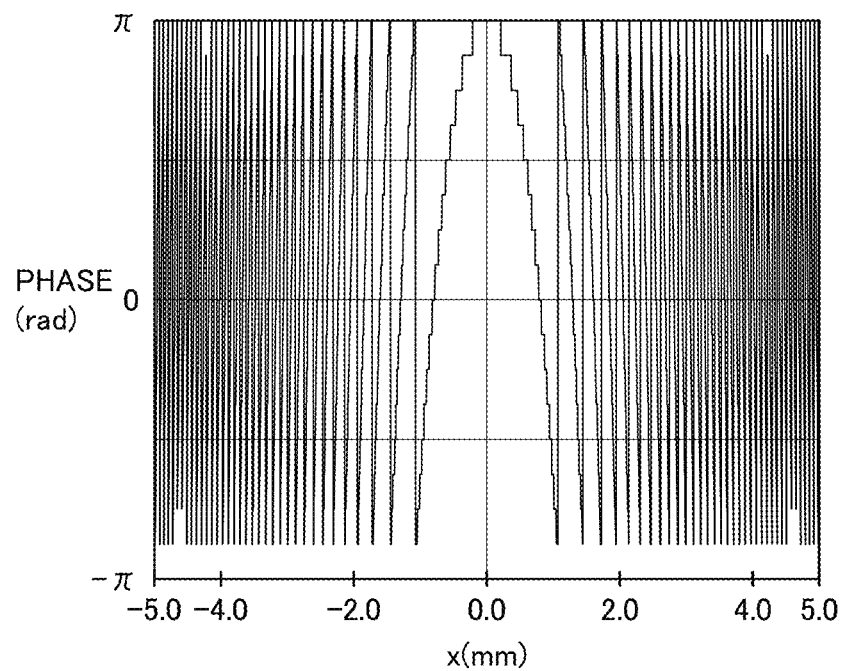
FIG. 56 is a diagram showing a phase pattern in the x axis direction at y=0.0 mm in Example 5.
Figure 57:
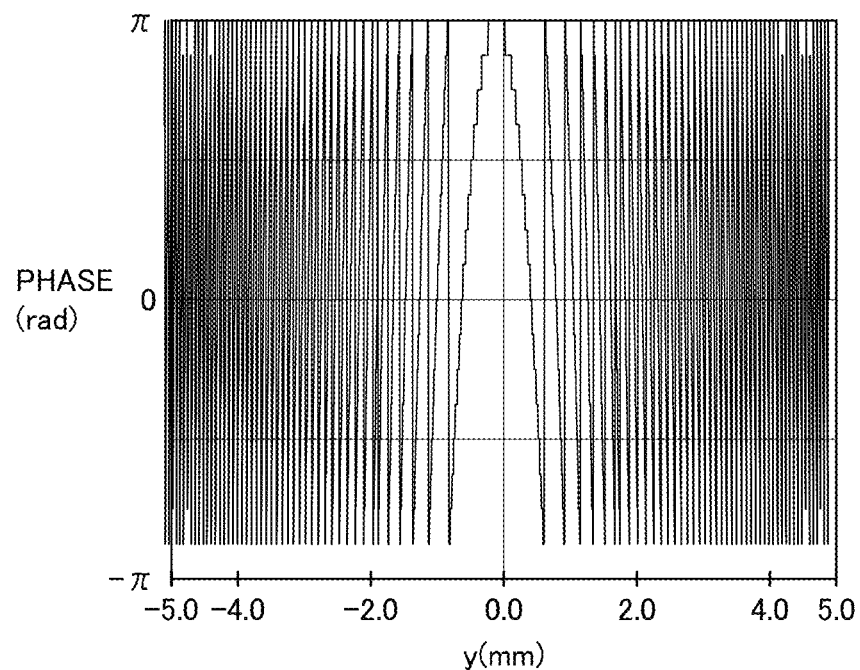
FIG. 57 is a diagram showing a phase pattern in the y axis direction at x=0.0 mm in Example 5.
Figure 58:
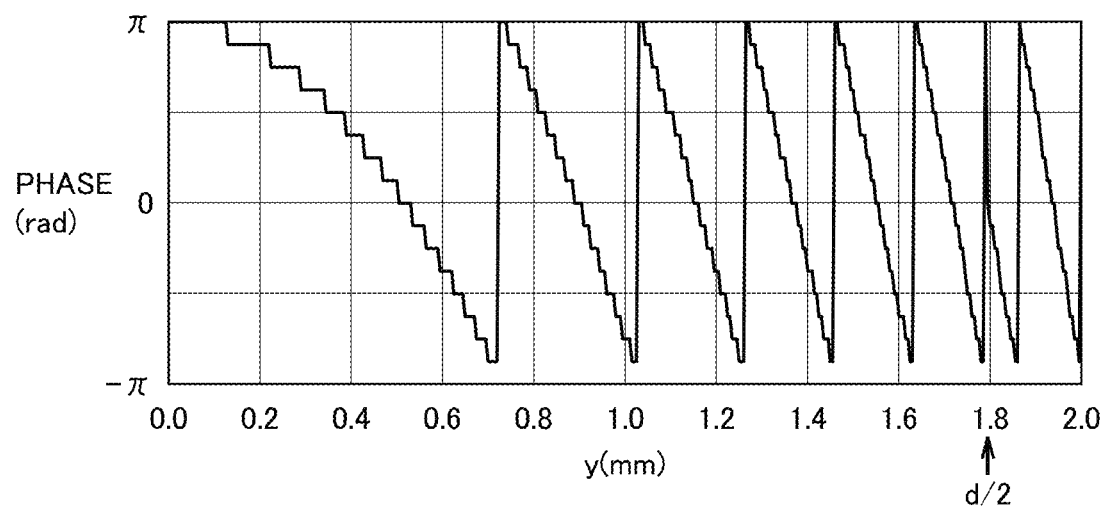
FIG. 58 is a partial enlarged view of a phase pattern in the y axis direction at x=0.0 mm in Example 5.

Referring to FIG. 53, 0.9 peak width $W_1$ of the short axis direction relative light intensity profile of line beam 20 is 0.045 mm, and $1/e^2$ peak width $W_2$ of the short axis direction relative light intensity profile of line beam 20 is 0.143 mm. Aspect ratio $W_4/W_2$ of line beam 20 is 9.44. Ratio $W_1/W_2$ is 0.315, which is less than 0.400. Therefore, the short axis direction relative light intensity profile of line beam 20 does not have a flat top shape.

Example 5

Figure 59:
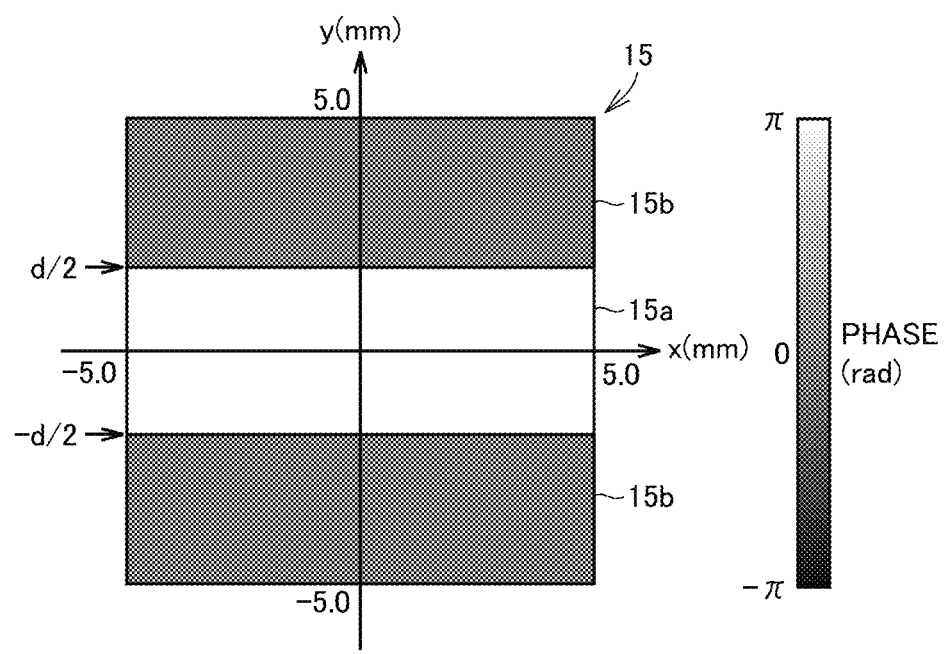
FIG. 59 is a diagram showing a second phase pattern in Example 5.

A diffractive optical element 12 of Example 5 includes a phase pattern 13 shown in FIGS. 55 to 58. Phase pattern 13 of the present example is a phase pattern in which first phase pattern 14 shown in FIGS. 9 to 12 and a second phase pattern 15 shown in FIG. 59 are overlapped with each other. Second phase pattern 15 of the present example is similar to second phase pattern 15 of Example 1, but width d of central phase pattern 15a of the present example is 3.59 mm. In the present example, coefficient C is 1.40.

Figure 60:
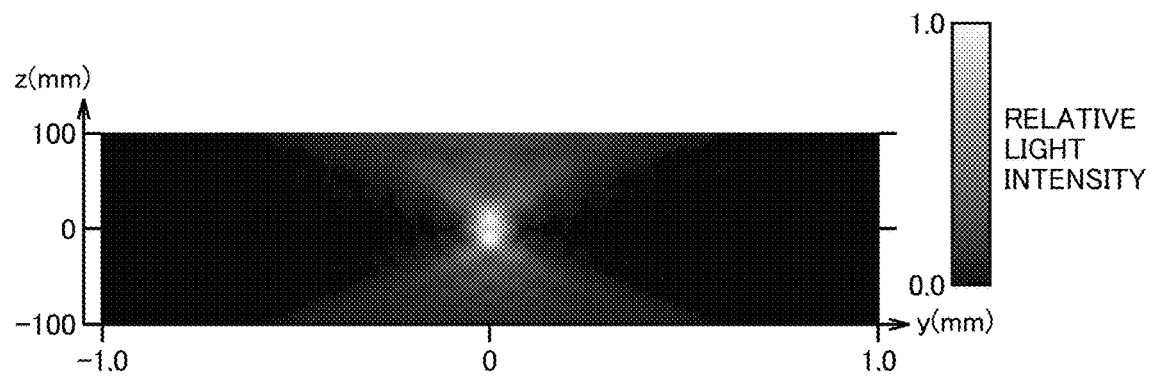
FIG. 60 is a diagram showing a defocus characteristic of the diffractive optical device of Example 5 in the yz plane.
Figure 61:
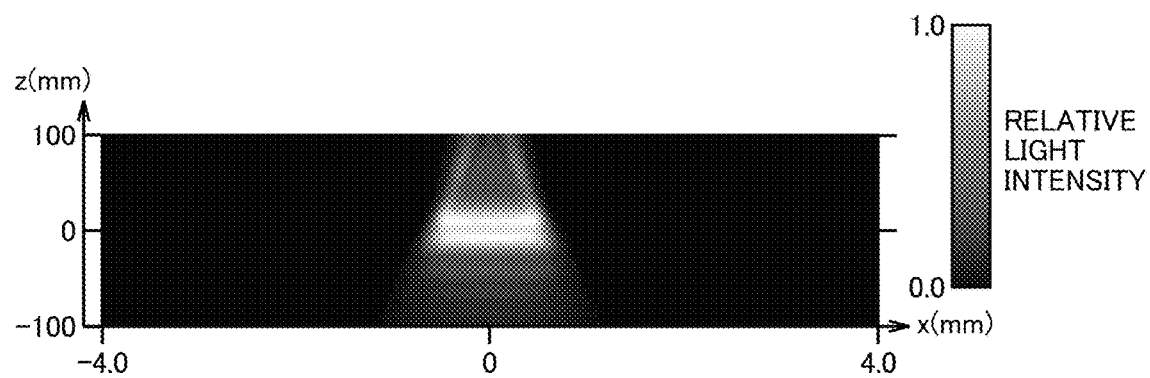
FIG. 61 is a diagram showing a defocus characteristic of the diffractive optical device of Example 5 in the xz plane.
Figure 62:
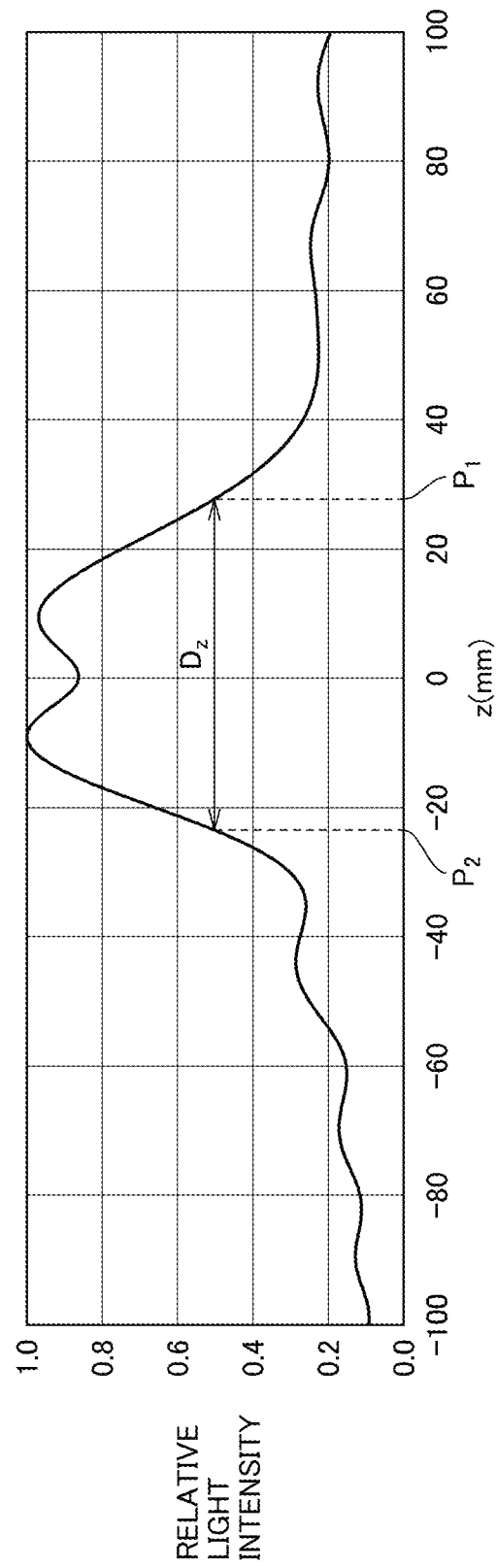
FIG. 62 is a diagram showing an optical axis direction relative light intensity profile of the line beam in Example 5.

A line beam 20 having a defocus profile shown in FIGS. 60 and 61 is obtained by diffractive optical element 12 of the present example. Referring to FIG. 62, focal depth $D_z$ of line beam 20 is 51.4 mm. The relative light intensity on optical axis 11 in focal plane 25 (z=0) is 0.863. The optical axis direction relative light intensity of line beam 20 is more than or equal to 0.5 between first position $P_1$ and second position $P_2$ in the optical axis direction relative light intensity profile of line beam 20.

Figure 63:
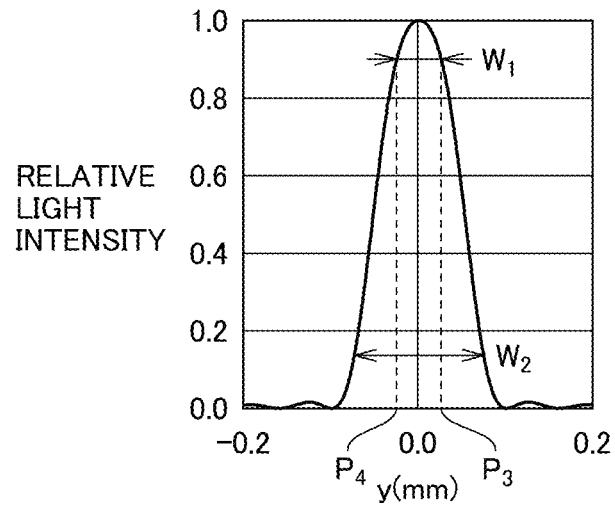
FIG. 63 is a diagram showing a short axis direction relative light intensity profile of the line beam in Example 5.
Figure 64:
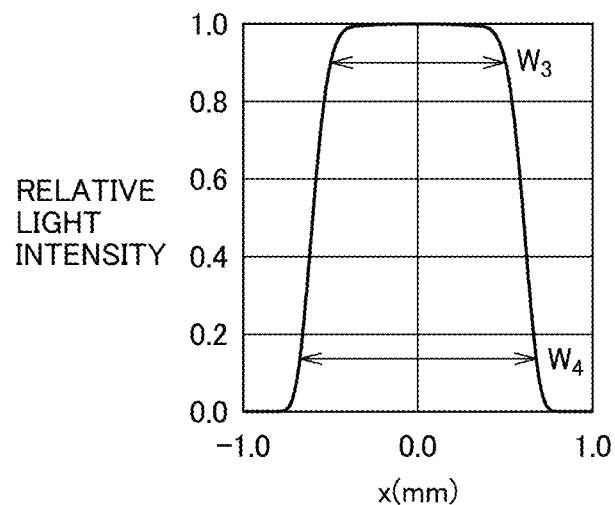
FIG. 64 is a diagram showing a long axis direction relative light intensity profile of the line beam in Example 5.
Figure 65:
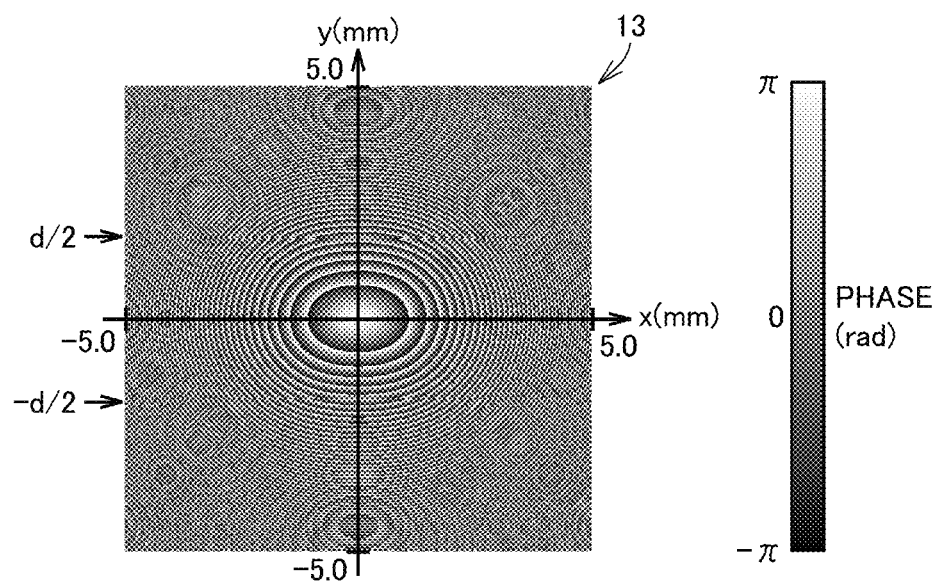
FIG. 65 is a diagram showing a phase pattern in Example 6.
Figure 66:
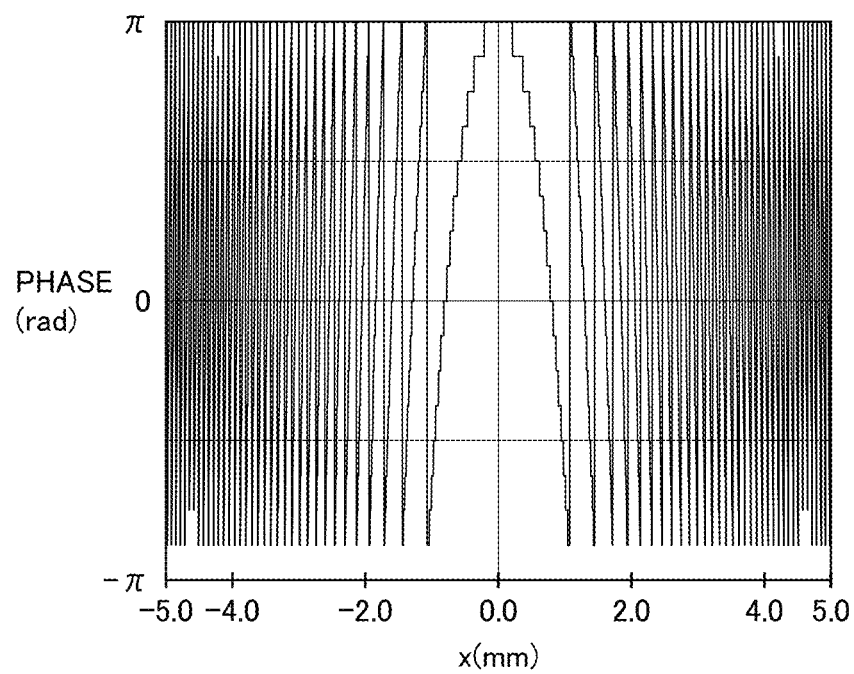
FIG. 66 is a diagram showing a phase pattern in the x axis direction at y=0.0 mm in Example 6.
Figure 67:
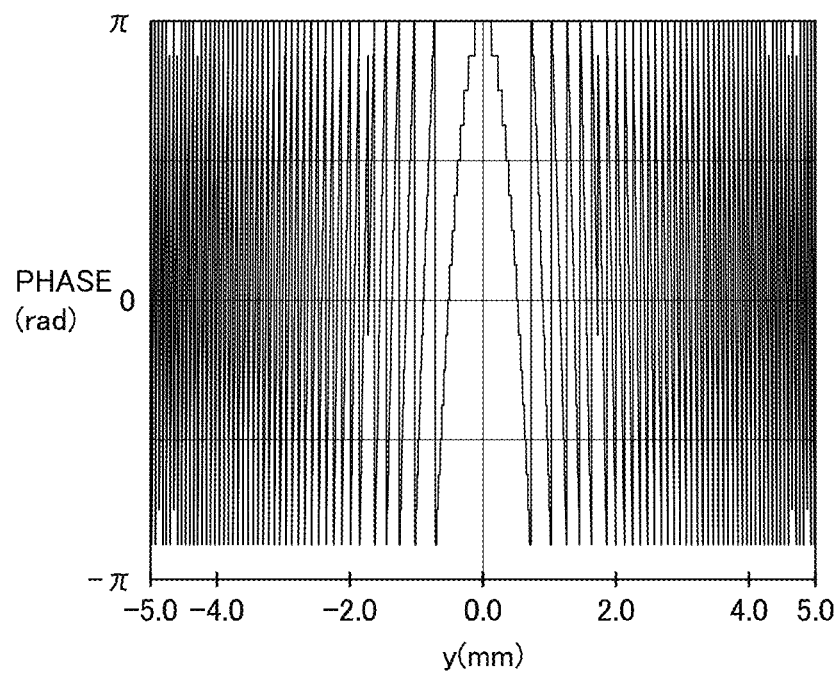
FIG. 67 is a diagram showing a phase pattern in the y axis direction at x=0.0 mm in Example 6.
Figure 68:
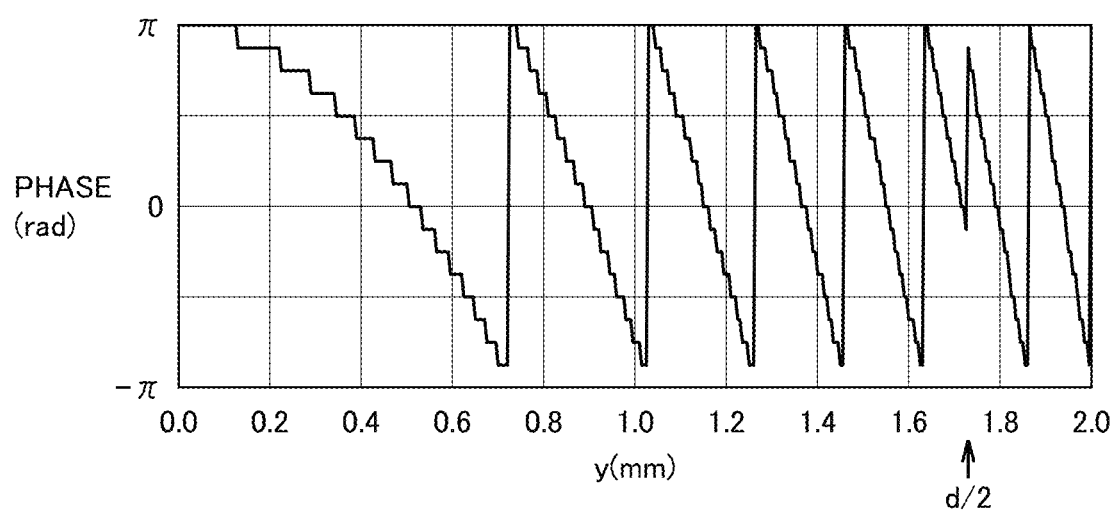
FIG. 68 is a partial enlarged view of a phase pattern in the y axis direction at x=0.0 mm in Example 6.

Referring to FIG. 63, 0.9 peak width $W_1$ of the short axis direction relative light intensity profile of line beam 20 is 0.051 mm, and $1/e^2$ peak width $W_2$ of the short axis direction relative light intensity profile of line beam 20 is 0.148 mm. Aspect ratio $W_4/W_2$ of line beam 20 is 9.12. Ratio $W_1/W_2$ is 0.345, which is less than 0.400. Therefore, the short axis direction relative light intensity profile of line beam 20 does not have a flat top shape.

Example 6

Figure 69:
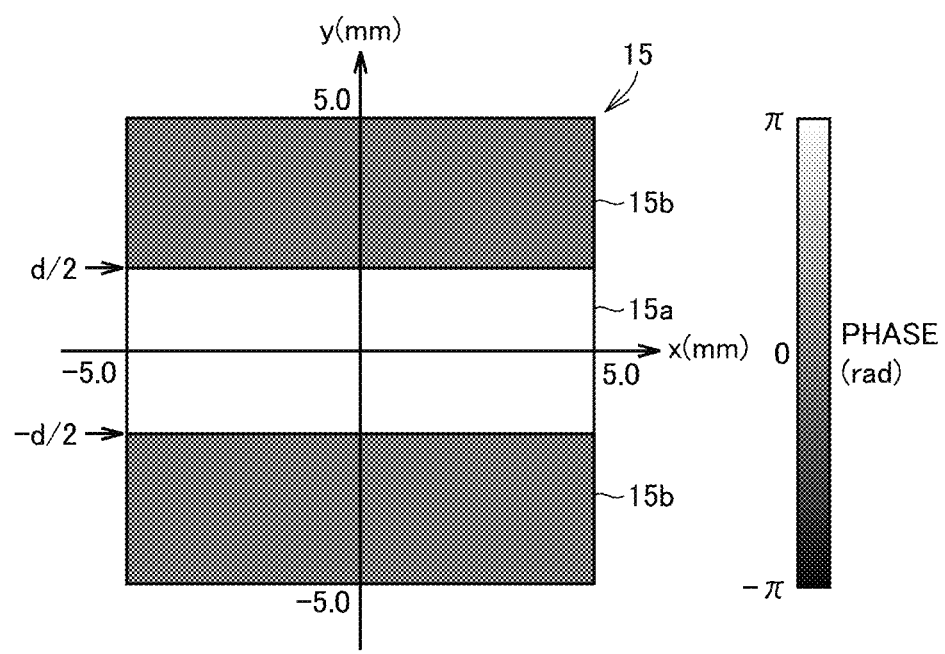
FIG. 69 is a diagram showing a second phase pattern in Example 6.

A diffractive optical element 12 of Example 6 includes a phase pattern 13 shown in FIGS. 65 to 68. Phase pattern 13 of the present example is a phase pattern in which first phase pattern 14 shown in FIGS. 9 to 12 and a second phase pattern 15 shown in FIG. 69 are overlapped with each other. Second phase pattern 15 of the present example is similar to second phase pattern 15 of Example 1, but width d of central phase pattern 15a of the present example is 3.46 mm. In the present example, coefficient C is 1.50.

Figure 70:
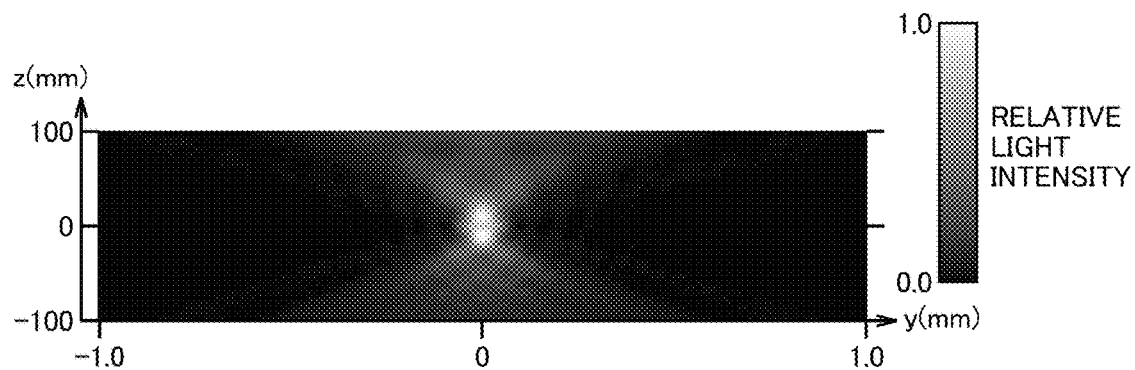
FIG. 70 is a diagram showing a defocus characteristic of the diffractive optical device of Example 6 in the yz plane.
Figure 71:
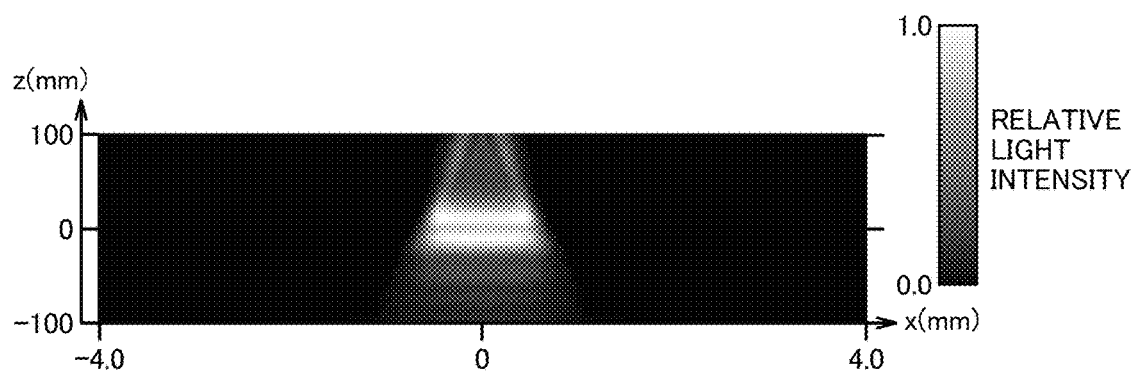
FIG. 71 is a diagram showing a defocus characteristic of the diffractive optical device of Example 6 in the xz plane.
Figure 72:
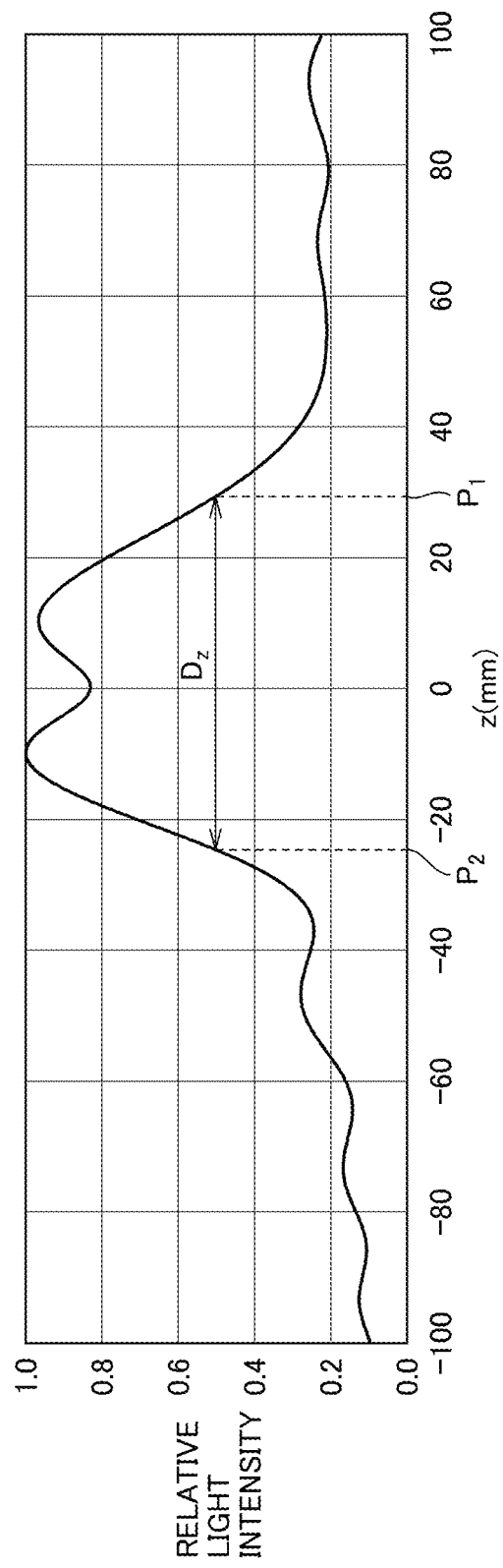
FIG. 72 is a diagram showing an optical axis direction relative light intensity profile of the line beam in Example 6.

A line beam 20 having a defocus profile shown in FIGS. 70 and 71 is obtained by diffractive optical element 12 of the present example. Referring to FIG. 72, focal depth $D_z$ of line beam 20 is 54.1 mm. The relative light intensity on optical axis 11 in focal plane 25 (z=0) is 0.831. The optical axis direction relative light intensity of line beam 20 is more than or equal to 0.5 between first position $P_1$ and second position $P_2$ in the optical axis direction relative light intensity profile of line beam 20.

Figure 73:
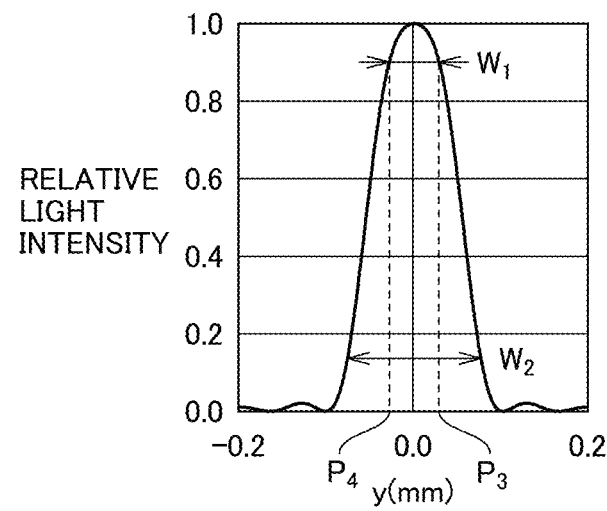
FIG. 73 is a diagram showing a short axis direction relative light intensity profile of the line beam in Example 6.
Figure 74:
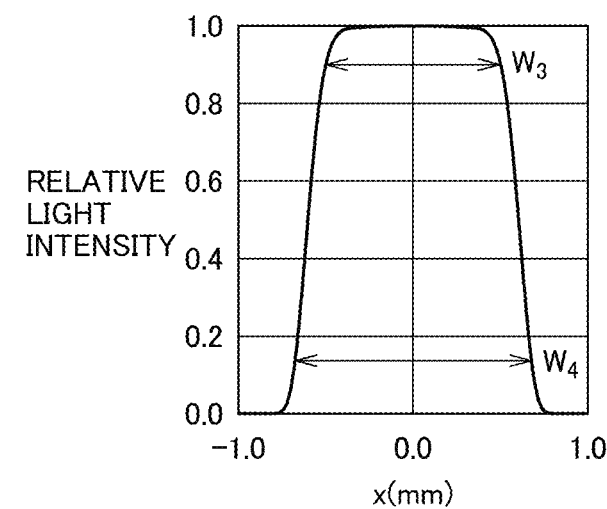
FIG. 74 is a diagram showing a long axis direction relative light intensity profile of the line beam in Example 6.
Figure 75:
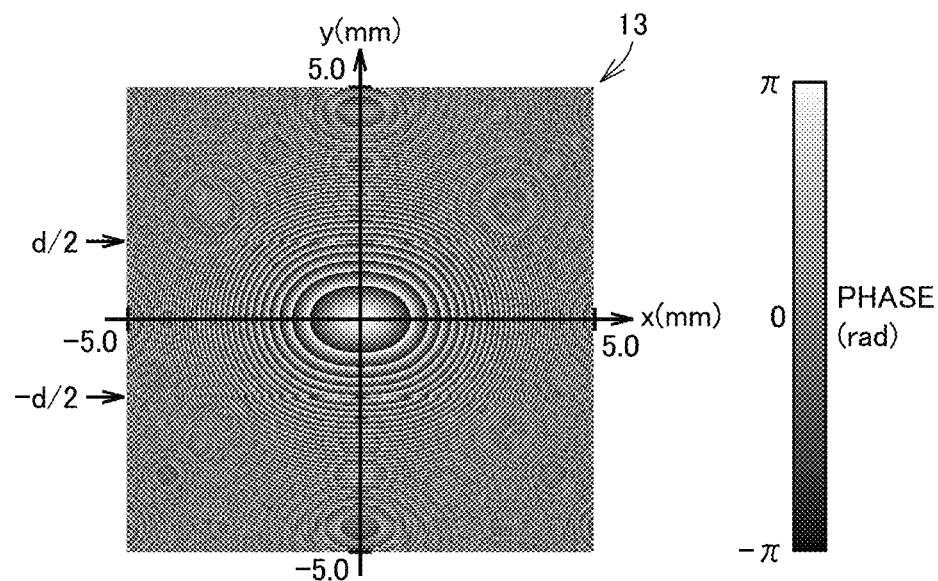
FIG. 75 is a diagram showing a phase pattern in Example 7.
Figure 76:
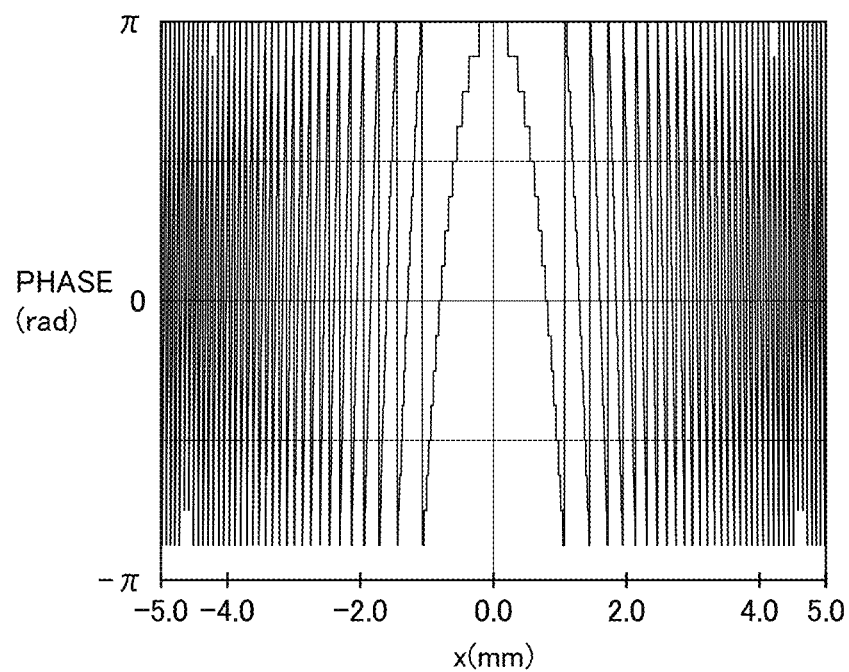
FIG. 76 is a diagram showing a phase pattern in the x axis direction at y=0.0 mm in Example 7.
Figure 77:
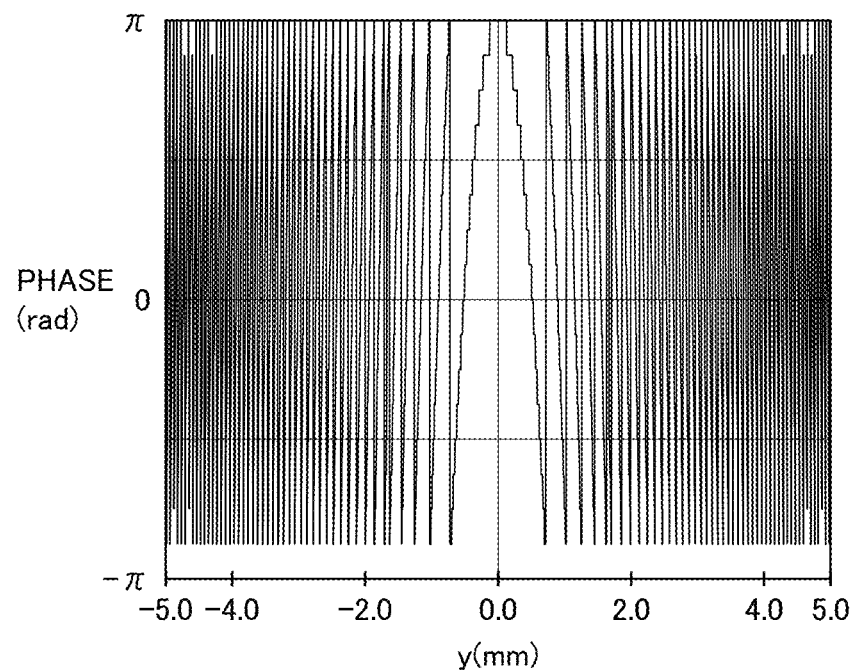
FIG. 77 is a diagram showing a phase pattern in the y axis direction at x=0.0 mm in Example 7.
Figure 78:
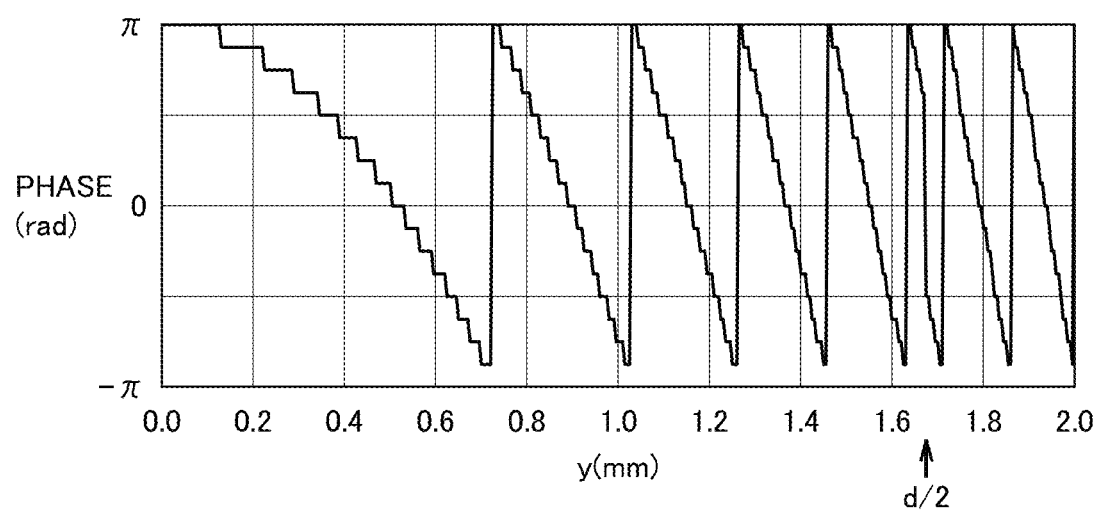
FIG. 78 is a partial enlarged view of a phase pattern in the y axis direction at x=0.0 mm in Example 7.

Referring to FIG. 73, 0.9 peak width $W_1$ of the short axis direction relative light intensity profile of line beam 20 is 0.057 mm, and $1/e^2$ peak width $W_2$ of the short axis direction relative light intensity profile of line beam 20 is 0.153 mm. Aspect ratio $W_4/W_2$ of line beam 20 is 8.82. Ratio $W_1/W_2$ is 0.373, which is less than 0.400. Therefore, the short axis direction relative light intensity profile of line beam 20 does not have a flat top shape.

Example 7

Figure 79:
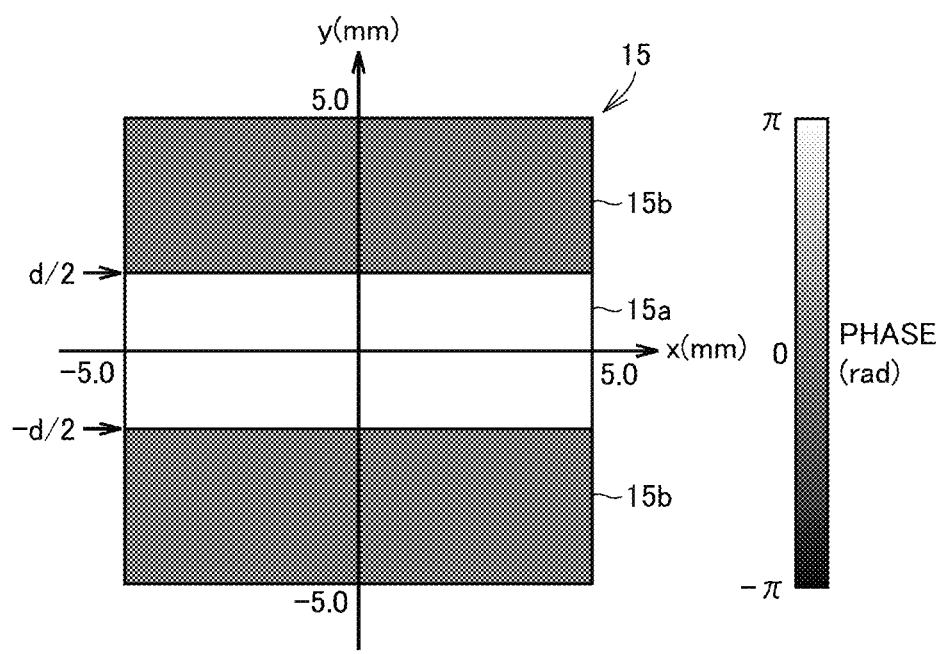
FIG. 79 is a diagram showing a second phase pattern in Example 7.

A diffractive optical element 12 of Example 7 includes a phase pattern 13 shown in FIGS. 75 to 78. Phase pattern 13 of the present example is a phase pattern in which first phase pattern 14 shown in FIGS. 9 to 12 and a second phase pattern 15 shown in FIG. 79 are overlapped with each other. Second phase pattern 15 of the present example is similar to second phase pattern 15 of Example 1, but width d of central phase pattern 15a of the present example is 3.35 mm. In the present example, coefficient C is 1.60.

Figure 80:
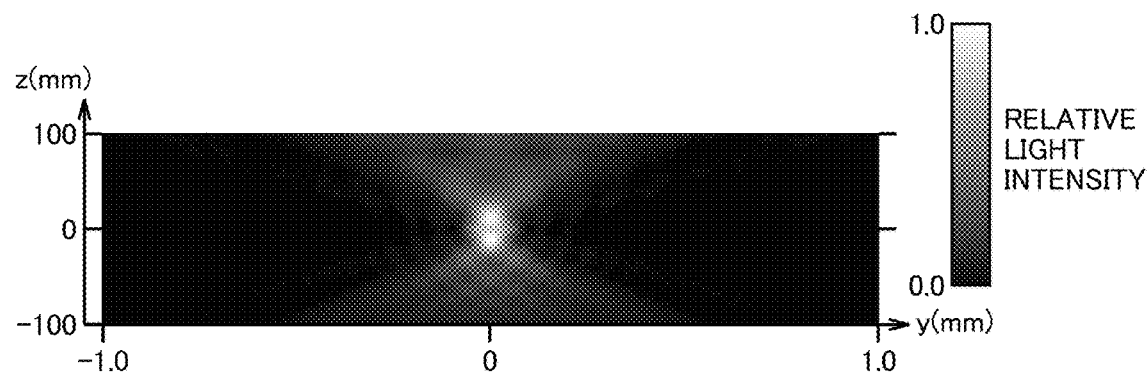
FIG. 80 is a diagram showing a defocus characteristic of the diffractive optical device of Example 7 in the yz plane.
Figure 81:
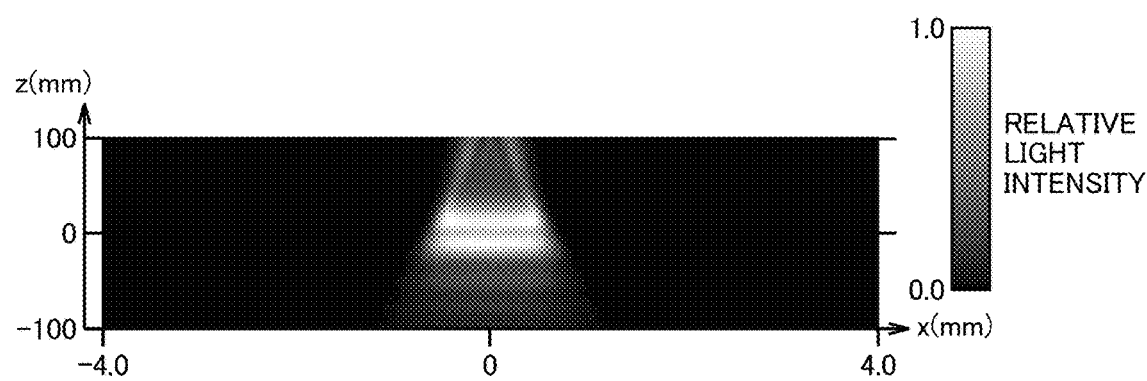
FIG. 81 is a diagram showing a defocus characteristic of the diffractive optical device of Example 7 in the xz plane.
Figure 82:
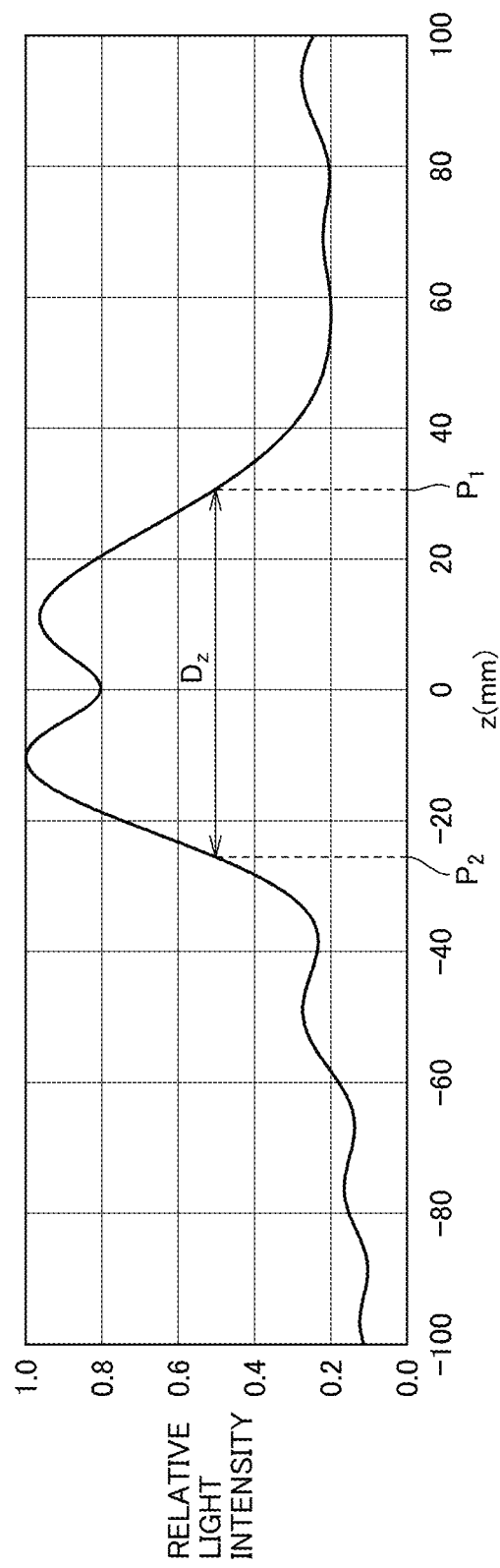
FIG. 82 is a diagram showing an optical axis direction relative light intensity profile of the line beam in Example 7.

A line beam 20 having a defocus profile shown in FIGS. 80 and 81 is obtained by diffractive optical element 12 of the present example. Referring to FIG. 82, focal depth $D_z$ of line beam 20 is 56.4 mm. The relative light intensity on optical axis 11 in focal plane 25 (z=0) is 0.804. The optical axis direction relative light intensity of line beam 20 is more than or equal to 0.5 between first position $P_1$ and second position $P_2$ in the optical axis direction relative light intensity profile of line beam 20.

Figure 83:
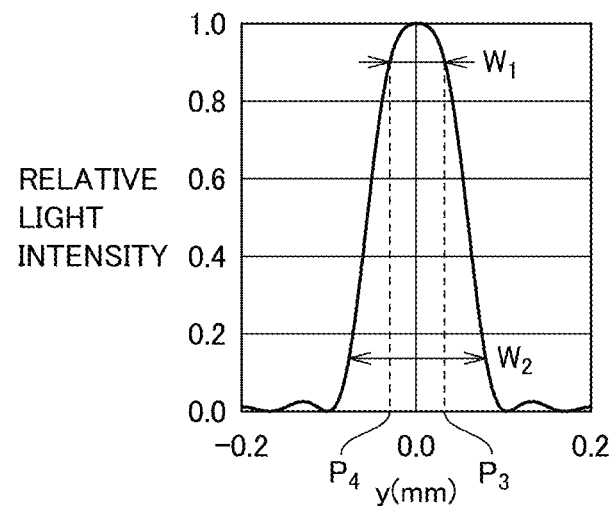
FIG. 83 is a diagram showing a short axis direction relative light intensity profile of the line beam in Example 7.
Figure 84:
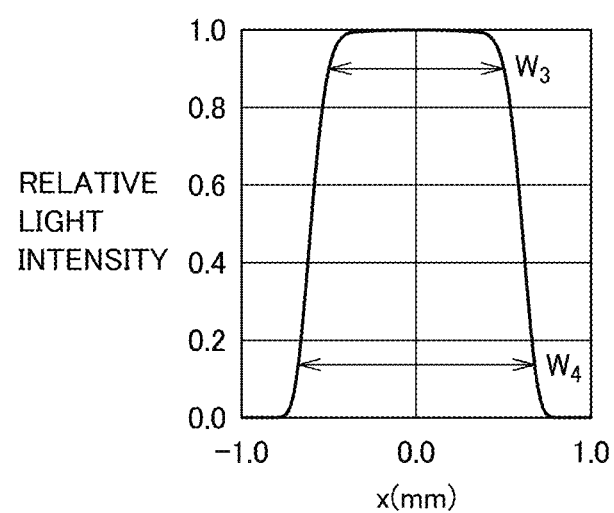
FIG. 84 is a diagram showing a long axis direction relative light intensity profile of the line beam in Example 7.
Figure 85:
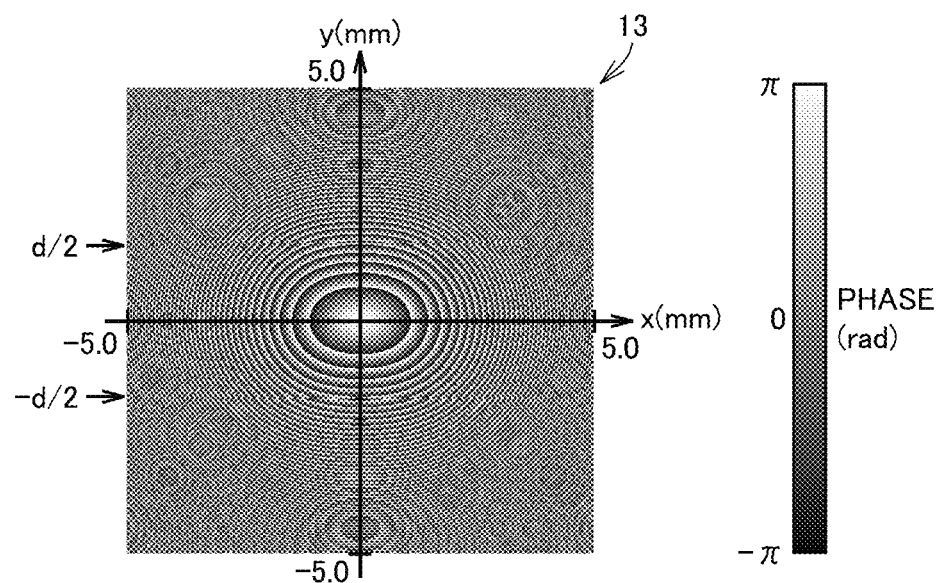
FIG. 85 is a diagram showing a phase pattern in Example 8.
Figure 86:
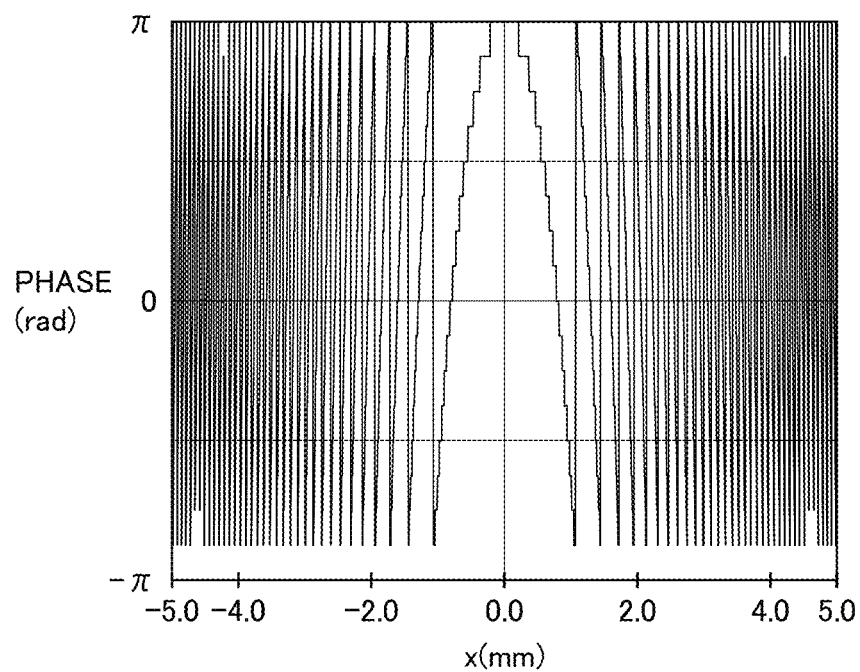
FIG. 86 is a diagram showing a phase pattern in the x axis direction at y=0.0 mm in Example 8.
Figure 87:
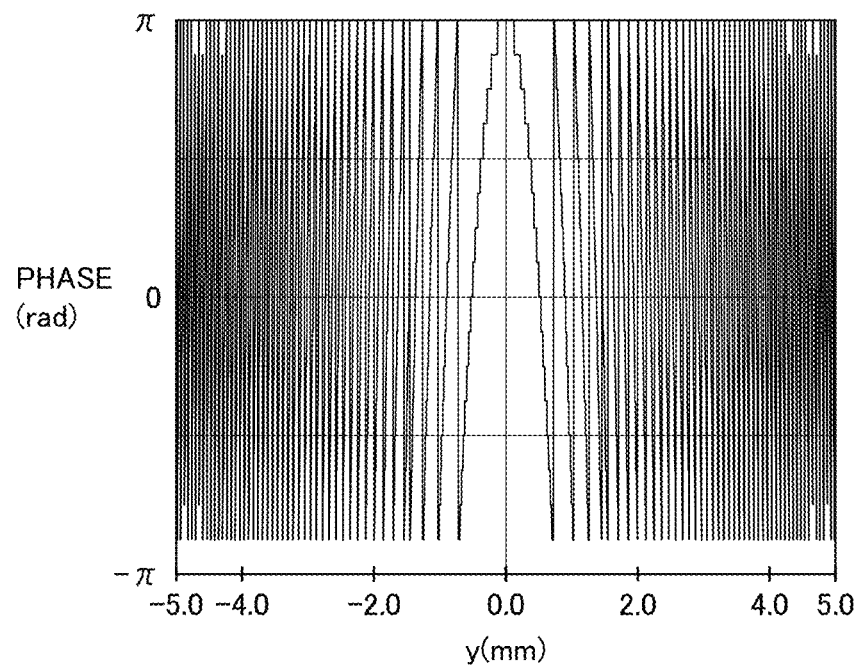
FIG. 87 is a diagram showing a phase pattern in the y axis direction at x=0.0 mm in Example 8.
Figure 88:
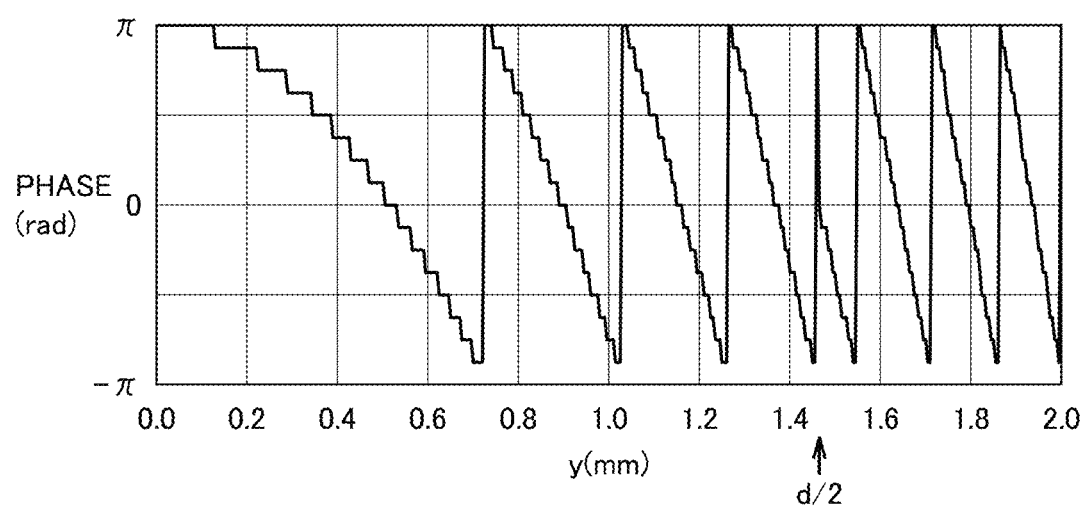
FIG. 88 is a partial enlarged view of a phase pattern in the y axis direction at x=0.0 mm in Example 8.

Referring to FIG. 83, 0.9 peak width $W_1$ of the short axis direction relative light intensity profile of line beam 20 is 0.063 mm, and $1/e^2$ peak width $W_2$ of the short axis direction relative light intensity profile of line beam 20 is 0.157 mm. Aspect ratio $W_4/W_2$ of line beam 20 is 8.60. Ratio $W_1/W_2$ is 0.401, which is more than or equal to 0.400. The short axis direction relative light intensity profile of line beam 20 is more than or equal to 0.9 between third position $P_3$ and fourth position $P_4$ in the short axis direction relative light intensity profile of line beam 20. Therefore, the short axis direction relative light intensity profile of line beam 20 has a flat top shape.

Example 8

Figure 89:
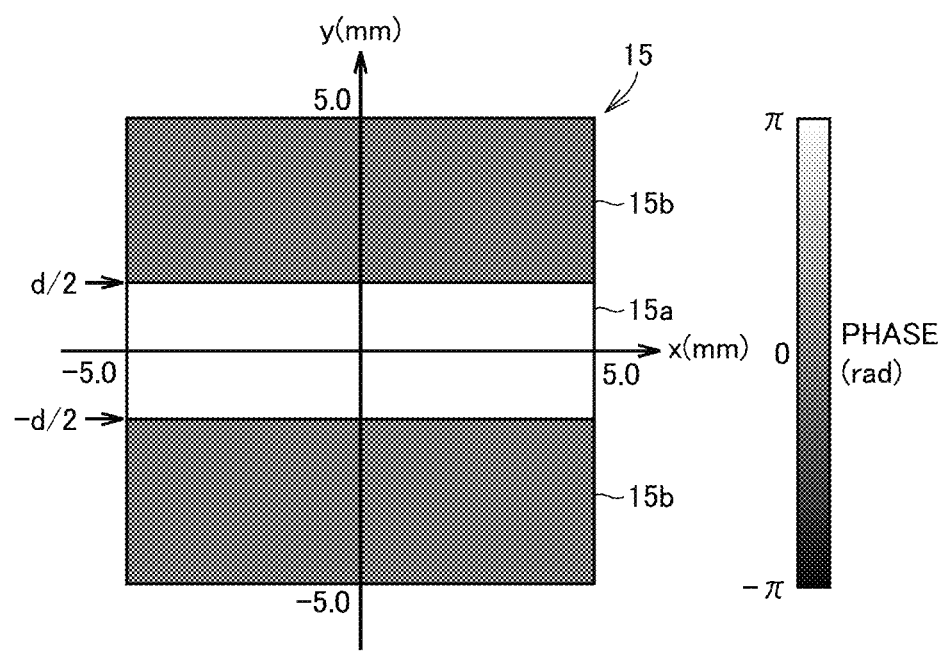
FIG. 89 is a diagram showing a second phase pattern in Example 8.

A diffractive optical element 12 of Example 8 includes a phase pattern 13 shown in FIGS. 85 to 88. Phase pattern 13 of the present example is a phase pattern in which first phase pattern 14 shown in FIGS. 9 to 12 and a second phase pattern 15 shown in FIG. 89 are overlapped with each other. Second phase pattern 15 of the present example is similar to second phase pattern 15 of Example 1, but width d of central phase pattern 15a of the present example is 2.93 mm. In the present example, coefficient C is 2.10.

Figure 90:
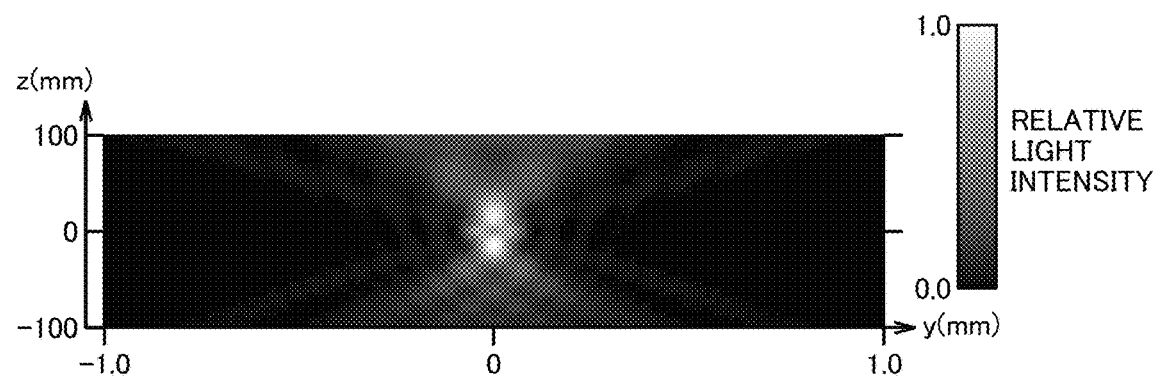
FIG. 90 is a diagram showing a defocus characteristic of the diffractive optical device of Example 8 in the yz plane.
Figure 91:
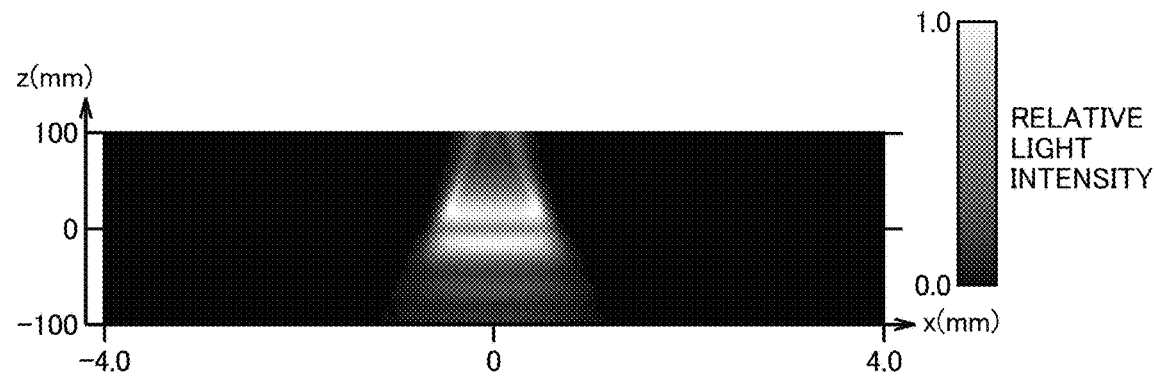
FIG. 91 is a diagram showing a defocus characteristic of the diffractive optical device of Example 8 in the xz plane.
Figure 92:
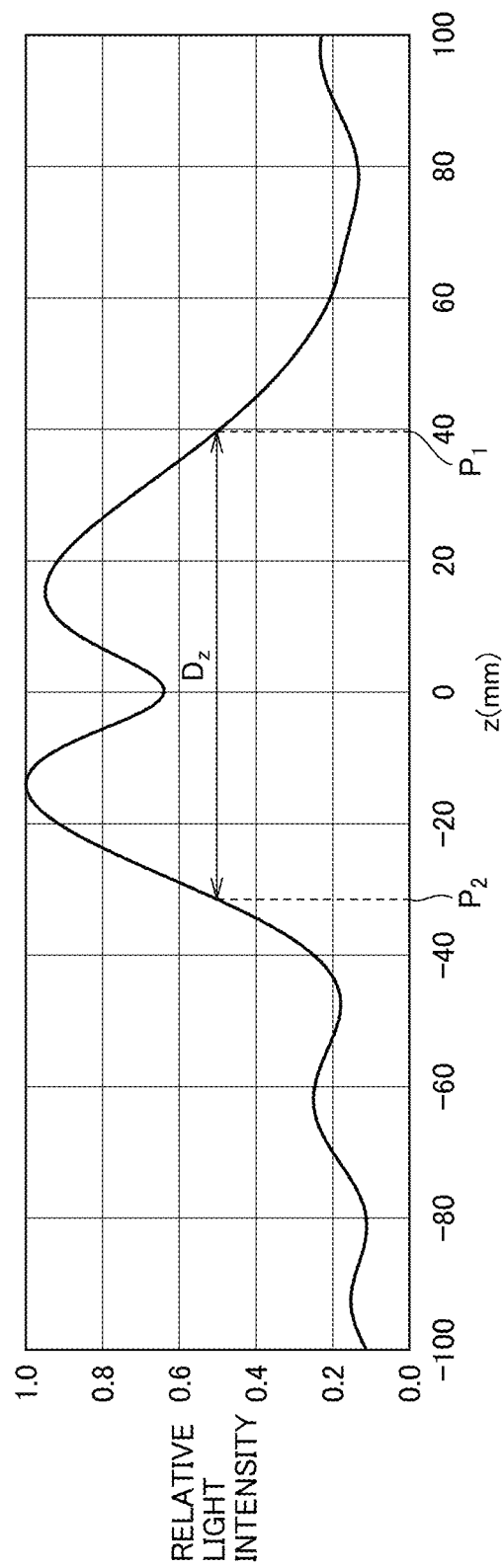
FIG. 92 is a diagram showing an optical axis direction relative light intensity profile of the line beam in Example 8.

A line beam 20 having a defocus profile shown in FIGS. 90 and 91 is obtained by diffractive optical element 12 of the present example. Referring to FIG. 92, focal depth $D_z$ of line beam 20 is 71.3 mm. The relative light intensity on optical axis 11 in focal plane 25 (z=0) is 0.640. The optical axis direction relative light intensity of line beam 20 is more than or equal to 0.5 between first position $P_1$ and second position $P_2$ in the optical axis direction relative light intensity profile of line beam 20.

Figure 93:
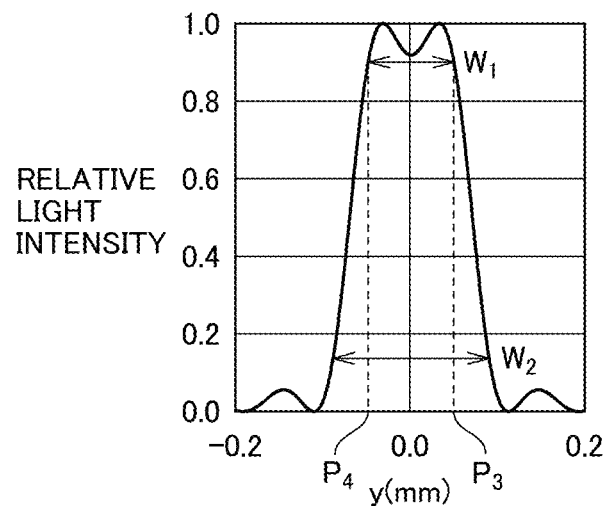
FIG. 93 is a diagram showing a short axis direction relative light intensity profile of the line beam in Example 8.
Figure 94:
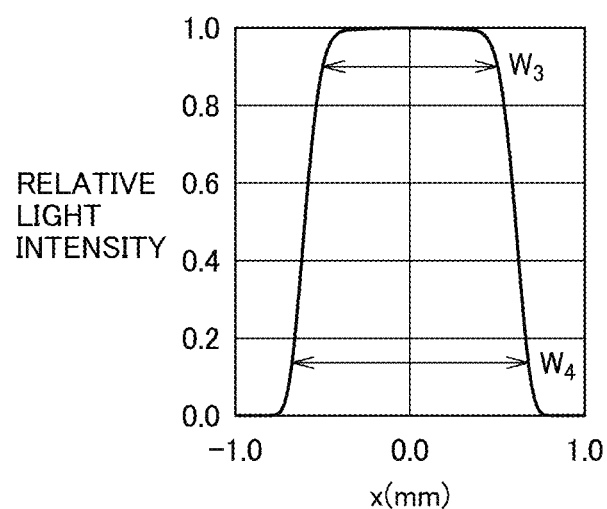
FIG. 94 is a diagram showing a long axis direction relative light intensity profile of the line beam in Example 8.
Figure 95:
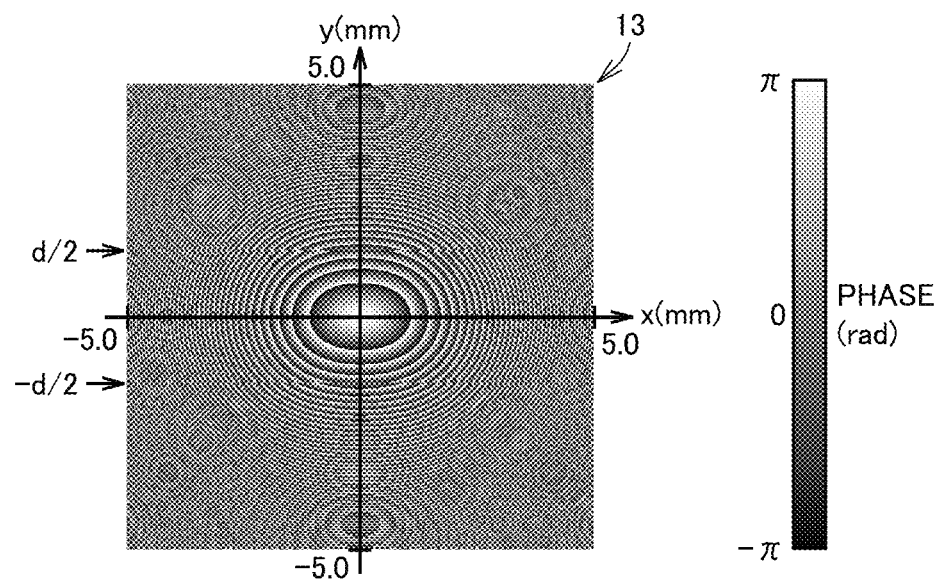
FIG. 95 is a diagram showing a phase pattern in Example 9.
Figure 96:
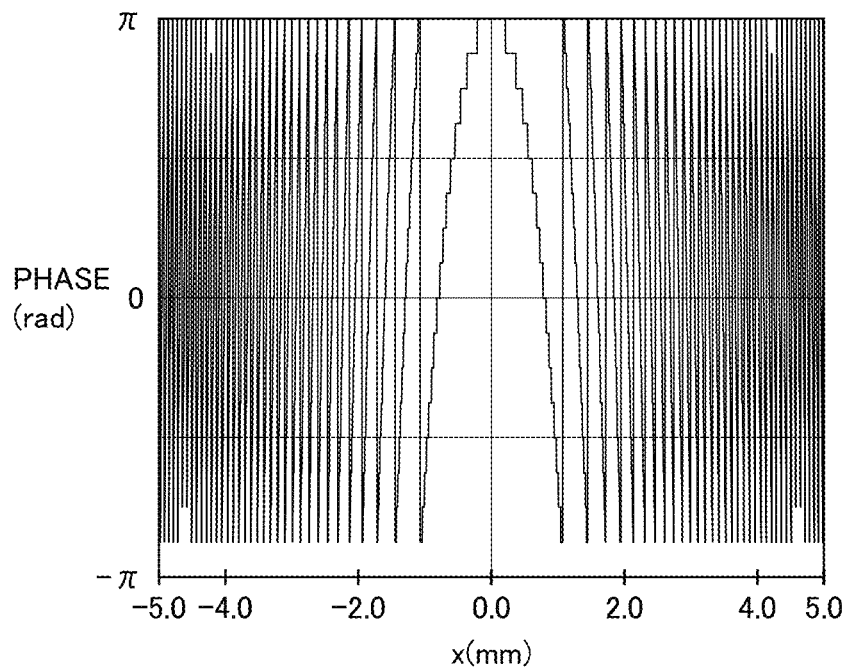
FIG. 96 is a diagram showing a phase pattern in the x axis direction at y=0.0 mm in Example 9.
Figure 97:
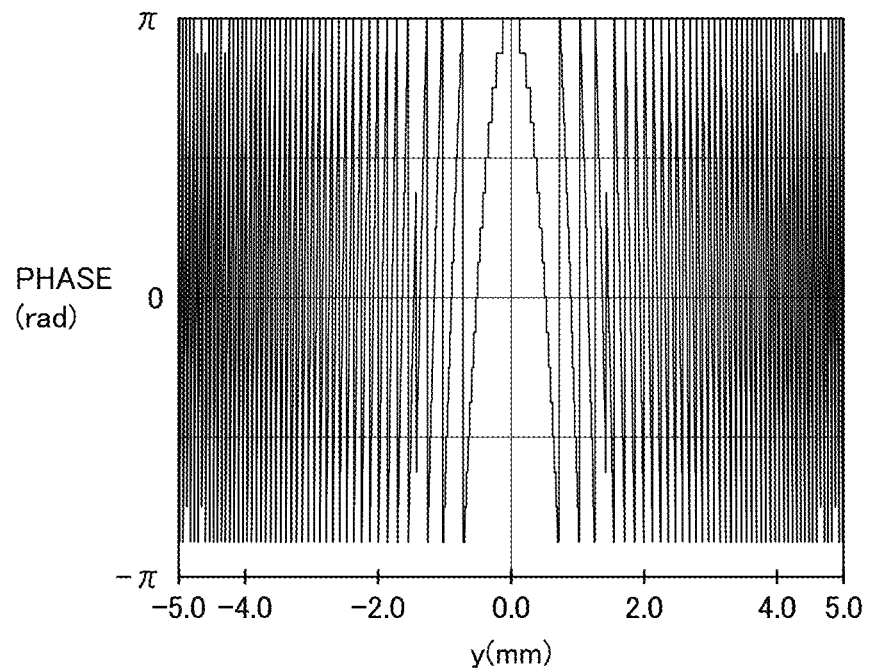
FIG. 97 is a diagram showing a phase pattern in they axis direction at x=0.0 mm in Example 9.
Figure 98:
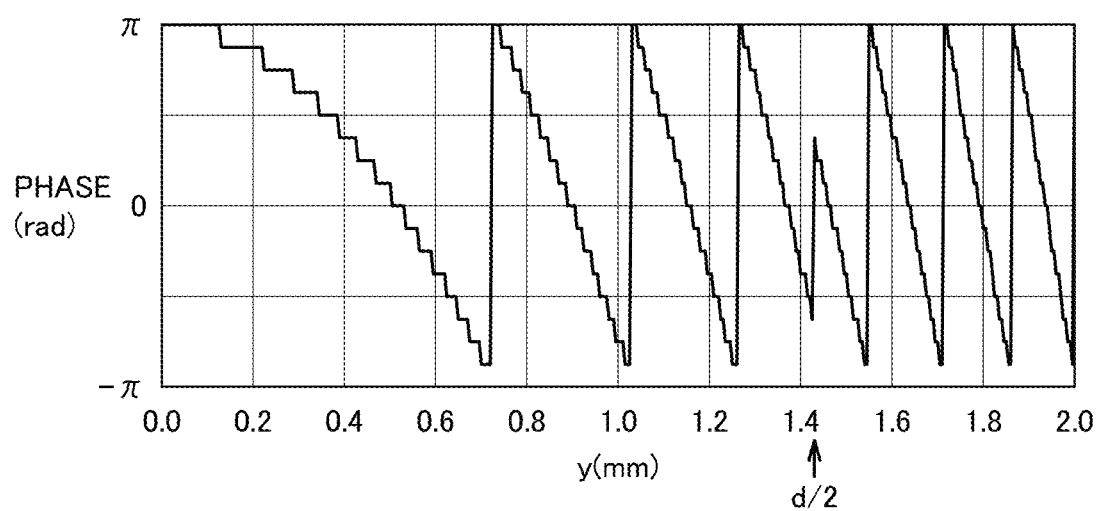
FIG. 98 is a partial enlarged view of a phase pattern in the y axis direction at x=0.0 mm in Example 9.

Referring to FIG. 93, 0.9 peak width $W_1$ of the short axis direction relative light intensity profile of line beam 20 is 0.098 mm, and $1/e^2$ peak width $W_2$ of the short axis direction relative light intensity profile of line beam 20 is 0.179 mm. Aspect ratio $W_4/W_2$ of line beam 20 is 7.54. Ratio $W_1/W_2$ is 0.547, which is more than or equal to 0.400. The short axis direction relative light intensity profile of line beam 20 is more than or equal to 0.9 between third position $P_3$ and fourth position $P_4$ in the short axis direction relative light intensity profile of line beam 20. Therefore, the short axis direction relative light intensity profile of line beam 20 has a flat top shape.

Example 9

Figure 99:
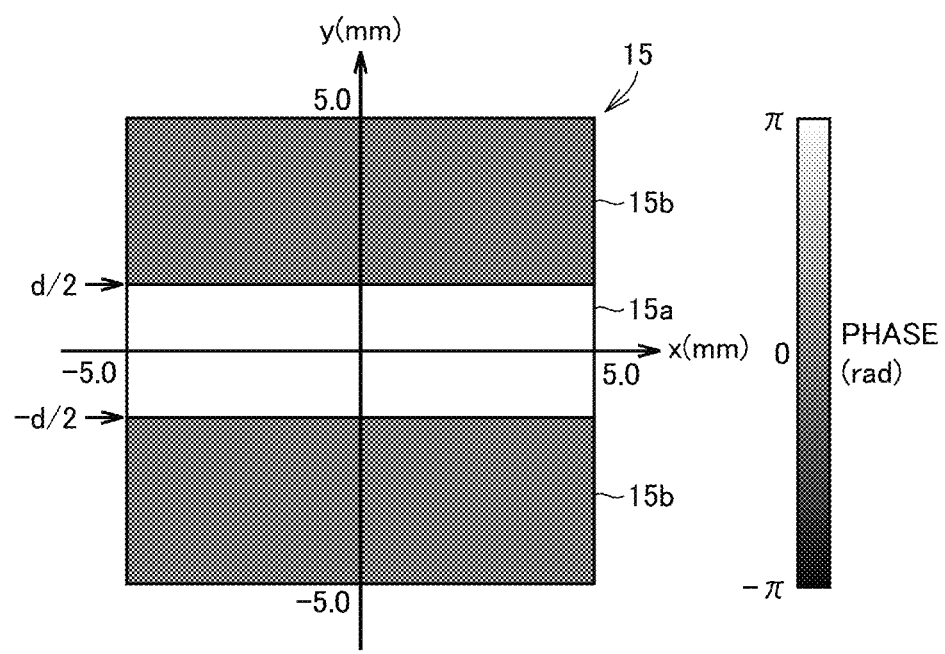
FIG. 99 is a diagram showing a second phase pattern in Example 9.

A diffractive optical element 12 of Example 9 includes a phase pattern 13 shown in FIGS. 95 to 98. Phase pattern 13 of the present example is a phase pattern in which first phase pattern 14 shown in FIGS. 9 to 12 and a second phase pattern 15 shown in FIG. 99 are overlapped with each other. Second phase pattern 15 of the present example is similar to second phase pattern 15 of Example 1, but width d of central phase pattern 15a of the present example is 2.86 mm. In the present example, coefficient C is 2.20.

Figure 100:
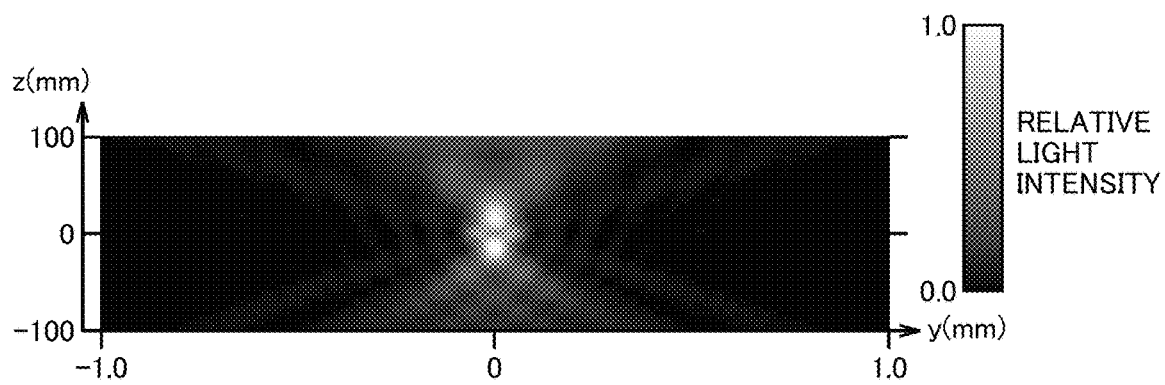
FIG. 100 is a diagram showing a defocus characteristic of the diffractive optical device of Example 9 in the yz plane.
Figure 101:
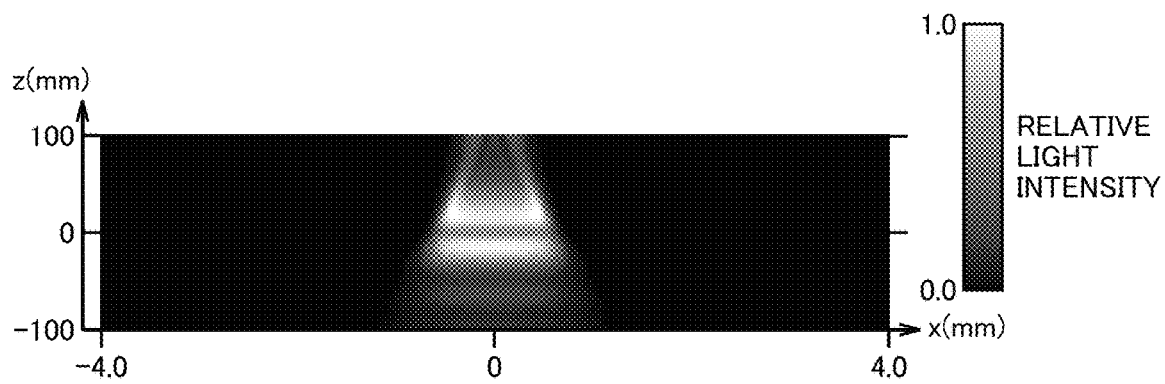
FIG. 101 is a diagram showing a defocus characteristic of the diffractive optical device of Example 9 in the xz plane.
Figure 102:
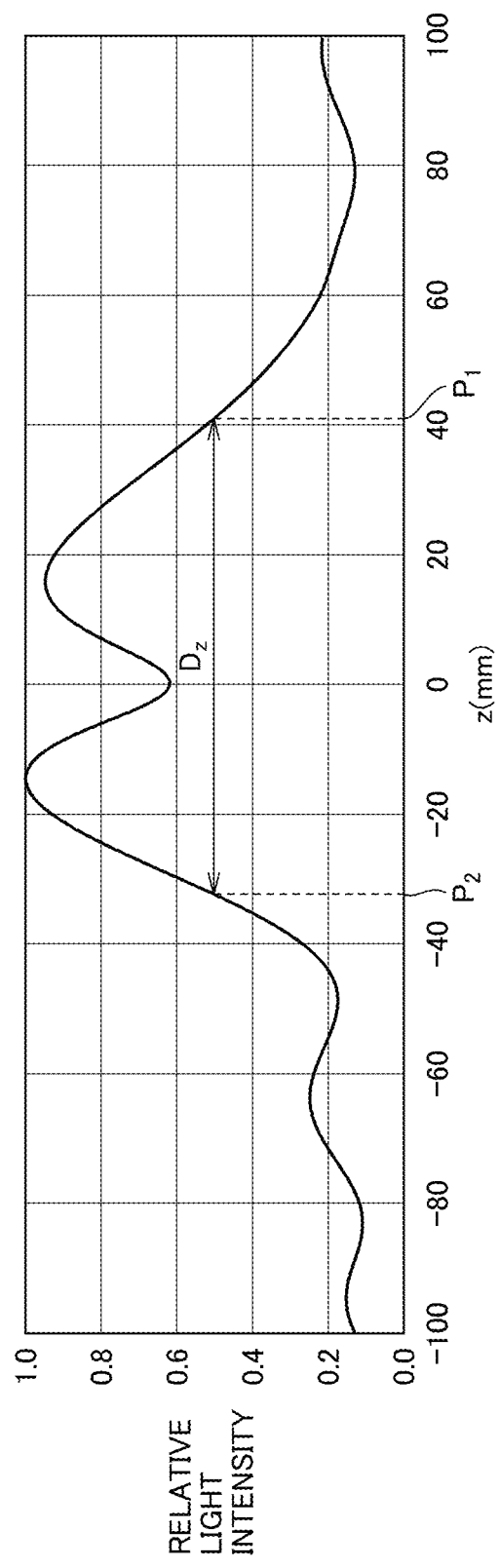
FIG. 102 is a diagram showing an optical axis direction relative light intensity profile of the line beam in Example 9.

A line beam 20 having a defocus profile shown in FIGS. 100 and 101 is obtained by diffractive optical element 12 of the present example. Referring to FIG. 102, focal depth $D_z$ of line beam 20 is 73.4 mm. The relative light intensity on optical axis 11 in focal plane 25 (z=0) is 0.619. The optical axis direction relative light intensity of line beam 20 is more than or equal to 0.5 between first position $P_1$ and second position $P_2$ in the optical axis direction relative light intensity profile of line beam 20.

Figure 103:
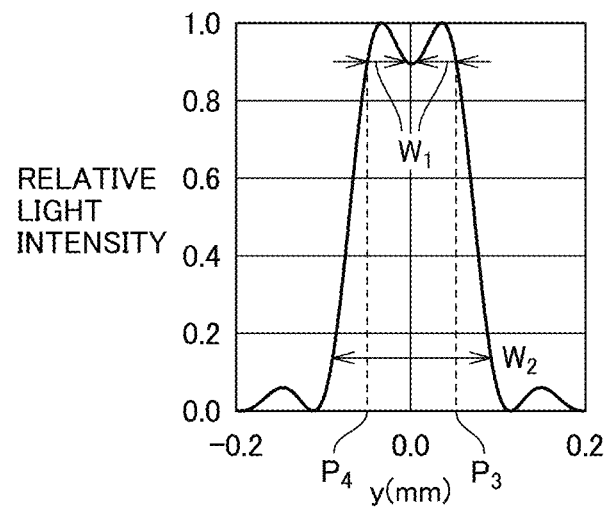
FIG. 103 is a diagram showing a short axis direction relative light intensity profile of the line beam in Example 9.
Figure 104:
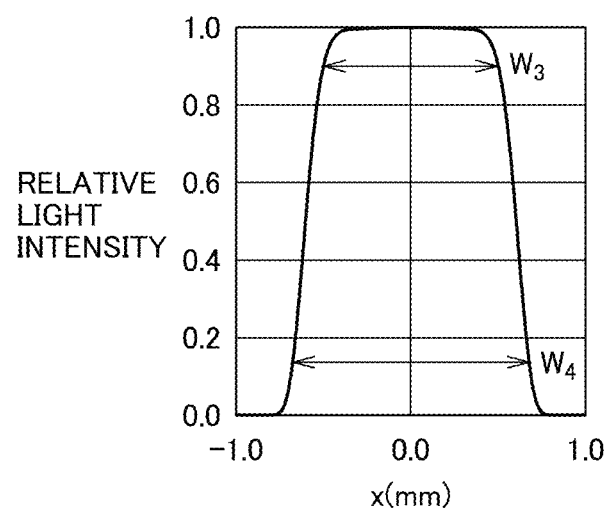
FIG. 104 is a diagram showing a long axis direction relative light intensity profile of the line beam in Example 9.
Figure 105:
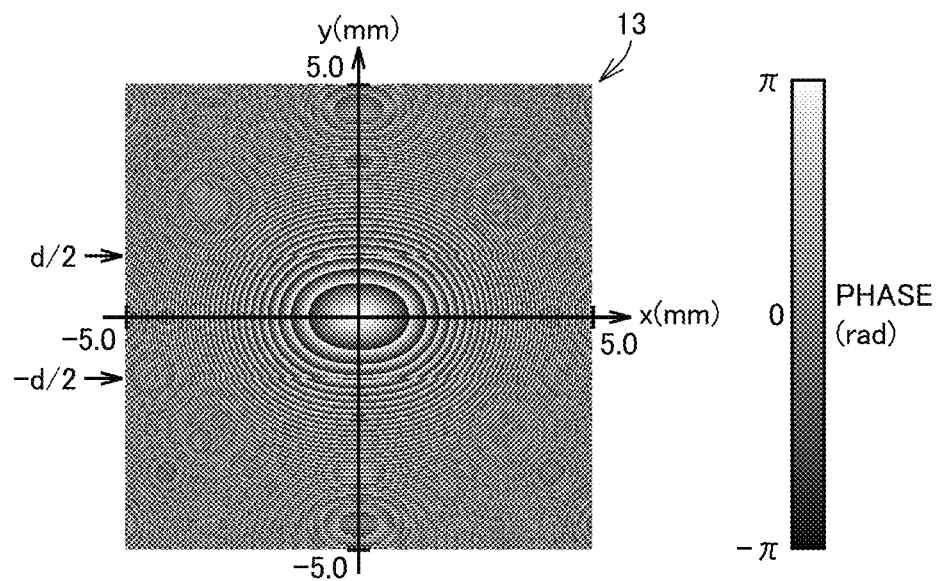
FIG. 105 is a diagram showing a phase pattern in Example 10.
Figure 106:
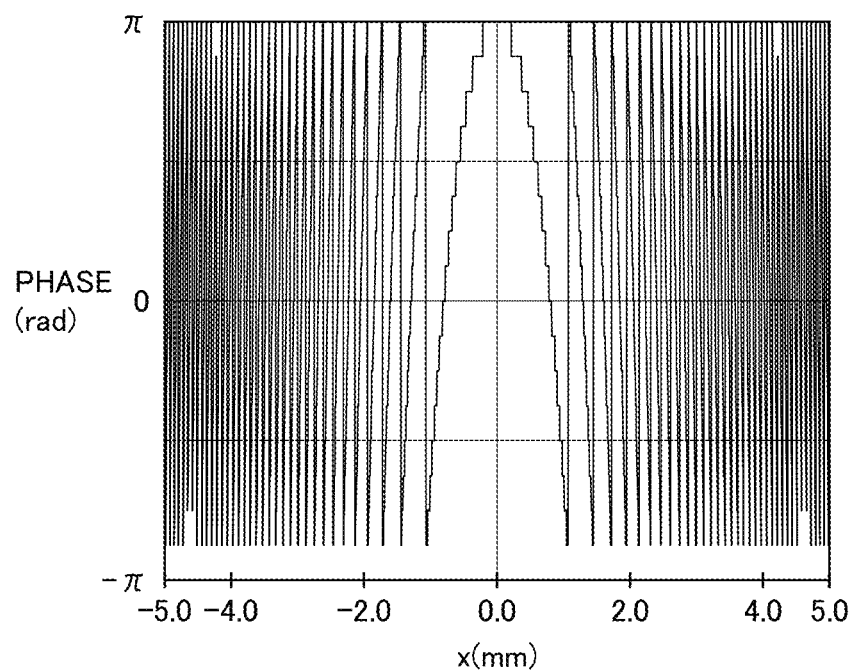
FIG. 106 is a diagram showing a phase pattern in the x axis direction at y=0.0 mm in Example 10.
Figure 107:
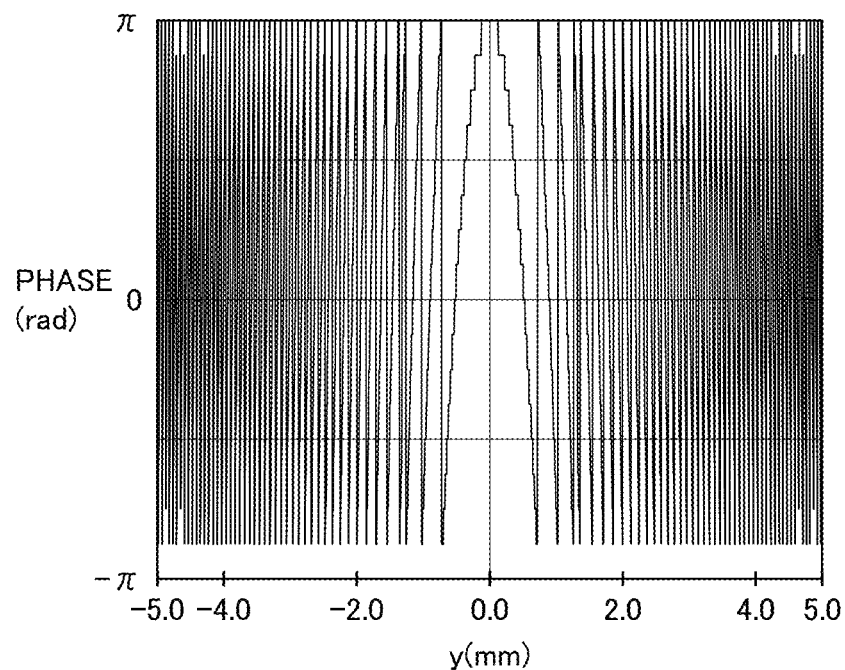
FIG. 107 is a diagram showing a phase pattern in they axis direction at x=0.0 mm in Example 10.
Figure 108:
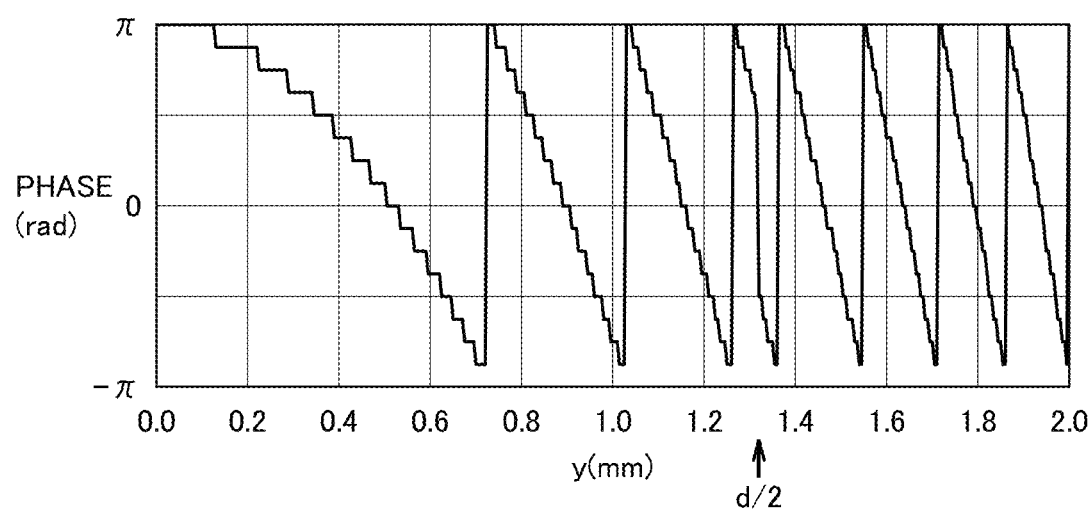
FIG. 108 is a partial enlarged view of a phase pattern in the y axis direction at x=0.0 mm in Example 10.

Referring to FIG. 103, 0.9 peak width $W_1$ of the short axis direction relative light intensity profile of line beam 20 is 0.091 mm, and $1/e^2$ peak width $W_2$ of the short axis direction relative light intensity profile of line beam 20 is 0.182 mm. Aspect ratio $W_4/W_2$ of line beam 20 is 7.42. In the short axis direction relative light intensity profile of line beam 20, there is a portion in which the optical axis direction relative light intensity of line beam 20 is less than 0.9 between third position $P_3$ and fourth position $P_4$ in the short axis direction relative light intensity profile of line beam 20. For example, in the short axis direction relative light intensity profile of line beam 20, the short axis direction relative light intensity of line beam 20 on optical axis 11 (y=0) is 0.895. Therefore, the short axis direction relative light intensity profile of line beam 20 does not have a flat top shape.

Example 10

Figure 109:
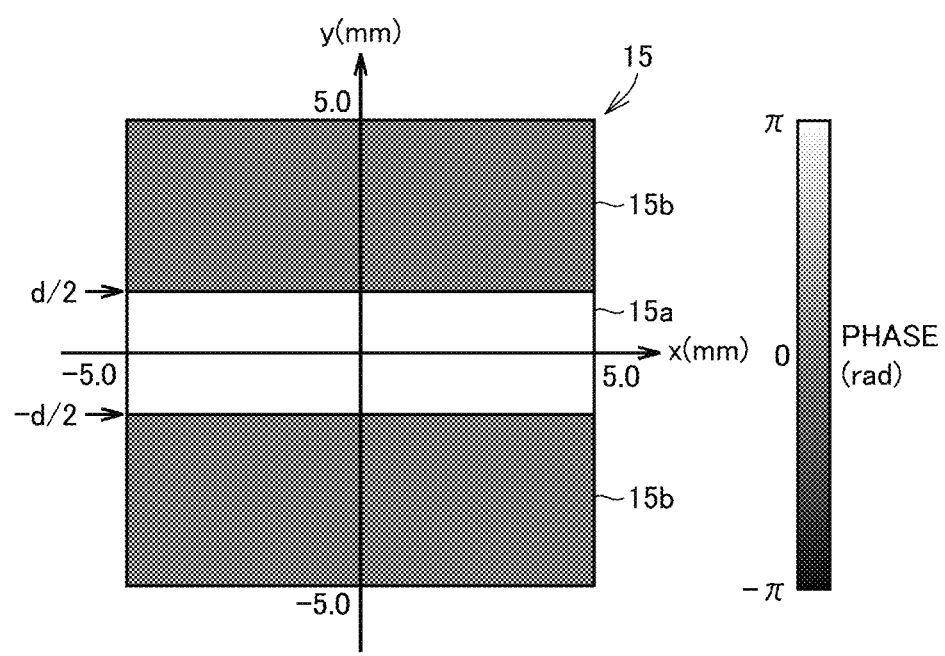
FIG. 109 is a diagram showing a second phase pattern in Example 10.

A diffractive optical element 12 of Example 10 includes a phase pattern 13 shown in FIGS. 105 to 108. Phase pattern 13 of the present example is a phase pattern in which first phase pattern 14 shown in FIGS. 9 to 12 and a second phase pattern 15 shown in FIG. 109 are overlapped with each other. Second phase pattern 15 of the present example is similar to second phase pattern 15 of Example 1, but width d of central phase pattern 15a of the present example is 2.64 mm. In the present example, coefficient C is 2.60.

Figure 110:
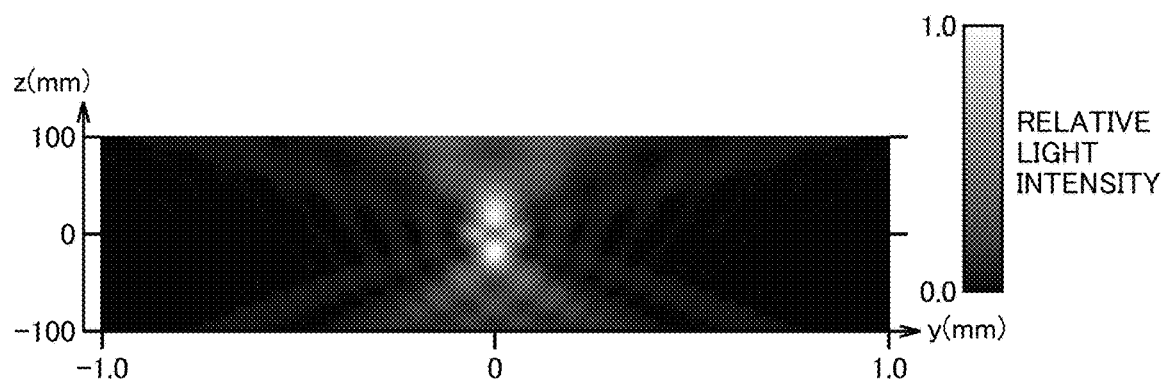
FIG. 110 is a diagram showing a defocus characteristic of the diffractive optical device of Example 10 in the yz plane.
Figure 111:
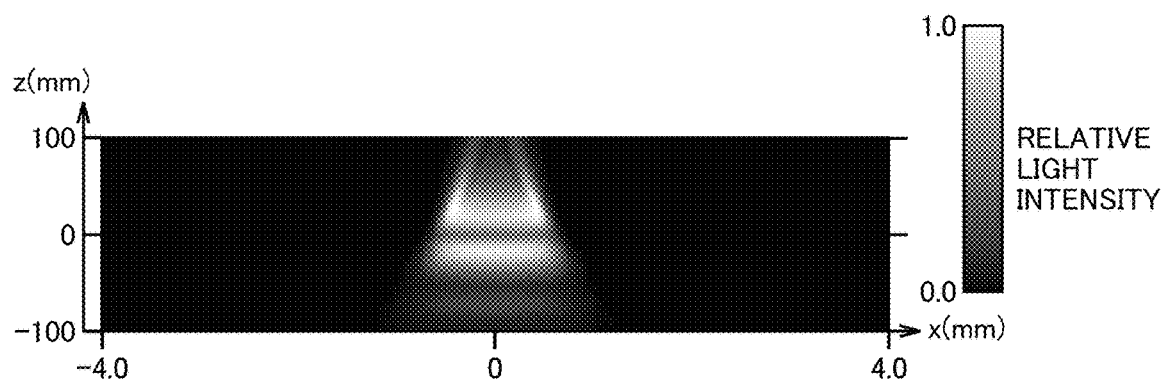
FIG. 111 is a diagram showing a defocus characteristic of the diffractive optical device of Example 10 in the xz plane.
Figure 112:
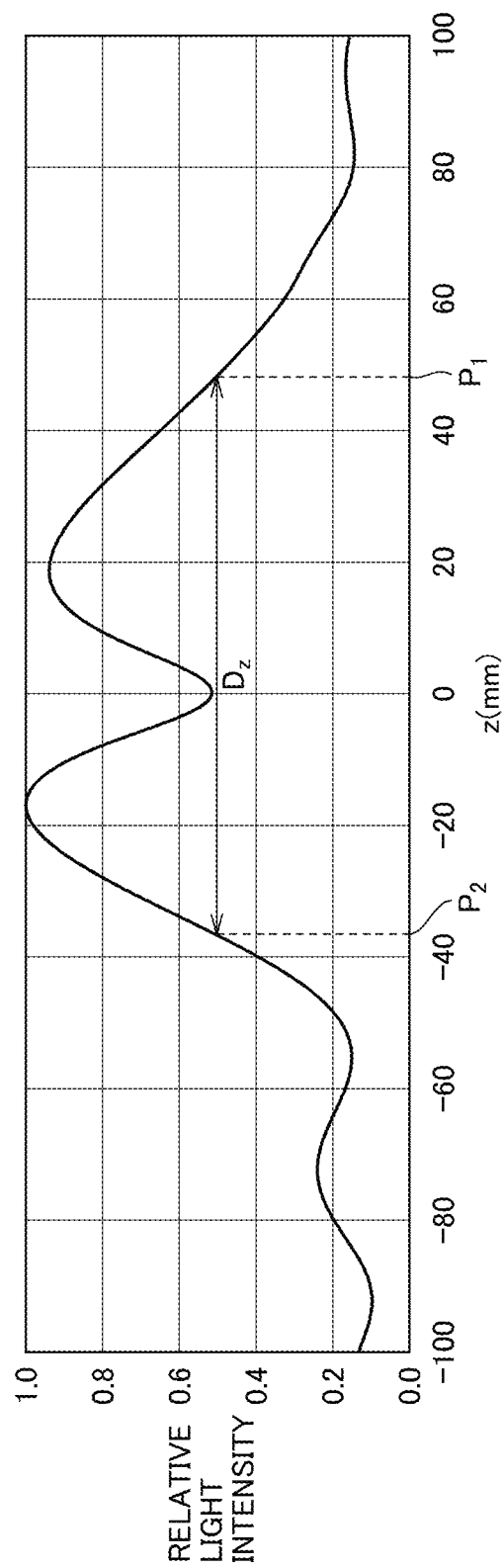
FIG. 112 is a diagram showing an optical axis direction relative light intensity profile of the line beam in Example 10.

A line beam 20 having a defocus profile shown in FIGS. 110 and 111 is obtained by diffractive optical element 12 of the present example. Referring to FIG. 112, focal depth $D_Z$ of line beam 20 is 85.0 mm. The relative light intensity on optical axis 11 in focal plane 25 (z=0) is 0.515. The optical axis direction relative light intensity of line beam 20 is more than or equal to 0.5 between first position $P_1$ and second position $P_2$ in the optical axis direction relative light intensity profile of line beam 20.

Figure 113:
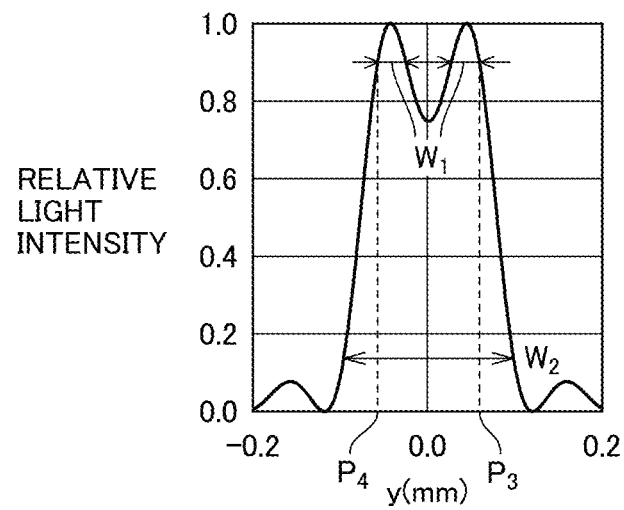
FIG. 113 is a diagram showing a short axis direction relative light intensity profile of the line beam in Example 10.
Figure 114:
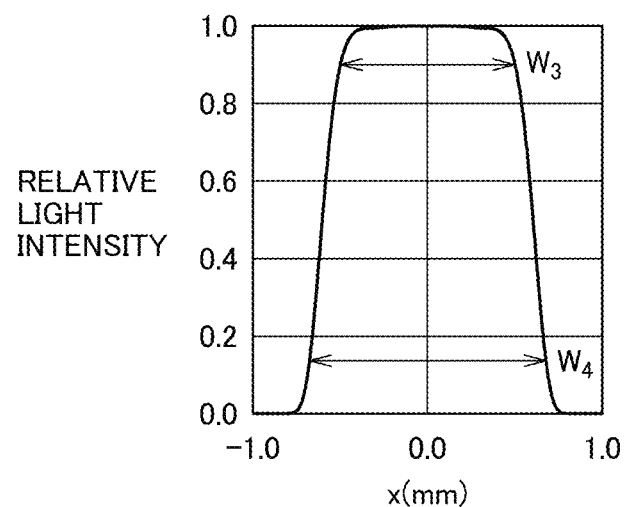
FIG. 114 is a diagram showing a long axis direction relative light intensity profile of the line beam in Example 10.
Figure 115:
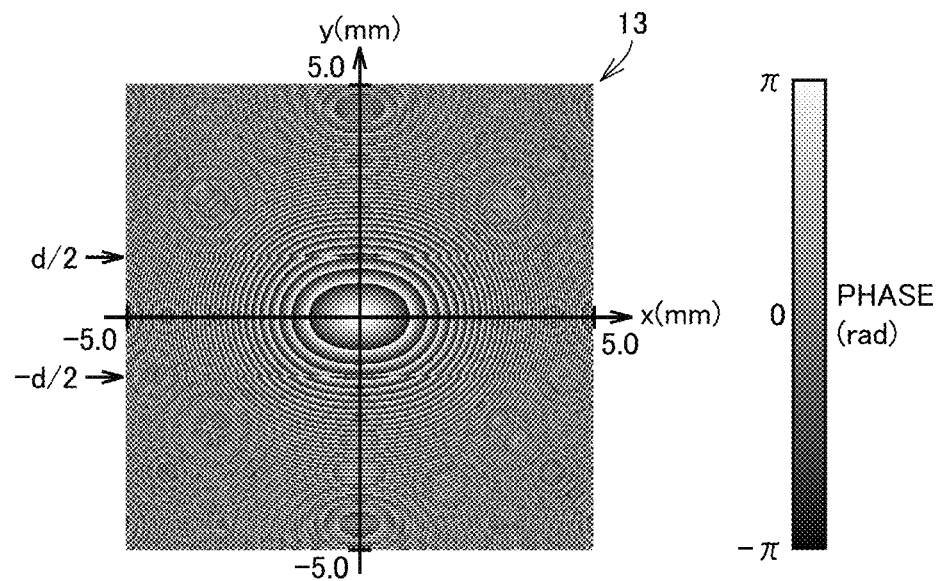
FIG. 115 is a diagram showing a phase pattern in Example 11.
Figure 116:
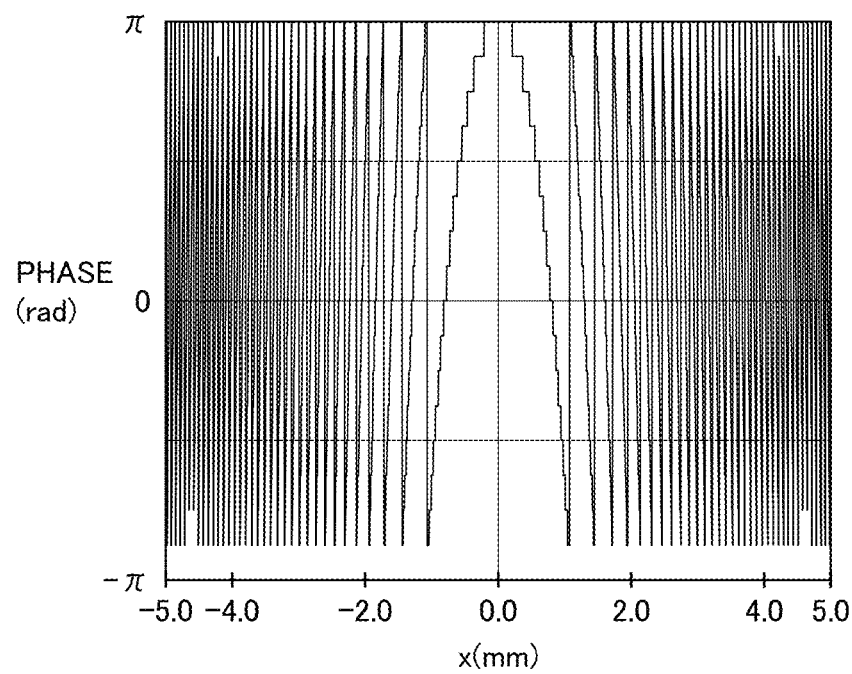
FIG. 116 is a diagram showing a phase pattern in the x axis direction at y=0.0 mm in Example 11.
Figure 117:
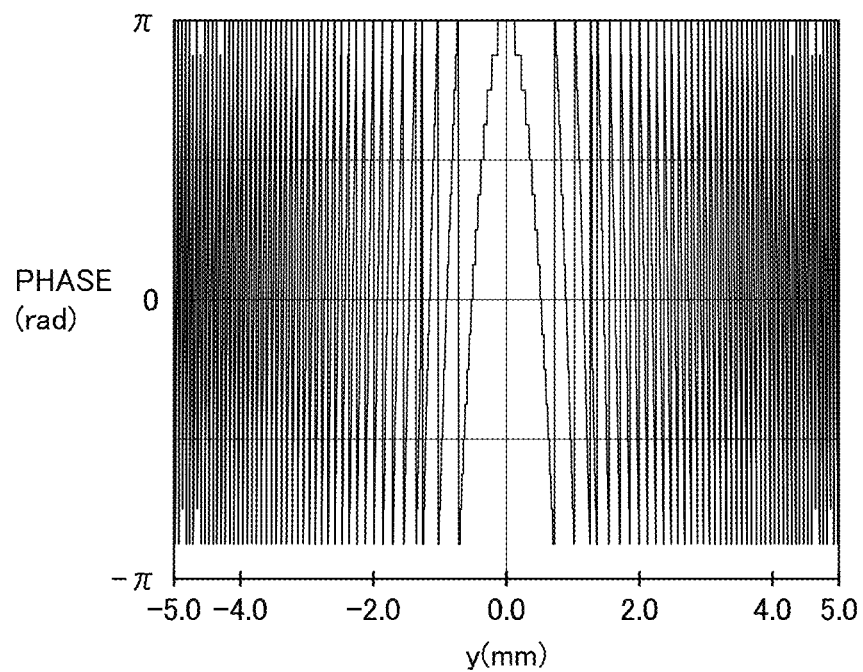
FIG. 117 is a diagram showing a phase pattern in the y axis direction at x=0.0 mm in Example 11.
Figure 118:
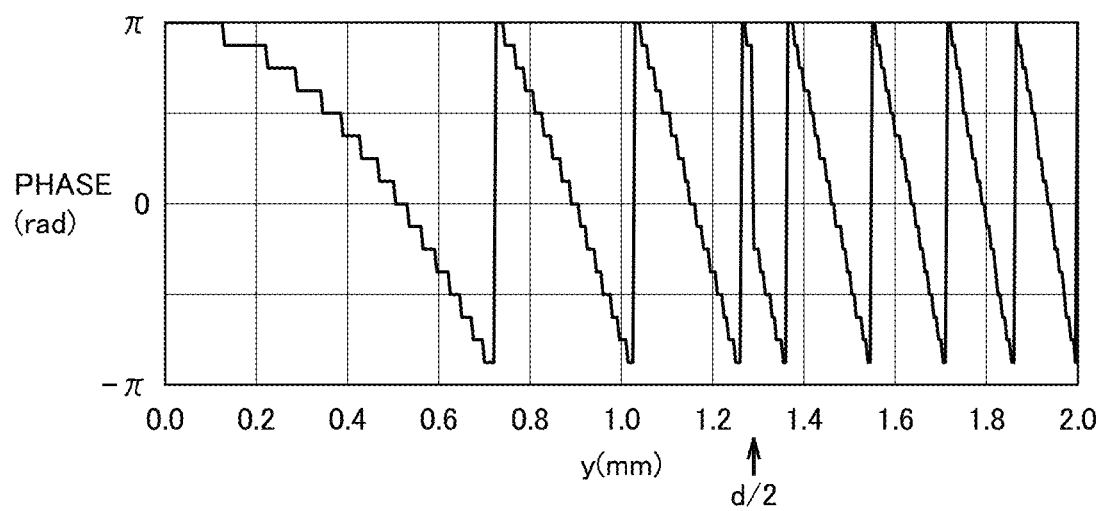
FIG. 118 is a partial enlarged view of a phase pattern in the y axis direction at x=0.0 mm in Example 11.

Referring to FIG. 113, 0.9 peak width $W_1$ of the short axis direction relative light intensity profile of line beam 20 is 0.065 mm, and $1/e^2$ peak width $W_2$ of the short axis direction relative light intensity profile of line beam 20 is 0.195 mm. Aspect ratio $W_4/W_2$ of line beam 20 is 6.92. In the short axis direction relative light intensity profile of line beam 20, there is a portion in which the optical axis direction relative light intensity of line beam 20 is less than 0.9 between third position $P_3$ and fourth position $P_4$ in the short axis direction relative light intensity profile of line beam 20. For example, in the short axis direction relative light intensity profile of line beam 20, the short axis direction relative light intensity of line beam 20 on optical axis 11 (y=0) is 0.748. Therefore, the short axis direction relative light intensity profile of line beam 20 does not have a flat top shape.

Example 11

Figure 119:
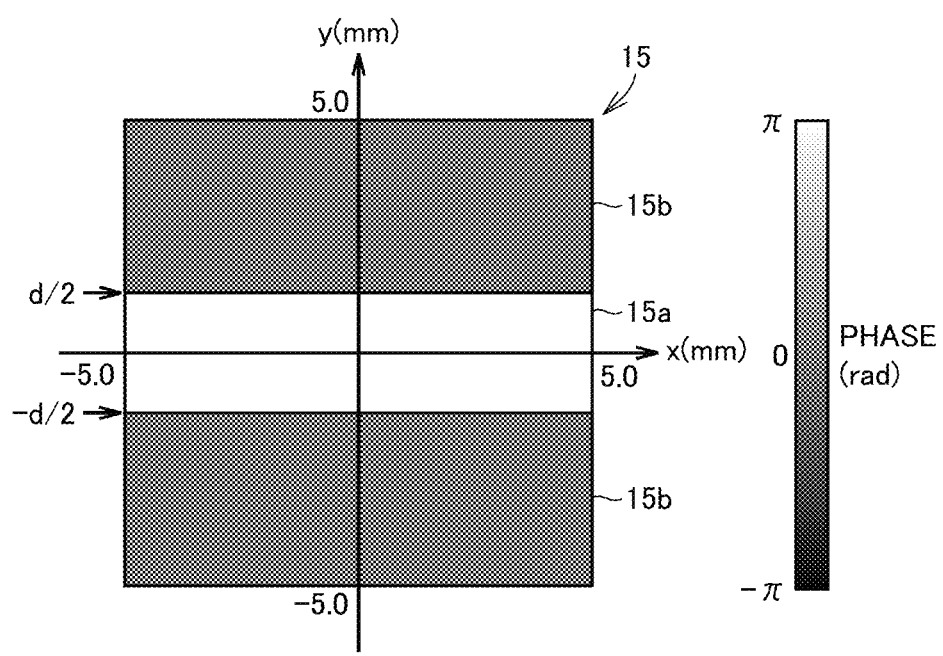

A diffractive optical element 12 of Example 11 includes a phase pattern 13 shown in FIGS. 115 to 118. Phase pattern 13 of the present example is a phase pattern in which first phase pattern 14 shown in FIGS. 9 to 12 and a second phase pattern 15 shown in FIG. 119 are overlapped with each other. Second phase pattern 15 of the present example is similar to second phase pattern 15 of Example 1, but width d of central phase pattern 15a of the present example is 2.58 mm. In the present example, coefficient C is 2.70.

Figure 120:
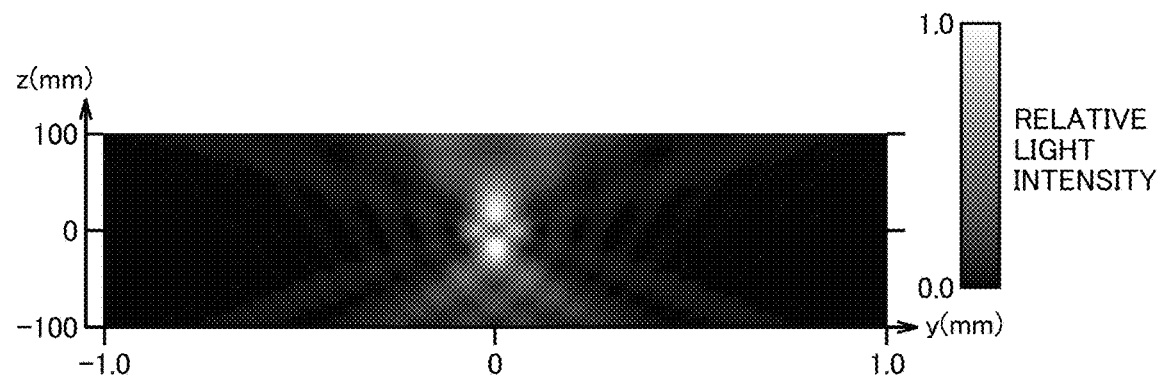
Figure 121:
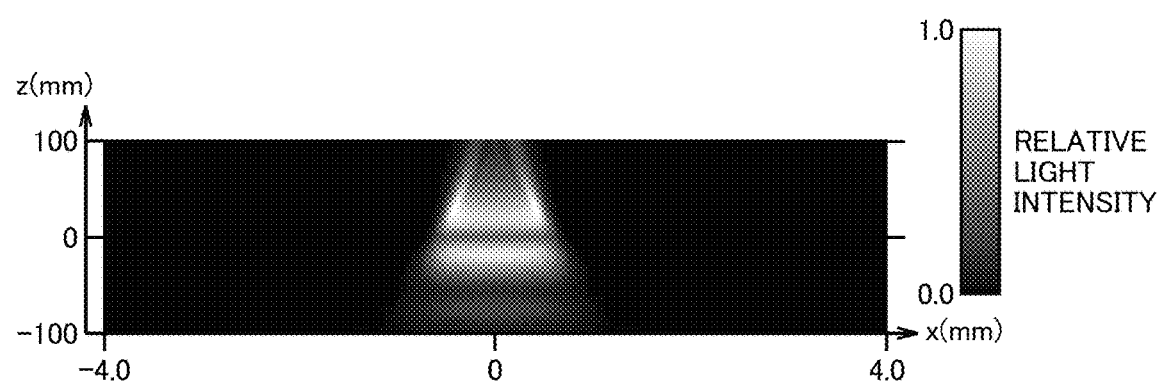
Figure 122:
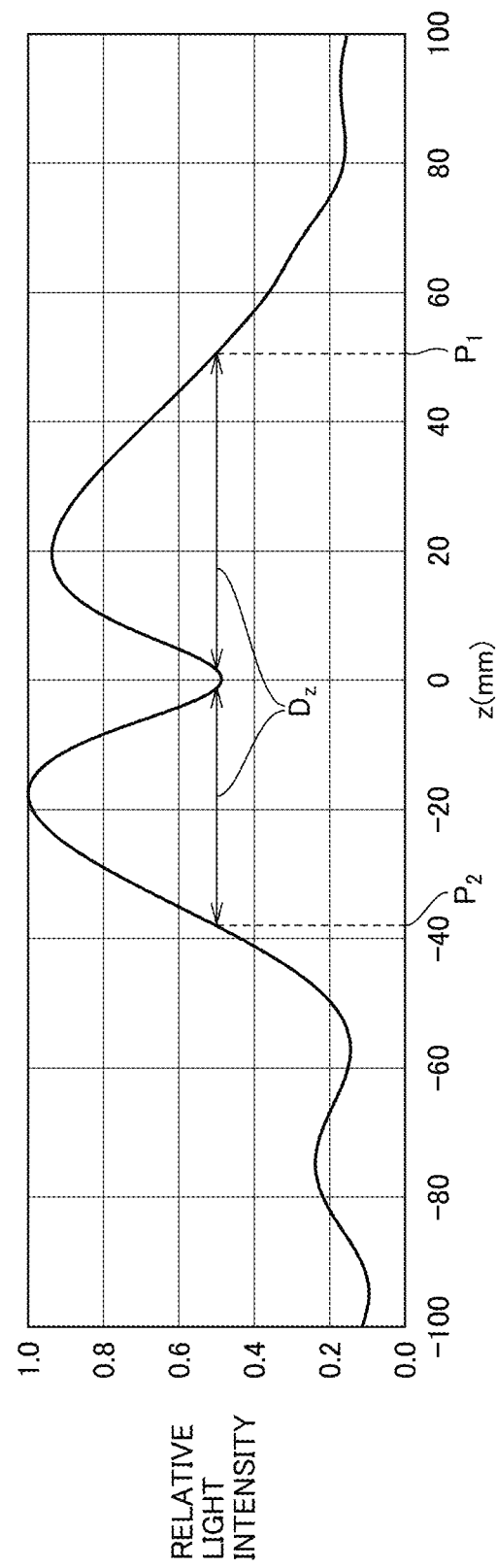

A line beam 20 having a defocus profile shown in FIGS. 120 and 121 is obtained by diffractive optical element 12 of the present example. Referring to FIG. 122, focal depth $D_Z$ of line beam 20 is 85.7 mm. In the optical axis direction relative light intensity profile of line beam 20, there is a portion in which the optical axis direction relative light intensity of line beam 20 is less than 0.5 between first position $P_1$ and second position $P_2$ in the optical axis direction relative light intensity profile of line beam 20. For example, the relative light intensity on optical axis 11 in focal plane 25 (z=0) is 0.487.

Figure 123:
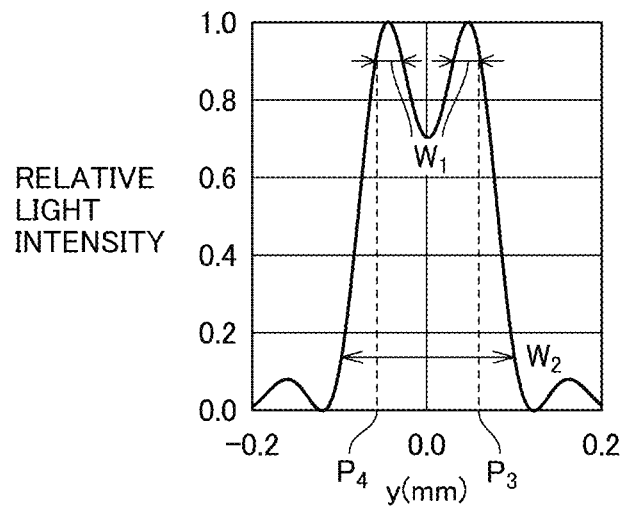
Figure 124:
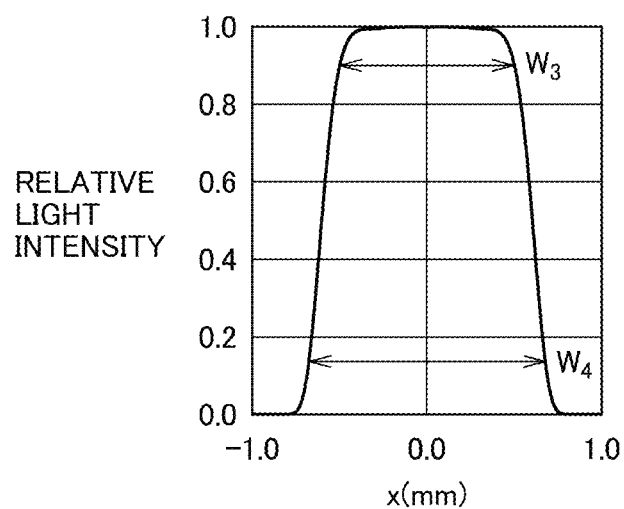

Referring to FIG. 123, 0.9 peak width $W_1$ of the short axis direction relative light intensity profile of line beam 20 is 0.061 mm, and $1/e^2$ peak width $W_2$ of the short axis direction relative light intensity profile of line beam 20 is 0.198 mm. Aspect ratio $W_4/W_2$ of line beam 20 is 6.82. In the short axis direction relative light intensity profile of line beam 20, there is a portion in which the optical axis direction relative light intensity of line beam 20 is less than 0.9 between third position $P_3$ and fourth position $P_4$ in the short axis direction relative light intensity profile of line beam 20. For example, in the short axis direction relative light intensity profile of line beam 20, the short axis direction relative light intensity of line beam 20 on optical axis 11 (y=0) is 0.703. Therefore, the short axis direction relative light intensity profile of line beam 20 does not have a flat top shape.

Figure 19:
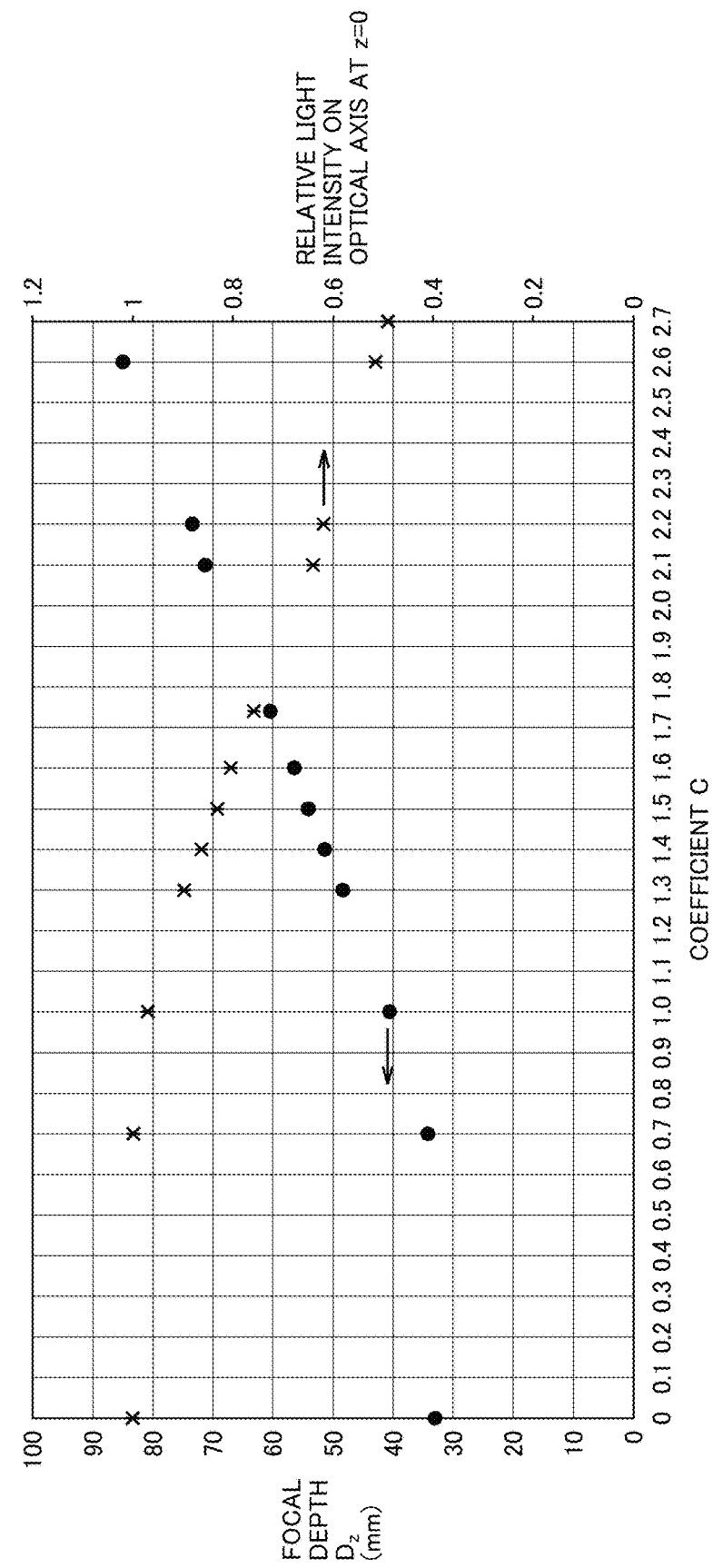
FIG. 19 is a diagram showing a change in focal depth with respect to a coefficient C and a change in relative light intensity on the optical axis at z=0 with respect to coefficient C.

FIG. 19 shows a change in focal depth $D_Z$ with respect to coefficient C and a change in the relative light intensity on the optical axis at z=0 with respect to coefficient C in each of Examples 1 to 11 and the Comparative Example. Table 1 shows the numerical values of the parameters of each of Examples 1 to 5 and the Comparative Example. Table 2 shows the numerical values of the parameters of each of Examples 6 to 11.

TABLE 1

|  | Comparative Example | Example 1 | Example 2 | Example 3 | Example 4 | Example 5 |
| --- | --- | --- | --- | --- | --- | --- |
| d (mm) | 0.00 | 3.22 | 5.07 | 4.24 | 3.72 | 3.59 |
| C | 0.00 | 1.74 | 0.70 | 1.00 | 1.30 | 1.40 |
| $D_z$ (mm) | 33.0 | 60.4 | 34.2 | 40.6 | 48.4 | 51.4 |
| $W_1$ (mm) | 0.026 | 0.075 | 0.029 | 0.035 | 0.045 | 0.051 |
| $W_2$ (mm) | 0.114 | 0.163 | 0.119 | 0.130 | 0.143 | 0.148 |
| $W_1/W_2$ | 0.228 | 0.460 | 0.244 | 0.269 | 0.315 | 0.345 |

TABLE 1-continued

|  | Comparative Example | Example 1 | Example 2 | Example 3 | Example 4 | Example 5 |
|---|---|---|---|---|---|---|
| $W_4/W_2$ | 11.84 | 8.28 | 11.34 | 10.38 | 9.44 | 9.12 |
| Relative Light Intensity on Optical Axis at z = 0 | 1.000 | 0.758 | 0.999 | 0.974 | 0.897 | 0.863 |

TABLE 2

|  | Example 6 | Example 7 | Example 8 | Example 9 | Example 10 | Example 11 |
|---|---|---|---|---|---|---|
| d(mm) | 3.46 | 3.35 | 2.93 | 2.86 | 2.64 | 2.58 |
| C | 1.50 | 1.60 | 2.10 | 2.20 | 2.60 | 2.70 |
| $D_z$ (mm) | 54.1 | 56.4 | 71.3 | 73.4 | 85.0 | 85.7 |
| $W_1$ (mm) | 0.057 | 0.063 | 0.098 | 0.091 | 0.065 | 0.062 |
| $W_2$ (mm) | 0.153 | 0.157 | 0.179 | 0.182 | 0.195 | 0.198 |
| $W_1/W_2$ | 0.373 | 0.401 | 0.547 | 0.500 | 0.333 | 0.313 |
| $W_4/W_2$ | 8.82 | 8.60 | 7.54 | 7.42 | 6.92 | 6.82 |
| Relative Light Intensity on Optical Axis at z = 0 | 0.831 | 0.804 | 0.640 | 0.619 | 0.515 | 0.487 |

Modifications of the present embodiment will be described. In a first modification of the present embodiment, first phase pattern 14 and second phase pattern 15 may be formed in light incident surface 12a of diffractive optical element 12. That is, diffractive optical element 12 may include phase pattern 13 (see FIGS. 5 to 8) in which first phase pattern 14 and second phase pattern 15 are overlapped with each other, and phase pattern 13 may be formed in light incident surface 12a of diffractive optical element 12. In a second modification of the present embodiment, first phase pattern 14 may be formed in light incident surface 12a of diffractive optical element 12, and second phase pattern 15 may be formed in light exit surface 12b of diffractive optical element 12. In a third modification of the present embodiment, first phase pattern 14 may be formed in light exit surface 12b of diffractive optical element 12, and second phase pattern 15 may be formed in light incident surface 12a of diffractive optical element 12.

Second Embodiment

Figure 125:
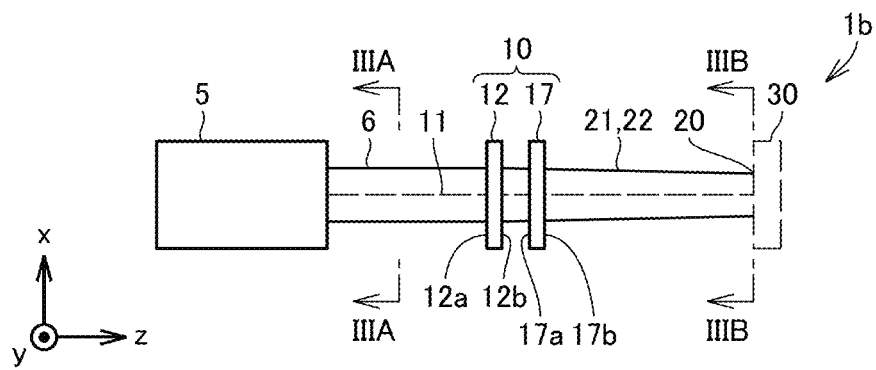
Figure 126:
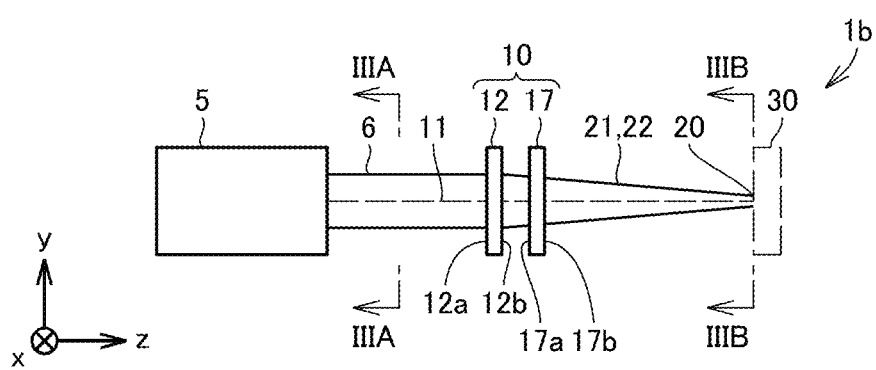

A laser beam irradiation device 1b of a second embodiment will be described with reference to FIGS. 125 and 126. Laser beam irradiation device 1b of the present embodiment has a configuration similar to that of laser beam irradiation device 1 of the first embodiment, but is mainly different therefrom in terms of the configuration of diffractive optical device 10.

Diffractive optical device 10 of the present embodiment includes a first diffractive optical element (diffractive optical element 12) and a second diffractive optical element (diffractive optical element 17). Diffractive optical element 12 and diffractive optical element 17 are disposed along optical axis 11 of diffractive optical device 10. Diffractive optical element 12 is disposed on the light incident side of laser beam 6 relative to diffractive optical element 17. First phase pattern 14 is formed in diffractive optical element 12, and second phase pattern 15 is formed in diffractive optical element 17. Particularly, first phase pattern 14 is formed in one of light incident surface 12a or light exit surface 12b of diffractive optical element 12. Second phase pattern 15 is formed in one of light incident surface 17a or light exit surface 17b of diffractive optical element 17.

In a modification of the present embodiment, first phase pattern 14 may be formed in diffractive optical element 17, and second phase pattern 15 may be formed in diffractive optical element 12. Particularly, first phase pattern 14 is formed in one of light incident surface 17a or light exit surface 17b of diffractive optical element 17. Second phase pattern 15 is formed in one of light incident surface 12a or light exit surface 12b of diffractive optical element 12.

The first and second embodiments and modifications thereof disclosed herein are illustrative and non-restrictive in any respect. The scope of the present invention is defined by the terms of the claims, rather than the first and second embodiments and modifications thereof described above, and is intended to include any modifications within the scope and meaning equivalent to the terms of the claims.

REFERENCE SIGNS LIST 1, 1b: laser beam irradiation device; 5: laser light source; 6: laser beam; 10: diffractive optical device; 11: optical axis; 12, 17: diffractive optical element; 12a, 17a: light incident surface; 12b, 17b: light exit surface; 13: phase pattern; 14: first phase pattern; 15: second phase pattern; 15a: central phase pattern; 15b: peripheral phase pattern; 20: line beam; 21: light having first order; 22: light having second order; 23: first focal plane; 24: second focal plane; 25: focal plane; 30: workpiece.

The invention claimed is:

1. A diffractive optical device comprising at least one diffractive optical element, wherein
the at least one diffractive optical element generates light having a first order and light having a second order from a laser beam input to the at least one diffractive optical element, and superimposes the light having the first order and the light having the second order on each other on an optical axis of the laser beam to cause interference between the light having the first order and the light having the second order, the light having the first order and the light having the second order having diffraction orders different from each other, the at least one diffractive optical element includes a first phase pattern and a second phase pattern, the first phase pattern converts the laser beam into a line beam, the second phase pattern diffracts the laser beam in a short axis direction of the line beam to generate the light having the first order and the light having the second order, and a first focal plane of the light having the first order is located at a position different from a second focal plane of the light having the second order on the optical axis.

2. The diffractive optical device according to claim 1, wherein the second phase pattern includes a central phase pattern and peripheral phase patterns disposed on both sides relative to the central phase pattern in the short axis direction, the central phase pattern provides a first optical phase to the laser beam, each of the peripheral phase patterns provides a second optical phase different from the first optical phase to the laser beam, and a difference between the first optical phase and the second optical phase is $\pi$.

3. The diffractive optical device according to claim 2, wherein the central phase pattern is uniform in a long axis direction of the line beam, and each of the peripheral phase patterns is uniform in the long axis direction.

4. The diffractive optical device according to claim 1, wherein the light having the first order is a +1-order diffraction beam, the light having the second order is a −1-order diffraction beam, when $\lambda$ represents a wavelength of the laser beam, $\omega$ represents a $1/e^2$ beam diameter of the laser beam, $P_{+1}$ represents a first refractive power of the second phase pattern for the +1-order diffraction beam in the short axis direction, and $P_{-1}$ represents a second refractive power of the second phase pattern for the −1-order diffraction beam in the short axis direction, $P_{+1}$ and $P_{-1}$ are given by the following formula (1) and a coefficient C satisfies the following formula (2):

$$P_{+1}=-P_{-1}=\lambda C/\omega^2 \quad (1), \text{ and}$$

$$0.0<C\leq 2.6 \quad (2).$$

5. The diffractive optical device according to claim 4, wherein the coefficient C satisfies the following formula (3):

$$1.4\leq C\leq 2.6 \quad (3).$$

6. The diffractive optical device according to claim 4, wherein the coefficient C satisfies the following formula (4):

$$1.6\leq C\leq 2.1 \quad (4).$$

7. The diffractive optical device according to claim 1, wherein the at least one diffractive optical element is constituted of one diffractive optical element including a light incident surface and a light exit surface, the first phase pattern is formed in one of the light incident surface or the light exit surface, and the second phase pattern is formed in one of the light incident surface or the light exit surface.

8. The diffractive optical device according to claim 7, wherein the one diffractive optical element includes a phase pattern in which the first phase pattern and the second phase pattern are overlapped with each other, and the phase pattern is formed in one of the light incident surface or the light exit surface.

9. The diffractive optical device according to claim 1, wherein the at least one diffractive optical element is constituted of a first diffractive optical element and a second diffractive optical element each disposed along the optical axis, the first phase pattern is formed in the first diffractive optical element, and the second phase pattern is formed in the second diffractive optical element.

10. The diffractive optical device according to claim 2, wherein the at least one diffractive optical element is constituted of one diffractive optical element including a light incident surface and a light exit surface, the one diffractive optical element includes a phase pattern in which the first phase pattern and the second phase pattern are overlapped with each other, the phase pattern is formed in one of the light incident surface or the light exit surface, the light having the first order is a +1-order diffraction beam, the light having the second order is a −1-order diffraction beam, and when $\lambda$ represents a wavelength of the laser beam, co represents a $1/e^2$ beam diameter of the laser beam, $P_{+1}$ represents a first refractive power of the second phase pattern for the +1-order diffraction beam in the short axis direction, and $P_{-1}$ represents a second refractive power of the second phase pattern for the −1-order diffraction beam in the short axis direction, $P_{+1}$ and $P_{-1}$ are given by the following formula (5) and a coefficient C satisfies the following formula (6):

$$P_{+1}=-P_{-1}=\lambda C/\omega^2 \quad (5), \text{ and}$$

$$1.6\leq C\leq 2.1 \quad (6).$$

11. The diffractive optical device according to claim 3, wherein the at least one diffractive optical element is constituted of one diffractive optical element including a light incident surface and a light exit surface, the one diffractive optical element includes a phase pattern in which the first phase pattern and the second phase pattern are overlapped with each other, the phase pattern is formed in one of the light incident surface or the light exit surface, the light having the first order is a +1-order diffraction beam, the light having the second order is a −1-order diffraction beam, and when λ represents a wavelength of the laser beam, ω represents a $1/e^2$ beam diameter of the laser beam, $P_{+1}$ represents a first refractive power of the second phase pattern for the +1-order diffraction beam in the short axis direction, and $P_{-1}$ represents a second refractive power of the second phase pattern for the −1-order diffraction beam in the short axis direction, $P_{+1}$ and $P_{-1}$ are given by the following formula (5) and a coefficient C satisfies the following formula (6):

$$P_{+1} = -P_{-1} = \lambda C/\omega^2 \quad (5), \text{ and}$$

$$1.6 \leq C \leq 2.1 \quad (6).$$

* * * * *